(12) United States Patent
Kramer et al.

(10) Patent No.: US 7,788,747 B2
(45) Date of Patent: Sep. 7, 2010

(54) APPARATUS AND METHOD FOR CLOSING HOSPITAL BED GAPS

(75) Inventors: Kenneth L. Kramer, Greensburg, IN (US); Robert T. Fussner, Brookville, IN (US); Jackie Robertson, Batesville, IN (US); Gregory W. Branson, Batesville, IN (US); Brian T. Wiggins, Burlington, KY (US); Doug H. Smith, Batesville, IN (US); John P. Biondo, Aurora, IN (US); Kendra K. Doyle, Bateville, IN (US); Richard B. Stacy, Batesville, IN (US); Michael V. Bolden, Charleston, SC (US); Reza Hakamiun, Charleston, SC (US); Clement J. Koerber, Sr., Batesville, IN (US); Michael J. Gosmeyer, Batesville, IN (US); James E. Gilbert, Metamora, IN (US); Donald L. Mobley, Batesville, IN (US); Dennis S. Flessate, Goose Creek, SC (US); David J. Ulrich, Sunman, IN (US); Jeffrey R. Welling, Batesville, IN (US); Gary W. Ferdon, Charleston, SC (US); Virgil J. Niese, Batesville, IN (US); Benjamin Salvatini, Summerville, SC (US); Patrick J. Minnelli, Harrison, OH (US); David W. Hornbach, Brookville, IN (US)

(73) Assignee: Hill-Rom Services, Inc., Wilimington, DE (US)

( * ) Notice: Subject to any disclaimer, the term of this patent is extended or adjusted under 35 U.S.C. 154(b) by 0 days.

(21) Appl. No.: 12/563,273

(22) Filed: Sep. 21, 2009

(65) Prior Publication Data

US 2010/0005589 A1    Jan. 14, 2010

Related U.S. Application Data

(60) Division of application No. 11/734,456, filed on Apr. 12, 2007, now Pat. No. 7,591,034, which is a continuation of application No. 11/095,967, filed on Mar. 31, 2005, now Pat. No. 7,222,377, which is a continuation of application No. 10/225,780, filed on Aug. 22, 2002, now Pat. No. 7,028,352.

(60) Provisional application No. 60/397,342, filed on Jul. 19, 2002, provisional application No. 60/314,276, filed on Aug. 22, 2001.

(51) Int. Cl.
*A61G 7/05* (2006.01)
*A47C 21/08* (2006.01)

(52) U.S. Cl. .................................. 5/428; 5/430

(58) Field of Classification Search .............. 5/425–430
See application file for complete search history.

(56) References Cited

U.S. PATENT DOCUMENTS 421,656 A    2/1890    Blanken (Continued)

FOREIGN PATENT DOCUMENTS

DE            9407325            8/1994

(Continued)

*Primary Examiner*—Michael Trettel
(74) *Attorney, Agent, or Firm*—Barnes & Thornburg LLP

(57) ABSTRACT

A patient support including a frame, a mattress supported by the frame, and a set of siderails configured to block egress of a patient from the patient support. The siderails are configured to reduce gaps defined between the siderails and the other components of the patient support.

19 Claims, 74 Drawing Sheets

U.S. PATENT DOCUMENTS

| | | |
|---|---|---|
| 993,119 A | 5/1911 | Slannard |
| 1,398,203 A | 11/1921 | Schmidt |
| 2,136,088 A | 11/1938 | Stevens |
| 2,164,484 A | 7/1939 | Wolfe |
| 2,281,209 A | 4/1942 | Smith |
| 2,452,366 A | 10/1948 | Freund |
| 2,556,591 A | 6/1951 | Loxley |
| 2,564,083 A | 8/1951 | Stechert |
| 2,587,291 A | 2/1952 | Rochers |
| 2,605,151 A | 7/1952 | Shampaine |
| 2,644,173 A | 7/1953 | James |
| 2,710,976 A | 6/1955 | Martensen |
| 2,722,017 A | 11/1955 | Burst et al. |
| 2,738,523 A | 3/1956 | Bryant |
| 2,766,463 A | 10/1956 | Bendersky |
| 2,817,854 A | 12/1957 | Pratt |
| 2,817,855 A | 12/1957 | Pratt |
| 2,869,614 A | 1/1959 | Wamsley |
| 2,951,252 A | 9/1960 | Roche |
| 3,010,121 A | 11/1961 | Breach |
| 3,018,492 A | 1/1962 | Rosen |
| 3,021,534 A | 2/1962 | Hausted |
| 3,053,568 A | 9/1962 | Miller |
| 3,055,020 A | 9/1962 | Mann |
| 3,069,700 A | 12/1962 | Berlin |
| 3,099,440 A | 7/1963 | Burzlaff |
| 3,112,500 A | 12/1963 | MacDonald |
| 3,138,805 A | 6/1964 | Piazza |
| 3,148,387 A | 9/1964 | Samie et al. |
| 3,210,779 A | 10/1965 | Herbold |
| 3,220,021 A | 11/1965 | Nelson |
| 3,220,022 A | 11/1965 | Nelson |
| 3,233,255 A | 2/1966 | Propst |
| 3,239,853 A | 3/1966 | MacDonald |
| 3,249,387 A | 5/1966 | Pivacek |
| 3,256,533 A | 6/1966 | Michelsen |
| 3,286,283 A | 11/1966 | Bertoldo |
| 3,309,717 A | 3/1967 | Black |
| 3,321,779 A | 5/1967 | Kaufman et al. |
| 3,344,445 A | 10/1967 | Crawford |
| 3,351,962 A | 11/1967 | Dodrill et al. |
| 3,406,772 A | 10/1968 | Ahrent et al. |
| 3,456,269 A | 7/1969 | Goodman |
| 3,486,176 A | 12/1969 | Murcott |
| 3,585,659 A | 6/1971 | Burst et al. |
| 3,593,350 A | 7/1971 | Knight et al. |
| 3,619,824 A | 11/1971 | Doyle |
| 3,640,566 A | 2/1972 | Hodge |
| 3,742,530 A | 7/1973 | Clark |
| 3,845,511 A | 11/1974 | Benoit et al. |
| 3,851,345 A | 12/1974 | Benoit et al. |
| 3,855,654 A | 12/1974 | Pivacek |
| 3,865,434 A | 2/1975 | Sully |
| 3,877,090 A | 4/1975 | Schutz |
| 3,893,197 A | 7/1975 | Ricke |
| 3,897,973 A | 8/1975 | Long et al. |
| 3,905,591 A | 9/1975 | Schorr et al. |
| 3,916,461 A | 11/1975 | Kerstholt |
| 3,971,083 A | 7/1976 | Peterson |
| 4,127,906 A | 12/1978 | Zur |
| 4,139,917 A | 2/1979 | Fenwick |
| 4,168,099 A | 9/1979 | Jacobs et al. |
| 4,183,015 A | 1/1980 | Drew et al. |
| 4,186,456 A | 2/1980 | Huempfner |
| 4,214,326 A | 7/1980 | Spann |
| 4,215,446 A | 8/1980 | Malhoney |
| 4,232,415 A | 11/1980 | Webber |
| 4,240,169 A | 12/1980 | Roos |
| 4,258,445 A | 3/1981 | Zur |
| 4,312,500 A | 1/1982 | Janssen |
| 4,336,621 A | 6/1982 | Schwartz et al. |
| 4,370,765 A | 2/1983 | Webber |
| 4,409,695 A | 10/1983 | Johnston et al. |
| 4,439,880 A | 4/1984 | Koncelik et al. |
| 4,453,732 A | 6/1984 | Assanah et al. |
| D276,112 S | 10/1984 | Ferrell et al. |
| 4,557,471 A | 12/1985 | Pazzini |
| 4,607,402 A | 8/1986 | Pollard |
| 4,612,679 A | 9/1986 | Mitchell |
| 4,653,129 A | 3/1987 | Kuck et al. |
| 4,654,903 A | 4/1987 | Chubb et al. |
| 4,670,923 A | 6/1987 | Gabriel et al. |
| 4,672,698 A | 6/1987 | Sands |
| 4,675,926 A | 6/1987 | Lindblom et al. |
| 4,676,687 A | 6/1987 | Koffler |
| 4,685,159 A | 8/1987 | Oetiker |
| 4,704,750 A | 11/1987 | Wheelock |
| 4,710,049 A | 12/1987 | Chang |
| 4,710,992 A | 12/1987 | Falwell |
| 4,745,647 A | 5/1988 | Goodwin |
| 4,747,171 A | 5/1988 | Einsele et al. |
| 4,751,754 A | 6/1988 | Bailey et al. |
| 4,767,419 A | 8/1988 | Fattore |
| 4,768,249 A | 9/1988 | Goodwin |
| 4,783,864 A | 11/1988 | Turner |
| 4,800,600 A | 1/1989 | Baum |
| 4,827,545 A | 5/1989 | Arp |
| 4,839,933 A | 6/1989 | Plewright et al. |
| 4,847,929 A | 7/1989 | Pupovic |
| 4,858,260 A | 8/1989 | Failor et al. |
| 4,862,529 A | 9/1989 | Peck |
| 4,862,530 A | 9/1989 | Chen |
| 4,872,228 A | 10/1989 | Bishop |
| 4,873,734 A | 10/1989 | Pollard |
| 4,894,876 A | 1/1990 | Fenwick |
| 4,944,055 A | 7/1990 | Shainfeld |
| 4,974,905 A | 12/1990 | Davis |
| 4,985,946 A | 1/1991 | Foster et al. |
| 4,993,089 A | 2/1991 | Solomon et al. |
| 5,010,611 A | 4/1991 | Mallett |
| 5,035,014 A | 7/1991 | Blanchard |
| 5,040,253 A | 8/1991 | Cheng |
| 5,044,025 A | 9/1991 | Hunsinger et al. |
| 5,060,327 A | 10/1991 | Celestina et al. |
| 5,072,463 A | 12/1991 | Willis |
| 5,077,843 A | 1/1992 | Dale et al. |
| 5,083,332 A | 1/1992 | Foster et al. |
| 5,083,334 A | 1/1992 | Huck et al. |
| 5,084,925 A | 2/1992 | Cook |
| 5,097,550 A | 3/1992 | Marra |
| 5,129,117 A | 7/1992 | Celestina et al. |
| 5,175,897 A | 1/1993 | Marra, Jr. |
| 5,179,744 A | 1/1993 | Foster et al. |
| 5,191,663 A | 3/1993 | Holder et al. |
| 5,193,633 A | 3/1993 | Ezenwa |
| 5,197,156 A | 3/1993 | Stryker et al. |
| 5,205,004 A | 4/1993 | Hayes et al. |
| D336,577 S | 6/1993 | Celestina et al. |
| 5,216,768 A | 6/1993 | Bodine et al. |
| 5,230,113 A | 7/1993 | Foster et al. |
| 5,245,376 A | 9/1993 | Takahashi |
| 5,279,010 A | 1/1994 | Ferrand et al. |
| 5,365,623 A | 11/1994 | Springer |
| 5,381,571 A | 1/1995 | Gabhart |
| 5,384,927 A | 1/1995 | Mardero et al. |
| 5,408,288 A | 4/1995 | Ogura et al. |
| 5,410,765 A | 5/1995 | Dicken |
| 5,418,988 A | 5/1995 | Iura |
| 5,421,046 A | 6/1995 | Vande Streek |
| 5,435,500 A | 7/1995 | Shibata |
| 5,450,641 A | 9/1995 | Montgomery |
| 5,454,126 A | 10/1995 | Foster et al. |
| 5,455,973 A | 10/1995 | Brumfield et al. |
| 5,479,666 A | 1/1996 | Foster et al. |

| | | | |
|---|---|---|---|
| 5,481,772 A | 1/1996 | Glynn et al. | |
| 5,485,699 A | 1/1996 | Gabhart | |
| 5,524,306 A | 6/1996 | George | |
| 5,537,701 A | 7/1996 | Elliott | |
| 5,542,135 A | 8/1996 | Ozrovitz et al. | |
| 5,557,817 A | 9/1996 | Haddock | |
| 5,575,025 A | 11/1996 | Peters | |
| 5,577,277 A | 11/1996 | Sundberg et al. | |
| 5,577,279 A | 11/1996 | Foster et al. | |
| 5,604,942 A | 2/1997 | Allevato et al. | |
| 5,642,545 A | 7/1997 | Howard | |
| 5,671,490 A | 9/1997 | Wu | |
| 5,678,267 A | 10/1997 | Kinder | |
| 5,689,839 A * | 11/1997 | Laganiere et al. | 5/425 |
| 5,715,548 A | 2/1998 | Weismiller et al. | |
| 5,721,961 A | 2/1998 | Kameyama | |
| 5,732,423 A | 3/1998 | Weismiller et al. | |
| 5,745,937 A | 5/1998 | Weismiller et al. | |
| 5,749,112 A | 5/1998 | Metzler | |
| 5,761,756 A | 6/1998 | Nowak et al. | |
| 5,771,506 A | 6/1998 | Joiner | |
| 5,781,945 A | 7/1998 | Scherer et al. | |
| 5,802,636 A | 9/1998 | Corbin et al. | |
| 5,832,549 A | 11/1998 | Le Pallec et al. | |
| 5,864,900 A | 2/1999 | Landau | |
| 5,878,452 A | 3/1999 | Brooke et al. | |
| 5,926,873 A | 7/1999 | Fountain | |
| 5,987,666 A | 11/1999 | Zigmont | |
| 6,038,721 A | 3/2000 | Gordon | |
| 6,058,531 A | 5/2000 | Carroll | |
| 6,089,593 A | 7/2000 | Hanson et al. | |
| 6,249,646 B1 | 6/2001 | Chen | |
| 6,320,510 B2 | 11/2001 | Mendedick et al. | |
| 6,321,878 B1 | 11/2001 | Mobley et al. | |
| 6,347,422 B2 | 2/2002 | Heavrin | |
| 6,363,552 B1 | 4/2002 | Hornbach et al. | |
| 6,374,440 B1 | 4/2002 | Thim, Jr. | |
| 6,397,416 B2 | 6/2002 | Brooke et al. | |
| 6,401,277 B1 | 6/2002 | Savage et al. | |
| 6,401,281 B1 | 6/2002 | Younge | |
| 6,427,264 B1 | 8/2002 | Metz et al. | |
| 6,430,766 B1 | 8/2002 | Henley et al. | |
| 6,615,426 B1 | 9/2003 | Risk, Jr. | |
| 6,640,360 B2 | 11/2003 | Hornbach et al. | |
| 6,708,935 B2 | 3/2004 | Smeed | |
| 6,829,793 B2 | 12/2004 | Brooke et al. | |
| 7,103,928 B1 | 9/2006 | Childs | |
| 7,591,034 B2 * | 9/2009 | Kramer et al. | 5/425 |

FOREIGN PATENT DOCUMENTS

| | | |
|---|---|---|
| DE | 199 00 602 C1 | 7/2000 |
| EP | 0 037 063 A2 | 10/1981 |
| FR | 1450817 | 6/1966 |
| GB | 1 466 080 | 3/1977 |
| GB | 2 313 303 A | 11/1997 |
| WO | 98/17153 | 4/1998 |
| WO | 99/15126 | 4/1999 |
| WO | 01/28483 | 4/2001 |

* cited by examiner

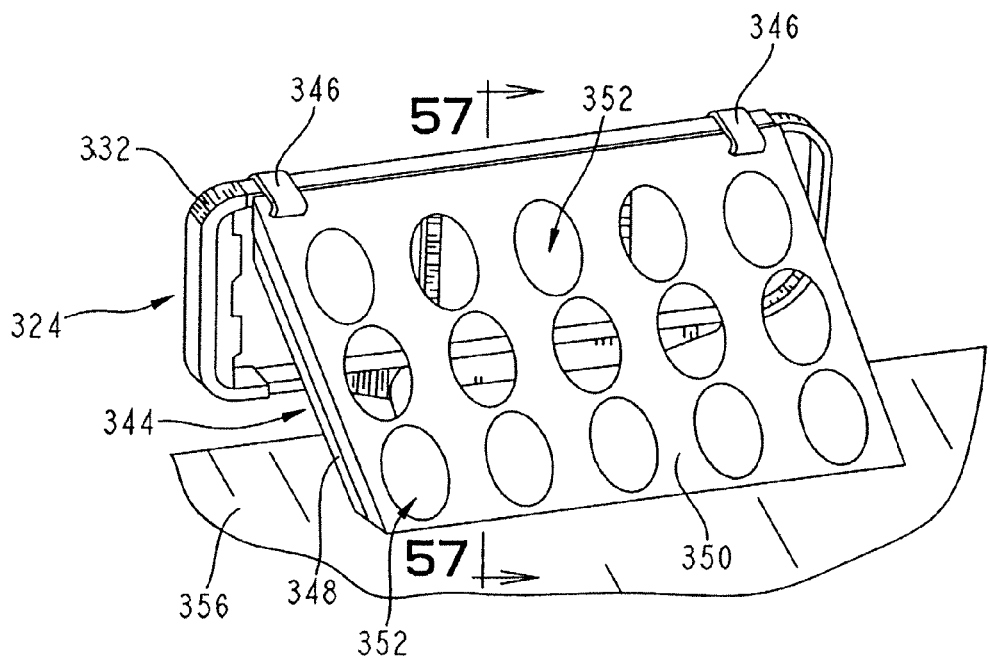
FIG. 56
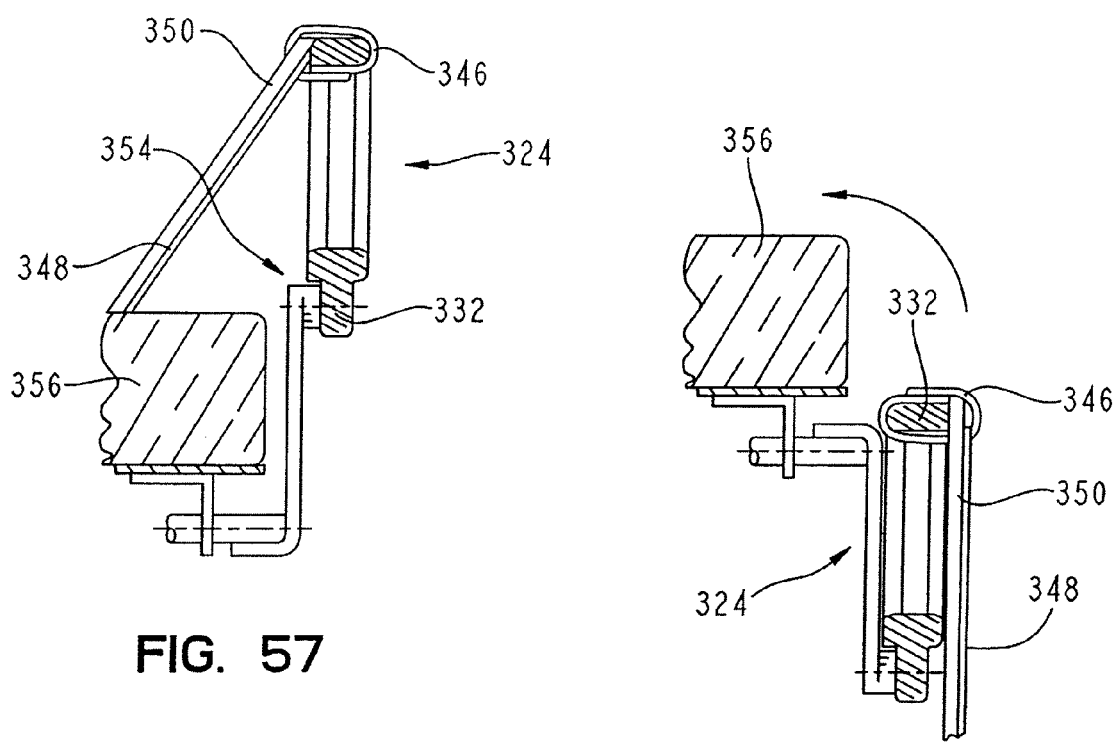
FIG. 57
FIG. 58

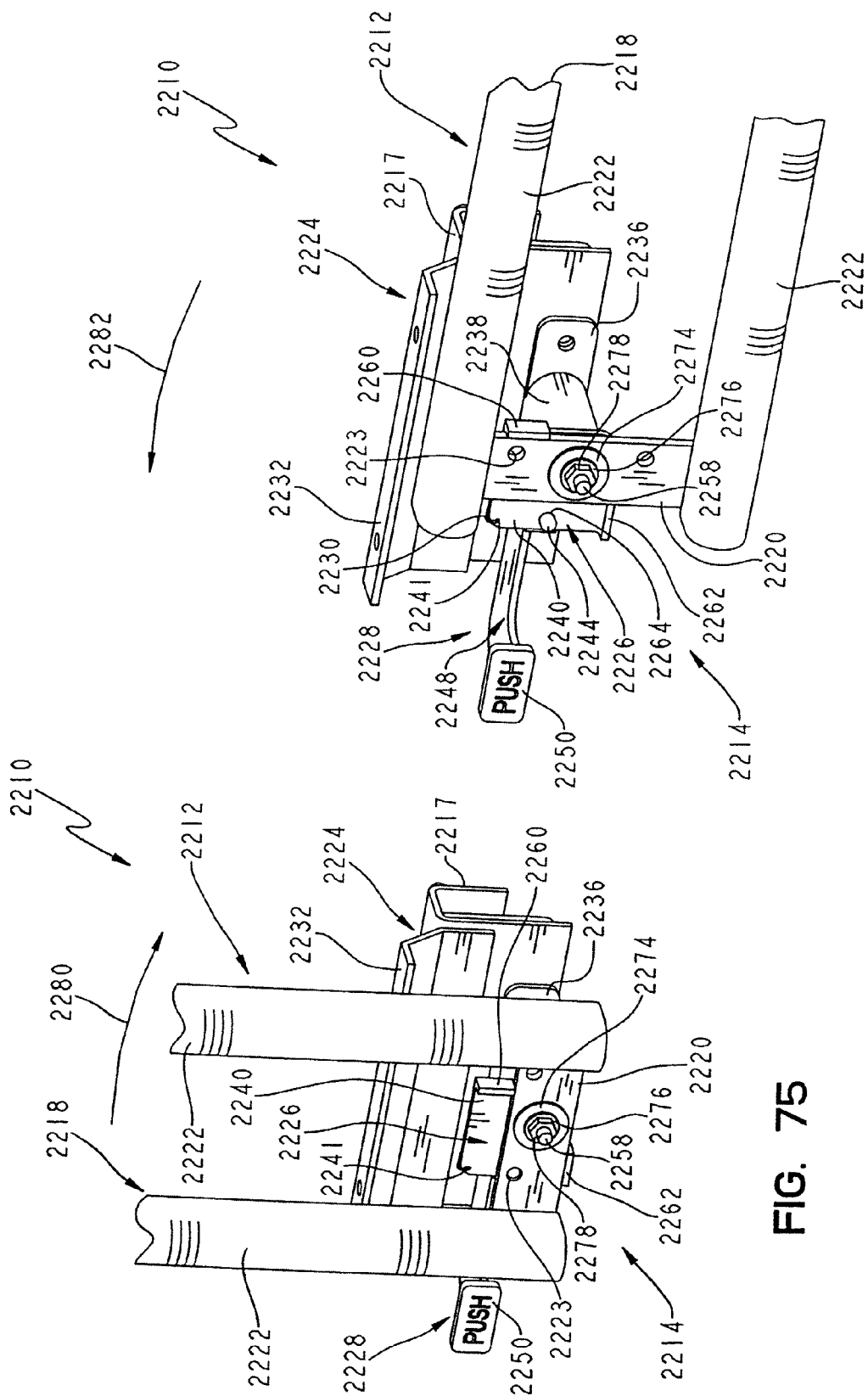

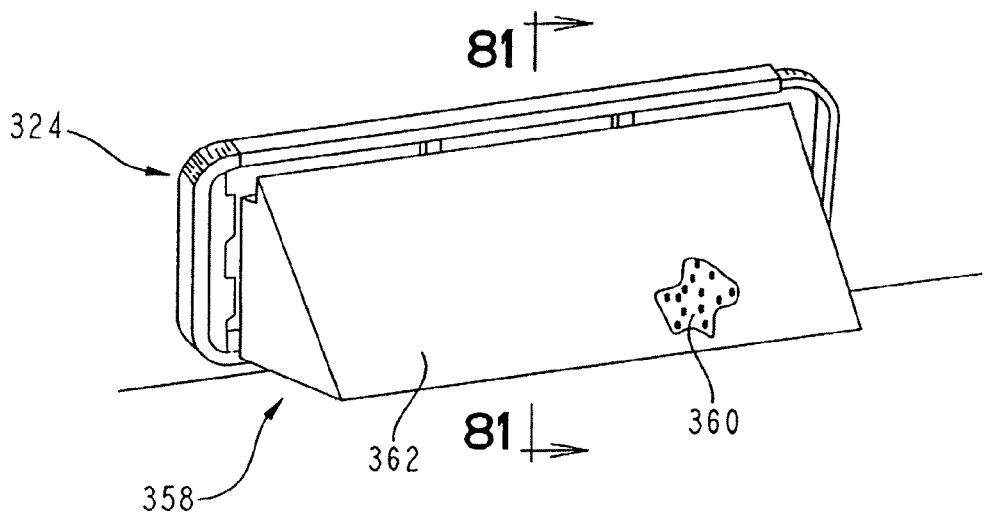
FIG. 80
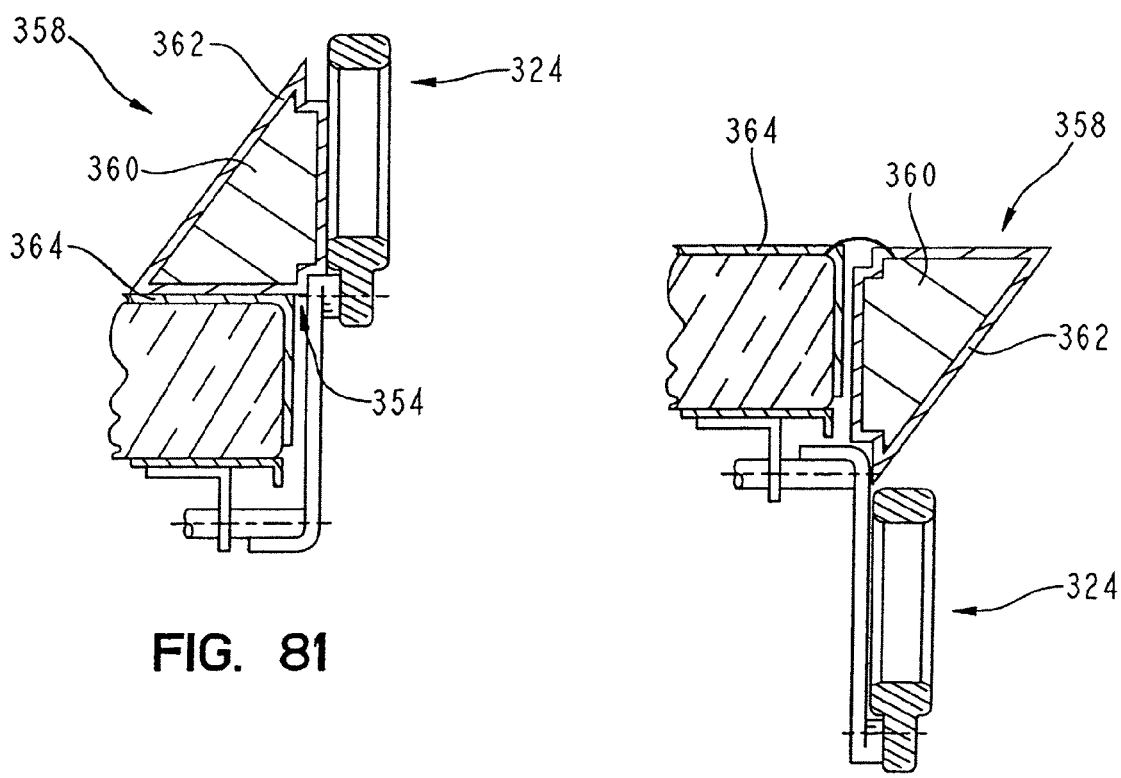
FIG. 81
FIG. 82

APPARATUS AND METHOD FOR CLOSING HOSPITAL BED GAPS

This application is a divisional of U.S. application Ser. No. 11/734,456, filed Apr. 12, 2007, now U.S. Pat. No. 7,591,034, which is a continuation of U.S. application Ser. No. 11/095,967, filed Mar. 31, 2005, now U.S. Pat. No. 7,222,377 which is a continuation of U.S. application Ser. No. 10/225,780, filed Aug. 22, 2002, now U.S. Pat. No. 7,028,352 which claims priority to U.S. provisional application Ser. No. 60/397,342 filed Jul. 19, 2002, and U.S. provisional application Ser. No. 60/314,276 filed Aug. 22, 2001, the disclosures of which are incorporated by reference herein.

BACKGROUND OF THE INVENTION

The present invention relates to patient supports, such as hospital beds. More specifically, the present invention relates to the apparatus and methods for closing gaps that may exist between components on a patient support.

BRIEF DESCRIPTION OF THE DRAWINGS

The detailed description of the drawings particularly refers to the accompanying figures in which:

FIG. 56 is a perspective view of a siderail and an inclined panel coupled to the siderail and extending between the siderail and a mattress;

FIG. 57 is a side cross-sectional view taken along line 57-57 of FIG. 56;

FIG. 58 is a view similar to FIG. 57 showing the siderail in a lowered position;

FIG. 75 is a perspective cut away view of a latch of the siderail of FIG. 73;

FIG. 76 is a perspective cut away view of the latch of the siderail of FIG. 74 in the lowered position;

FIG. 80 is a perspective view of a siderail and bolster positioned adjacent to the siderail on a mattress;

FIG. 81 is a cross-sectional view taken along line 81-81 of FIG. 80 showing the bolster coupled to the mattress;

FIG. 82 is a view similar to FIG. 81 showing the siderail in a lowered position;

DETAILED DESCRIPTION OF THE DRAWINGS

Figure 1:
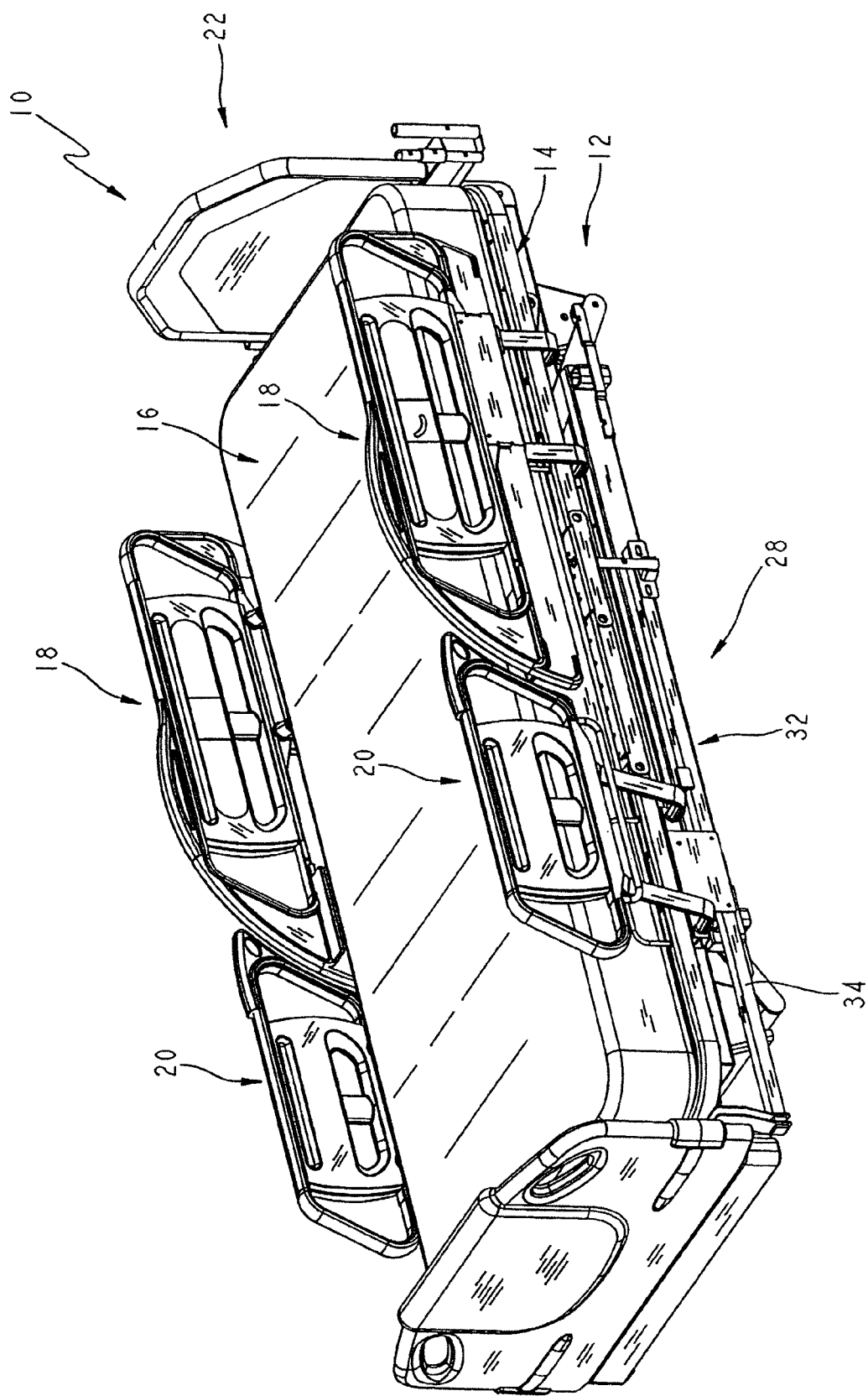
FIG. 1 is a perspective view of the intermediate and upper portions of a patient support showing the patient support including deck, a mattress positioned on the deck, a footboard, a head board, a pair of head end siderails, and a pair of foot end siderails.

A patient support 10 is shown in FIGS. 1-9. Patient support 10 includes a frame 12, a deck 14, a mattress 16 supported by deck 14, head end and foot end siderails 18, 20, a headboard 22, and mattress retainers 24. Mattress retainers 24 are coupled to deck 14 to control the gap between mattress 16 and siderails 18, 20 by securing the position of mattress 16 and maintaining the gap at a constant size. Head end siderails 18 are coupled to a head section 26 of deck 14 and foot end siderail 20 are coupled to a sub-frame 28 supported by frame 12.

Patient support 10 may be produced originally in a manufacturing plant as an OEM bed or by retrofitting an existing patient support such as the patient support shown in U.S. Pat. Nos. 6,321,878 and 6,320,510, the disclosures of which are expressly incorporated by reference herein. When building an OEM bed, sub-frame 28 is coupled to frame 12 at the manufacturing plant. When retrofitted at the point of use or otherwise, sub-frame 28 is coupled to frame 12 at a location away from the manufacturing plant. During an OEM installation, foot end siderails 20 are initially mounted to sub-frame 28. During a non-OEM retrofit, foot end siderails 20 are removed from being coupled to a foot section 30 of deck 14 and then coupled to sub-frame 28 so that foot end siderails 20 no longer articulate with foot section 30.

Figure 4:
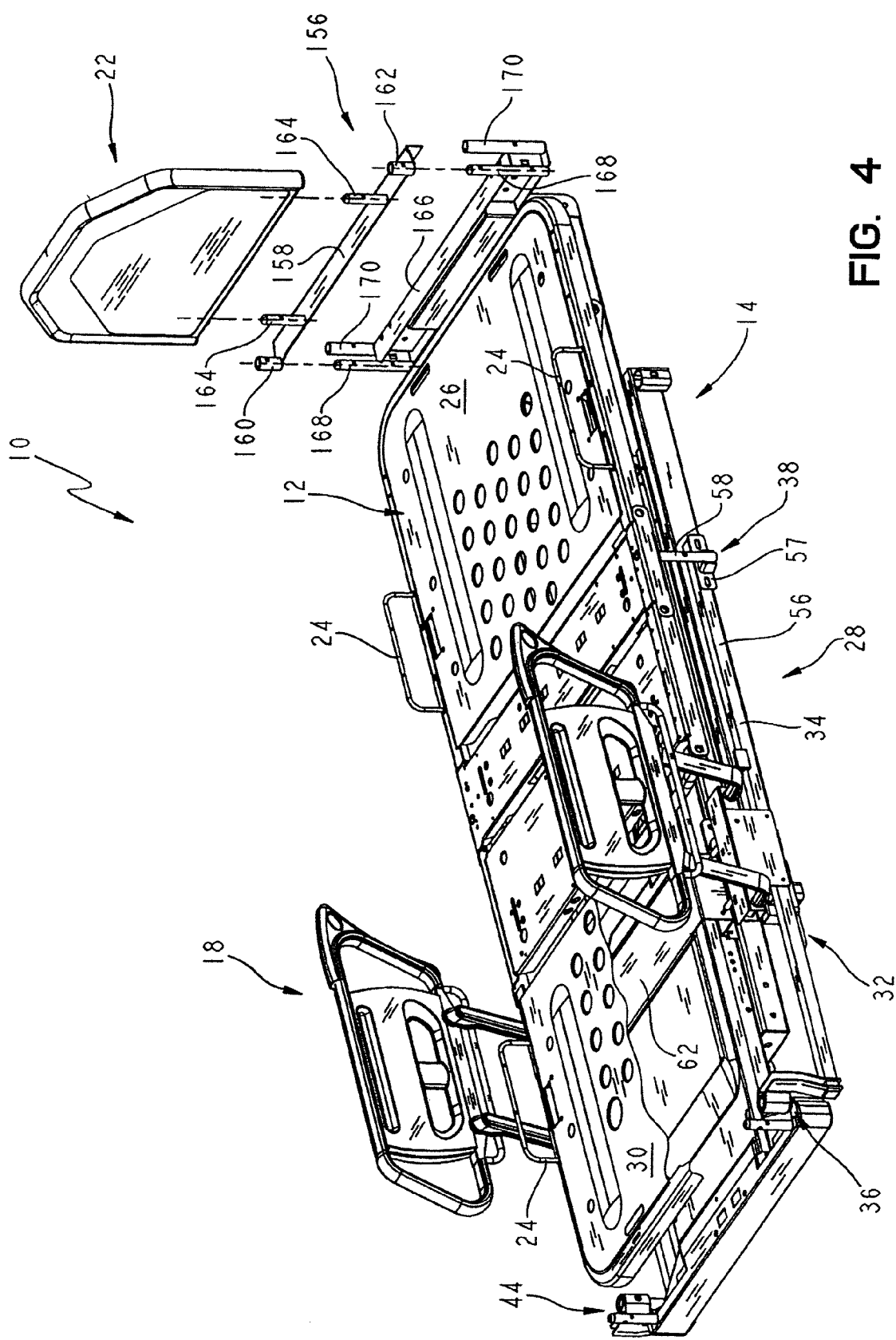
FIG. 4 is a perspective view of the patient support, with the head end siderails removed for clarity, showing a head board adaptor aligned with an existing pair of posts on the deck and the head board aligned with a pair of posts on the adaptor.

As shown in FIG. 4, sub-frame 28 includes a pair of rail bars 32. One rail bar 32 is attached to each side of frame 12 to support each foot end siderail 20. Each rail bar includes a body member 34, an I.V. socket 36, and a pin assembly 38. Body member 34 preferably has a rectangular or square cross section. I.V. socket 36 is sized and shaped to slide over a cylindrical I.V. mount post 40 of frame 12 positioned near a foot end 42 of patient support 10. I.V. socket 36 includes a space member 44 and a slide cylinder 46 coupled within space member 44 at a first end 48.

Slide cylinder 46 defines a circular aperture therein. The circular aperture has an inner diameter slightly larger than an outer diameter of cylindrical I.V. mount post 40. Slide cylinder 46 passes over cylindrical I.V. mount post 40 so cylindrical I.V. mount post 40 is positioned with the circular aperture of slide cylinder 46. Slide cylinder 46 is slightly shorter than cylindrical I.V. mount post 40 such that cylindrical I.V. mount post 40 extends out of circular aperture 50 when cylindrical I.V. mount post is seated thereon.

A second end 52 of space member 44 is coupled to a foot end 54 of body member 34, preferably by welding. Space member 44 vertically and horizontally offsets foot end 54 of body member 34 from I.V. mount post 40 of frame 12. Head end 56 of body member 34 is coupled to pin assembly 38.

Pin assembly 38 includes a body mount 57 and a frame mount 58. Body mount 57 is coupled to a head end 56 of body member 34 with bolts passing through voids (not shown) defined in body mount 57 and body member 34 and nuts fastened to the bolts. Frame mount 58 is substantially cylindrical having one end coupled to body mount 57 and another end having a threaded aperture axially defined therein. The threaded aperture is aligned with an OEM seat section I.V. socket aperture of patient support 10. A bolt 60 is passed through a washer and the I.V. socket aperture to threadably engage the threaded aperture and secure pin assembly 38 to frame 12 of patient support 10 as shown in FIG. 1.

Figure 5:
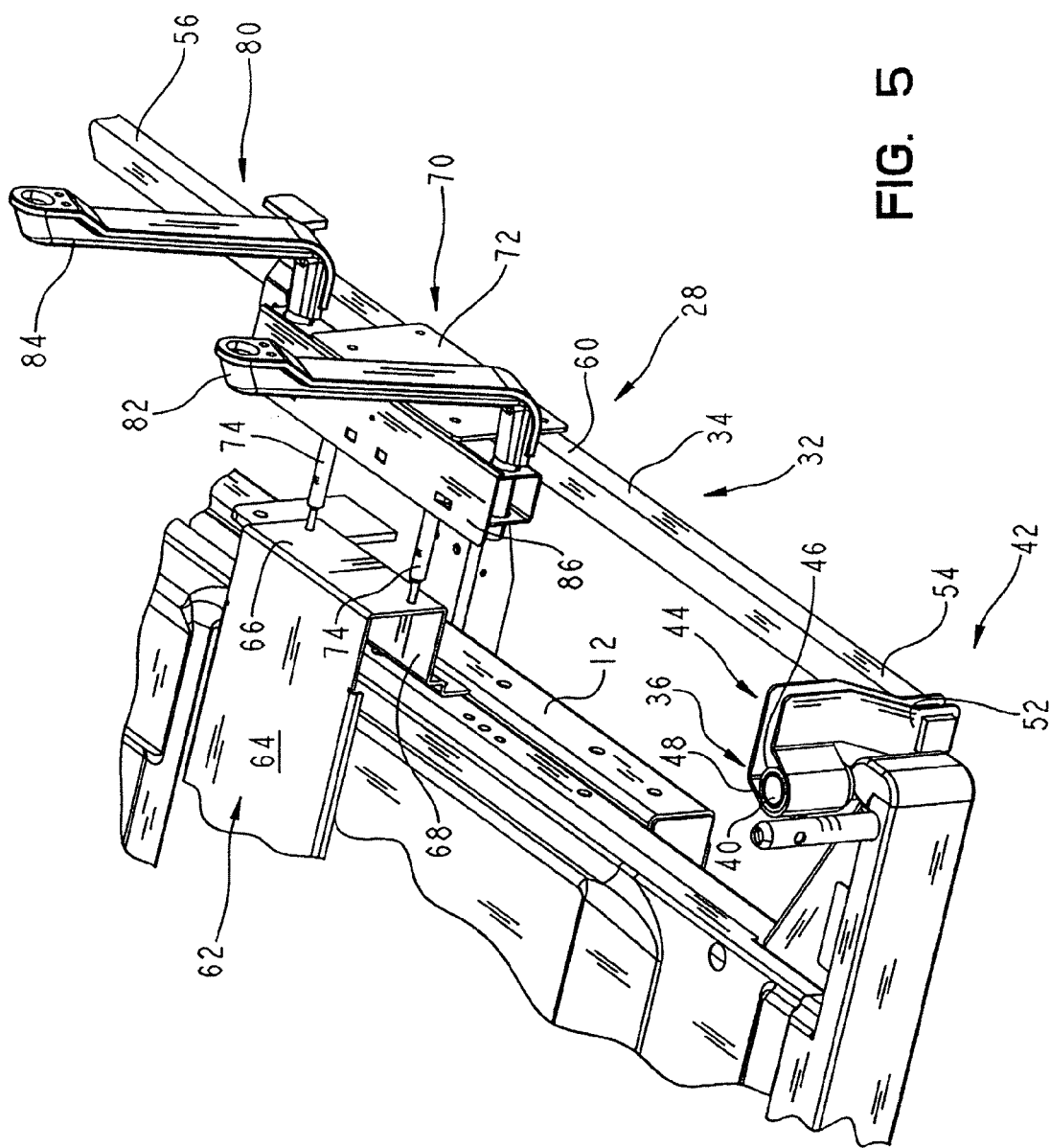
FIG. 5 is a perspective view of a portion of the patient support of FIG. 1 showing the foot end siderails coupled to a sub-frame.
Figure 6:
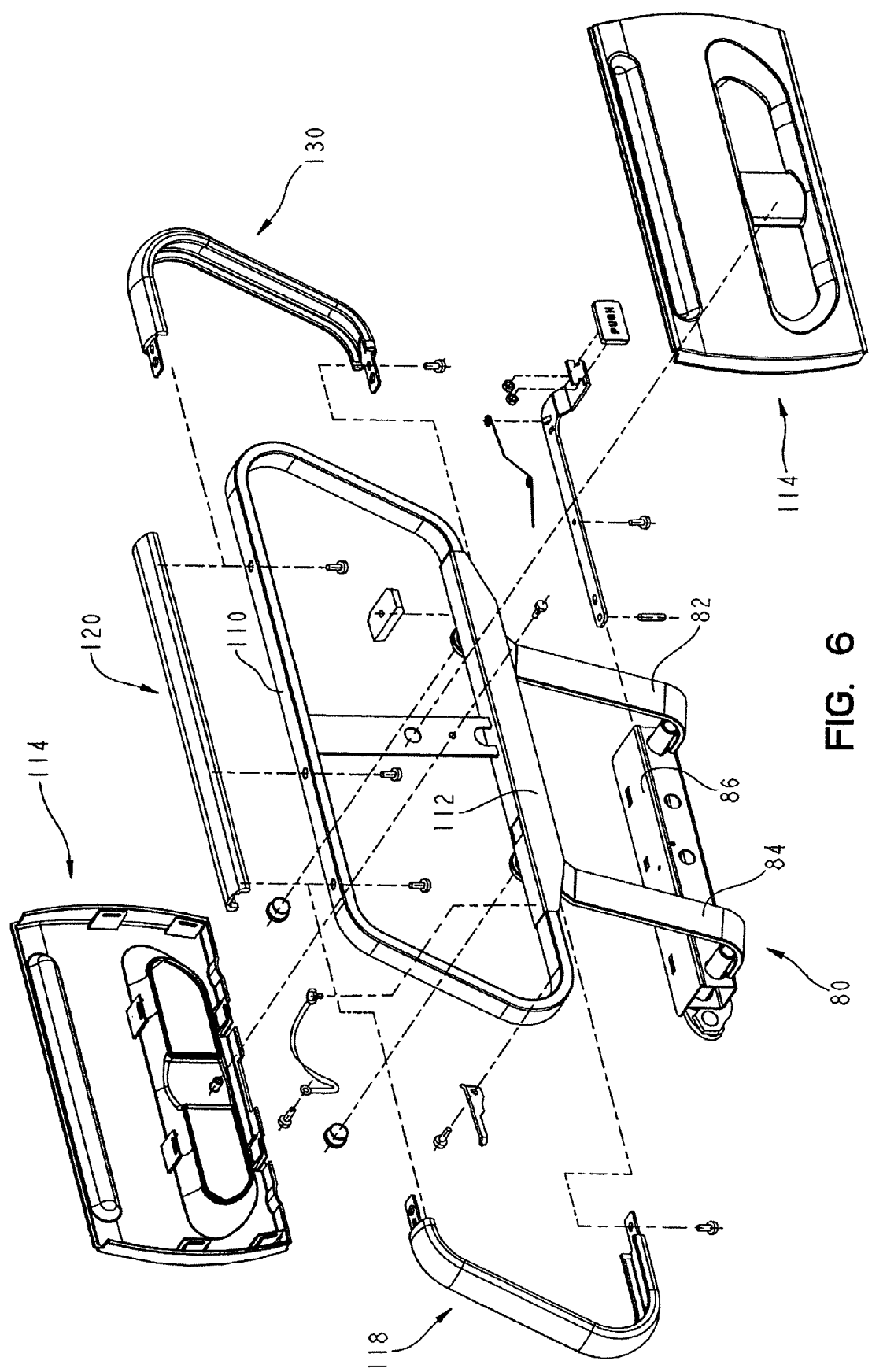
FIG. 6 is an exploded view of the foot end siderail prior to a conversion process.

Sub-frame 28 further includes a symmetric retracting frame cross member 62. As shown in FIG. 5, cross member 62 includes a laterally extending middle portion 64, a pair of downwardly extending walls 66 (only one is shown in FIG. 5) coupled to opposite ends of middle portion 64, and pair of inwardly extending mounting flanges 68 (only one is shown in FIG. 5) coupled to opposite sides of frame 12. According to an alternative embodiment of the present disclosure, the mounting flanges extend outwardly from the bottoms of walls 66 and couple to middle portions 60 of rail bodies 34 and are not coupled to frame 12.

Each rail bar 32 further includes a slide bracket 70 coupled to respective middle portions 60 of rail bodies 34. Slide brackets 70 include a substantially flat metal plate 72 that couples to middle portion 60 of rail body member 34 and a pair of rods 74 that extend from plate 72 and into walls 66.

Foot end siderails 20 and head end siderails 16 each include a rail member 76, 78 and a linkage 80. Linkage 80 includes a plurality of support arms 82, 84 pivotally coupling rail member 76, 78 to a linkage base 86. Linkage bases 86 of foot end siderails 20 are coupled to respective rods 74 of slide bracket 70 to permit sliding on rods 74. This sliding permits lateral movement of linkage bases 86 and the remainder of foot end siderails 20 relative to deck 14.

Figure 2:
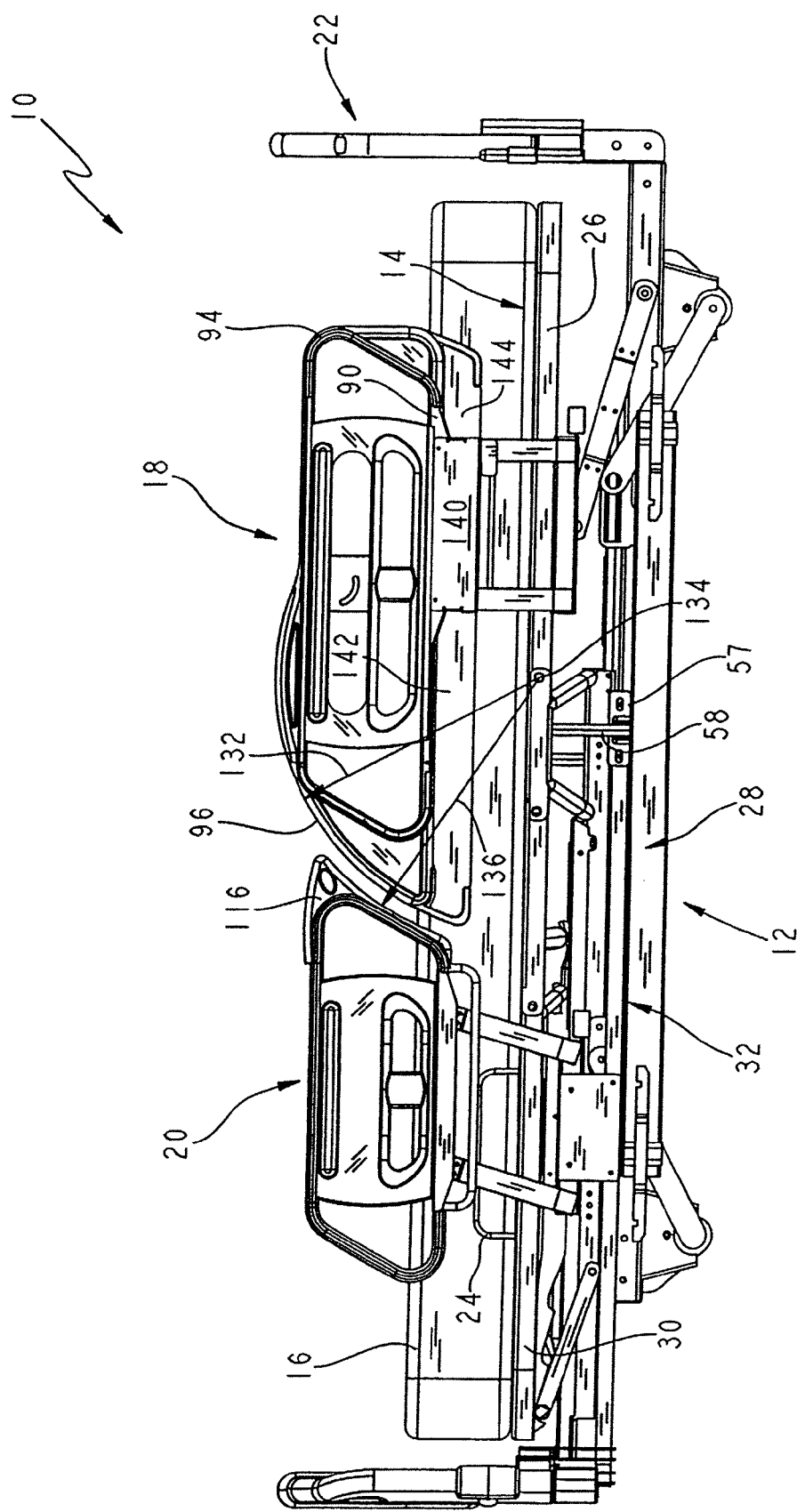
FIG. 2 is a side elevation view of the bed of FIG. 1 showing foot end and head end siderails cooperating to define a curved gap therebetween.
Figure 3:
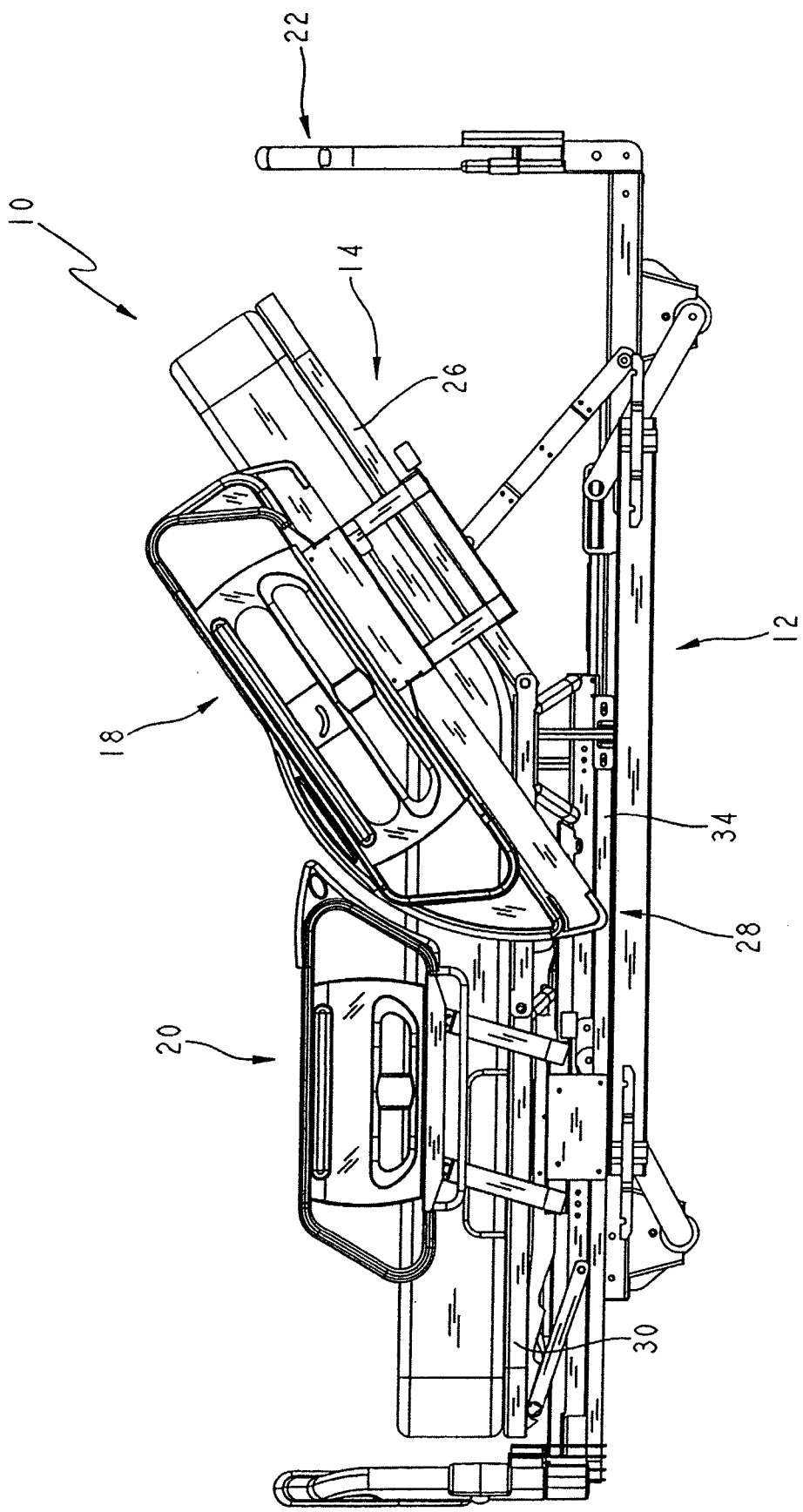
FIG. 3 is a view similar to FIG. 2 showing a head section of the deck tilted.

Foot end siderails 20 are coupled to frame 12 through sub-frame 28 of the patient support 10 rather than deck 14 of the patient support 14 as shown in FIGS. 1 and 2. Therefore, during articulation of foot section 30 of deck 14, foot end siderails 20 remain stationary.

During a non-OEM assembly, foot end siderails 20 are uncoupled for foot section 30 of deck 14. Each lateral end of cross member 62 is then coupled to frame 12 under foot section 30. Rail bars 32 are then coupled to frame 12 by first inserting I.V. sockets 36 over respective I.V. mount posts 40 of frame 12. Frame mounts 58 of pin assemblies 38 are then bolted to deck 14 using the previously unused I.V. socket apertures formed in deck 14. Then body members 34 are bolted to body mounts 57 of pin assemblies 38. In the alternative embodiment, the cross member is then bolted to the respective body members 34 rather than to frame 12.

Next, slide brackets 70 of foot end siderails 20 are slide over rods 74. Slide brackets 70 are then bolted to body members 34 to complete the relocation of foot end siderails 20 from foot section 30 to frame 12 through sub-frame 28. In an OEM application, it is unnecessary to uncouple foot end siderails 20 from foot section 30 because they are never coupled there to begin with.

Head end rail member 76 includes a steel perimeter frame member 88 coupled to respective support arms 82, 84 by a downwardly extending bracket 90, a two-piece plastic body member 92 coupled to perimeter frame member 88, and a set of plastic canes or covers 94, 96, 98 coupled to perimeter frame member 88. Foot end rail member 78 includes a steel perimeter frame member 110 coupled to respective support arms 82, 84 by a downwardly extending bracket 112, a two-piece plastic body member 114 coupled to perimeter frame member 110, and a set of plastic canes or covers 116, 118, 120 coupled to perimeter frame member 110. Preferably, perimeter frame members 88, 110 are substantially parallelogram-shaped having slightly rounded corners. Body members 92, 114 are substantially rectangular and are substantially positioned within interior regions defined by perimeter frame members 88, 110.

In an OEM application, covers 94, 96, 98, 116, 118, 120 are initially coupled to respective frame members 88, 110 at the manufacturing facility. Preferably, end covers 94, 96, 116, 118 are placed over the ends of respective frame members 88, 110. Then, fasteners, such as screws, are used to couple covers 94, 96, 98, 116, 118, 120 to the top and bottom ends of the respective frame members 88, 110. In a retrofit application, the original canes (such as canes 118, 130, 120 shown in FIG. 6) are first removed from respective frame members 88, 110 at the point of use or other location. Then, new covers 94, 96, 98, 116, 118, 120 are coupled to respective frame members 88, 110. The original canes for head end siderail 18 are substantially similar to canes 118, 130, 120 shown in FIG. 6. According to one alternative assembly process, original canes 116, 120 are recoupled to frame member 110 with new cane 118.

Cane 94 provides head end siderail 18 with a head end that is substantially vertical and perpendicular relative to a plane defined by deck 14. Cane 96 provides head end siderail 18 with a foot end shaped as a convex arc. Cane 98 continues this convex arc over body member 92 toward the head end. Preferably, this convex arc has a radius of curvature 132 equal to the distance between the tangent of the convex arc to a pivot point 134 of head section 26 of deck 14 as shown in FIG. 2. Preferably, this distance is about 17.5 inches (444 millimeters).

Cane 116 provides foot end siderail 20 with a head end shaped as downwardly facing concave arc. The concave arc is sized and shaped to provide a gap of constant width between cane 96 and cane 116. Preferably, this gap is about 1.0 inches (25.4 millimeters). According to another embodiment, this gap is less than or equal to 2.4 inches (60 millimeters). Preferably, this concave arc has a radius of curvature 136 equal to the distance between the tangent of the concave arc to pivot point 134 of head section 26 of deck 14. Preferably, this distance is about 18.5 inches (470 millimeters).

Head end siderail 18 is coupled to deck 14 that articulates. Foot end siderail 20 is coupled to frame 12 via sub-frame 28 that does not articulate. The convex arc of cane 96 and the concave arc of cane 116 complement one another during rotation of head section 26 of deck 14 to maintain the gap at the constant width between cane 96 and cane 116 as the patient support articulates.

Figure 7:
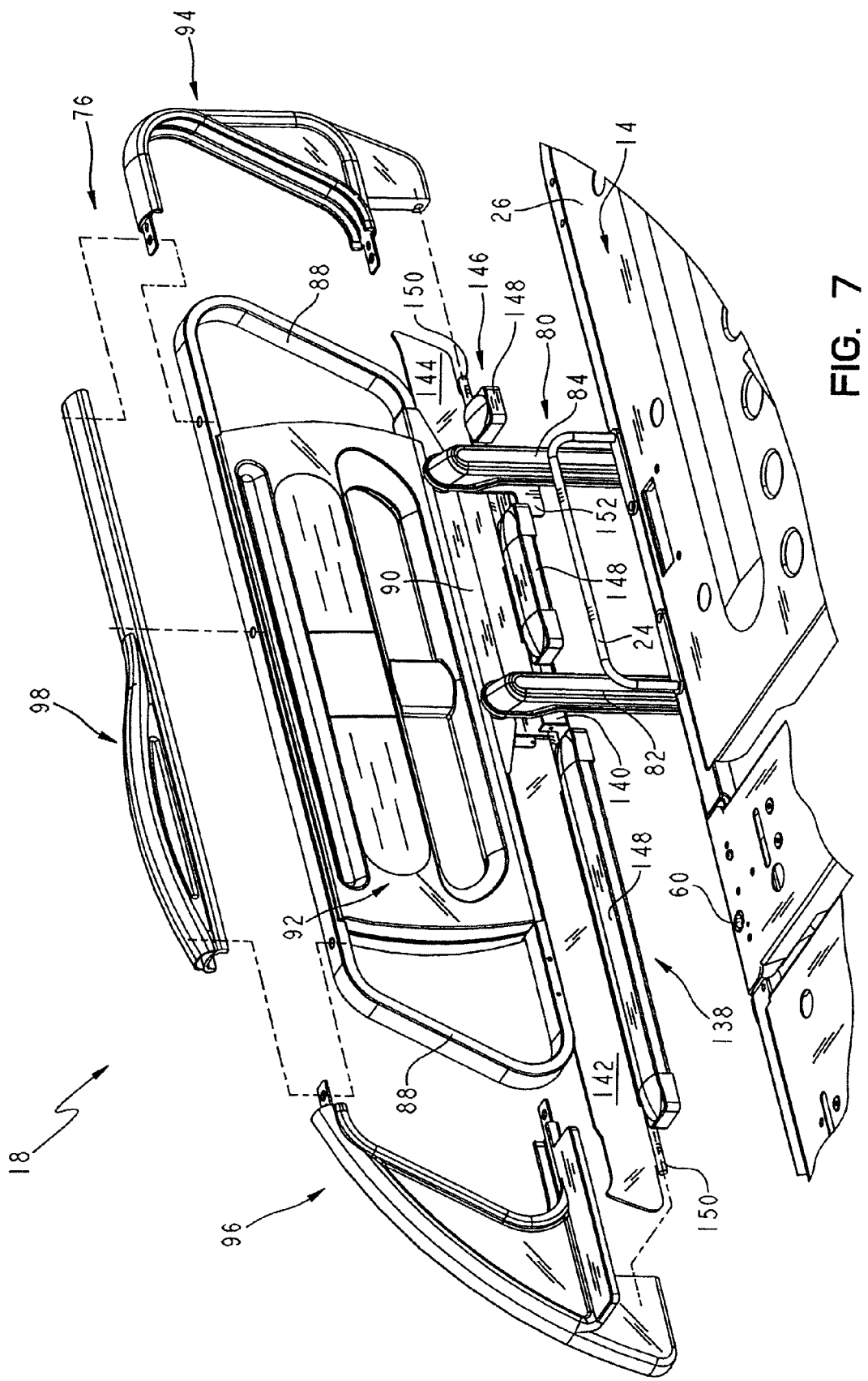
FIG. 7 is a partial exploded view of the head end siderails after the conversion process showing the siderails including a rail member, a pair of rail links rotatably coupling the rail member to the head section of the deck to permit movement of the rail member between raised and lowered positions, and a bail pivotably coupled to a lower edge of the rail member.

As shown in FIG. 7, head end siderail 18 also includes a bail assembly 138 coupled to bracket 90 of rail member 76. Bail assembly 138 includes a bracket 140 coupled to an outer wall of bracket 90, a pair of plates 142, 144 coupled to bracket 140 and canes 94, 96, and a bail 146 located below rail member 76 and canes 94, 96. Bail 146 includes a plurality of bail flaps 148 and a bail rod 150 pivotably coupled to bracket 140 and canes 94, 96. Each bail flap 148 defines a plane and is fixedly coupled to bail rod 150 so as to be coplanar with each of the other bail flaps 148. Bail flaps 148 rotate about a longitudinal axis with bail rod 150 to assume first and second positions. By virtue of each of bail flaps 148 being fixedly coupled to bail rod 150, bail flaps 148 rotate as one.

Figure 8:
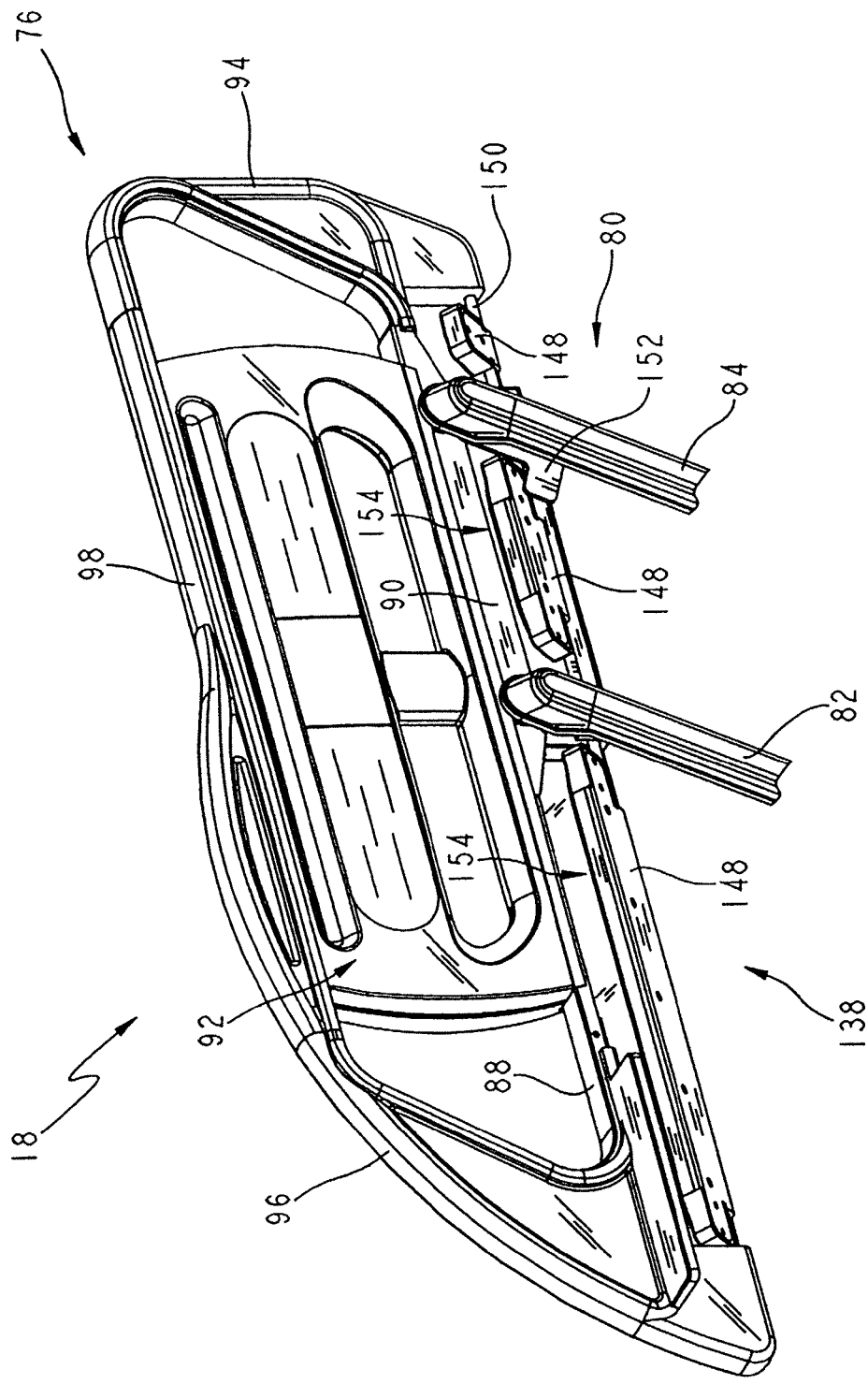
FIG. 8 is a view similar to FIG. 7 showing the siderail in an intermediate position with a flange coupled to one of the rail links contacting the bail to rotate the bail upwardly during movement of the rail member to the lowered position.
Figure 9:
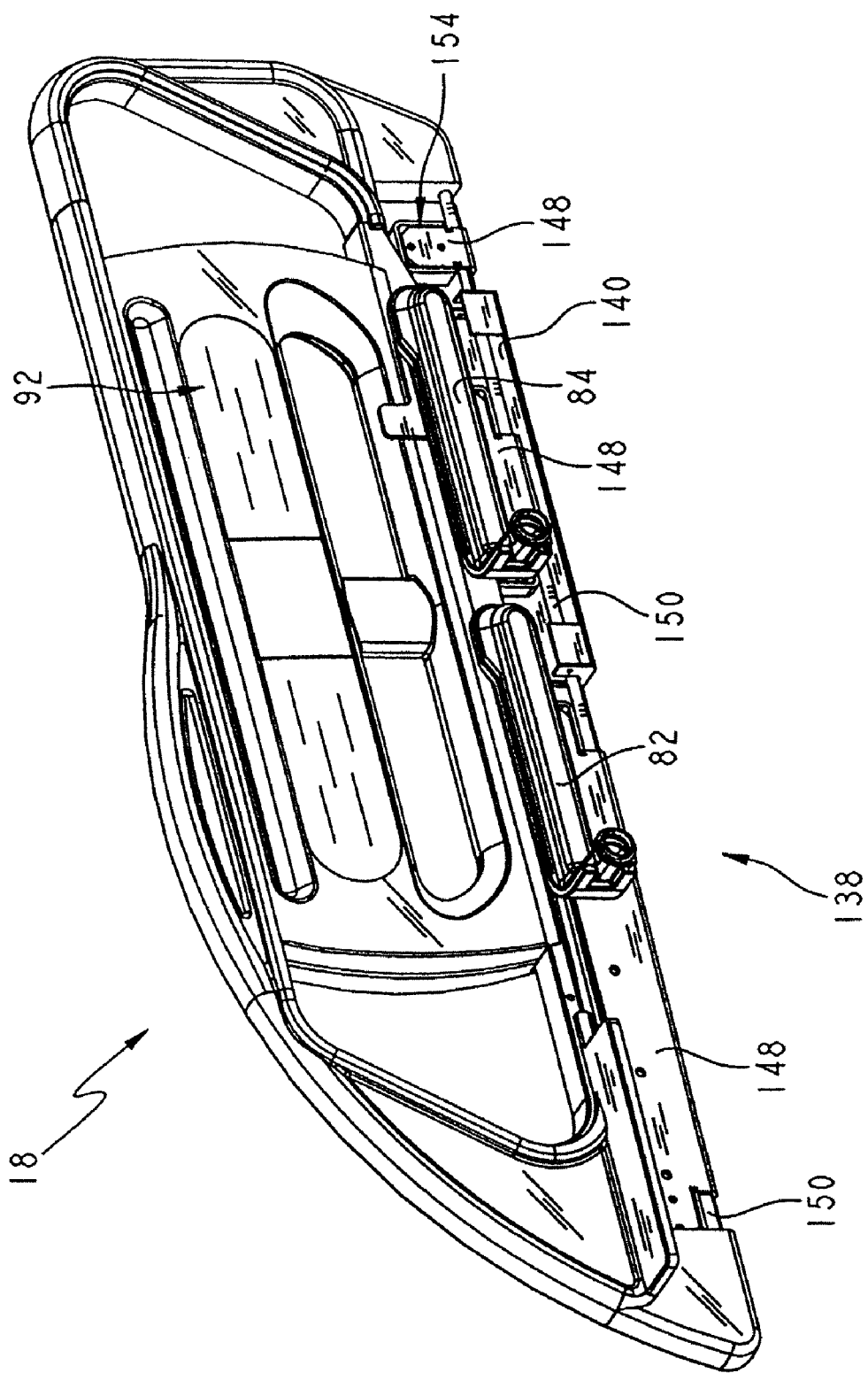
FIG. 9 is a view similar to FIG. 7 with the deck removed showing the siderail in the lowered position with the flange urging the bail to a raised position.
Figure 10:
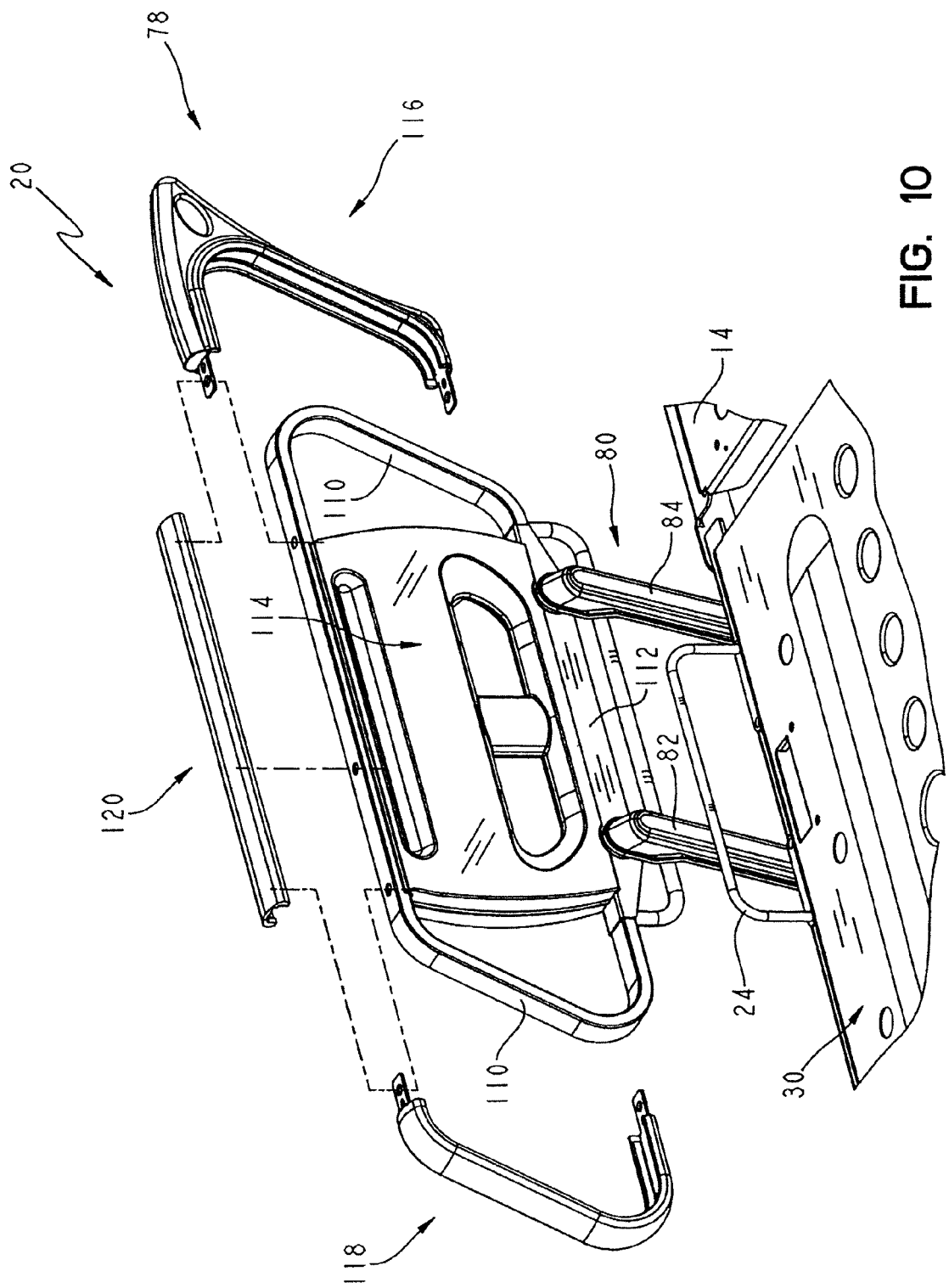
FIG. 10 is a partial exploded view of the foot end siderail after the conversion process.
Figure 11:
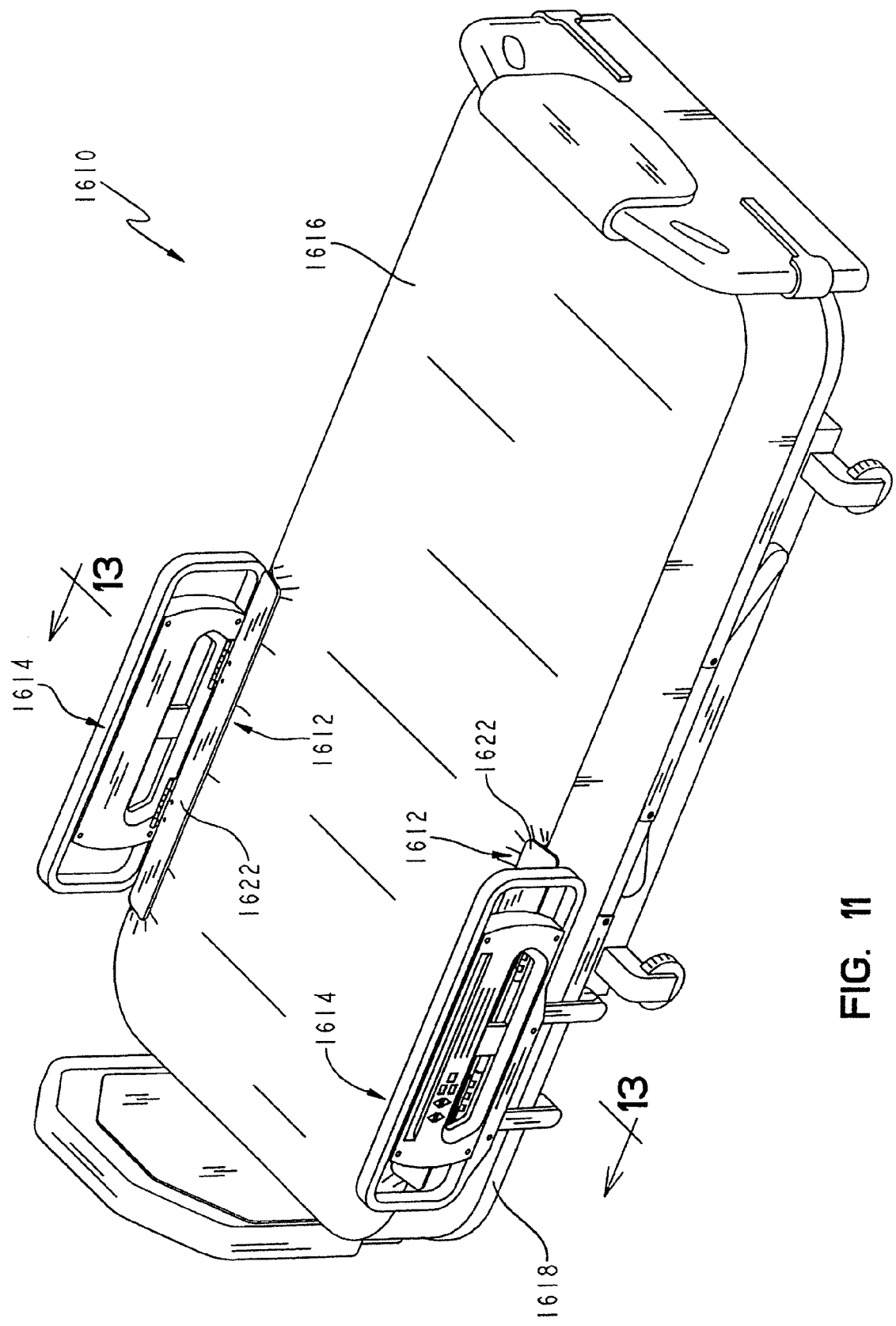
FIG. 11 is a perspective view of another alternative embodiment patient support showing the patient support including flaps attached to the siderails.

In a first position, as shown in FIG. 7, bail flaps 148 extend outward from plates 142, 144. When head end siderail 18 is moved toward a lowered position, as shown in FIG. 8, bail flaps 148 are pushed up by a bracket 152 and moved toward plates 142, 144. When head end siderail 18 is moved to the lowered position, as shown in FIG. 9, bail flaps 148 are substantially vertical and are positioned in pockets 154 defined in bail 146. Bail 146 is preferably spring loaded or otherwise biased toward the first position. Thus, when head end siderail 18 is returned to the raised position, bail flaps 148 are returned to the first position shown in FIG. 7. When in the first position, bail flaps 148 reduce a gap between head end siderail 18 and mattress 16 positioned on deck 14.

Head end siderail 18 is lowered by clocking head end siderail 18. Clocking head end siderail 18 causes bracket 152 to abut bail flap 148. As head end siderail 18 continues to lower, bracket 152 continues to raise relative to bail 146. Raising bracket 152 urges bail flap 148 and bail rod 150 to rotate and ultimately assume the first position of bail 146. When bail 146 is in first position, head end siderail 18 can move without bail 146 contacting mattress 16 or deck 14.

Preferably an OEM headboard (shown in U.S. Pat. Nos. 6,320,510 and 6,321,878) is similarly replaced with headboard 22 that presents sides substantially perpendicular to the plane defined by deck 14 as shown in FIG. 1. The sides of headboard 22 and head end of head end siderail 18 are substantially parallel when patient support 10 is in the reclined position. Headboard 22 is sized to maintain a gap between headboard 22 and head end of head end siderail 18 of greater than 11.82 inches (300 millimeters).

To removably couple headboard to frame 12, an adaptor bracket 156 is provided as shown in FIG. 4. Bracket 156 includes a body 158, first and second frame attachments 160, 162 and two headboard attachments 164. Body 158 is preferably a piece of an angle iron sized and shaped to sit upon a head member 166 of frame 12. Head member 166 includes a two headboard posts 168 and a two I.V. mounts 170.

First and second frame attachments 160, 162 are cylindrical and have apertures defined therein. The apertures are sized to receive headboard posts 168 of head member 166 therein. Bracket 156 is placed over head member 166 such that each of headboard posts 168 is received within one of the apertures of first and second frame attachments 160, 162. When so placed, cylindrical headboard attachments 164 are substantially vertical.

Headboard 22 includes a pair of mount apertures formed on a bottom edge thereof. The mount apertures are sized, shaped, and spaced to simultaneously receive both headboard attachments 164 therein. For installation, headboard 22 is positioned such that each mount aperture is positioned above a headboard attachment 164 and then headboard 22 is lowered such that headboard attachments 164 enter the mount apertures.

Figure 12:
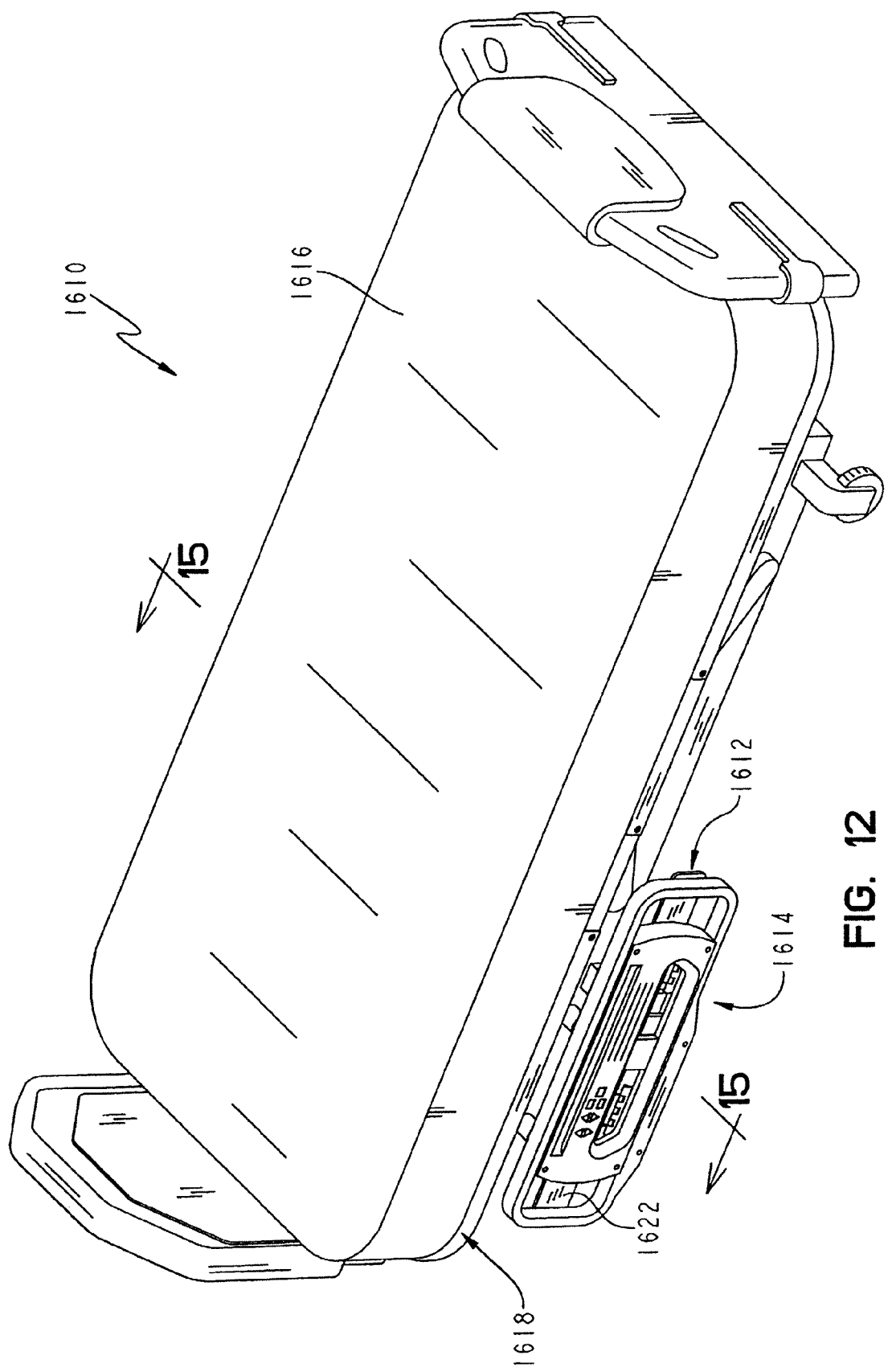
FIG. 12 is a perspective view of the patient support of FIG. 11 showing the siderails in a lowered position.
Figure 13:
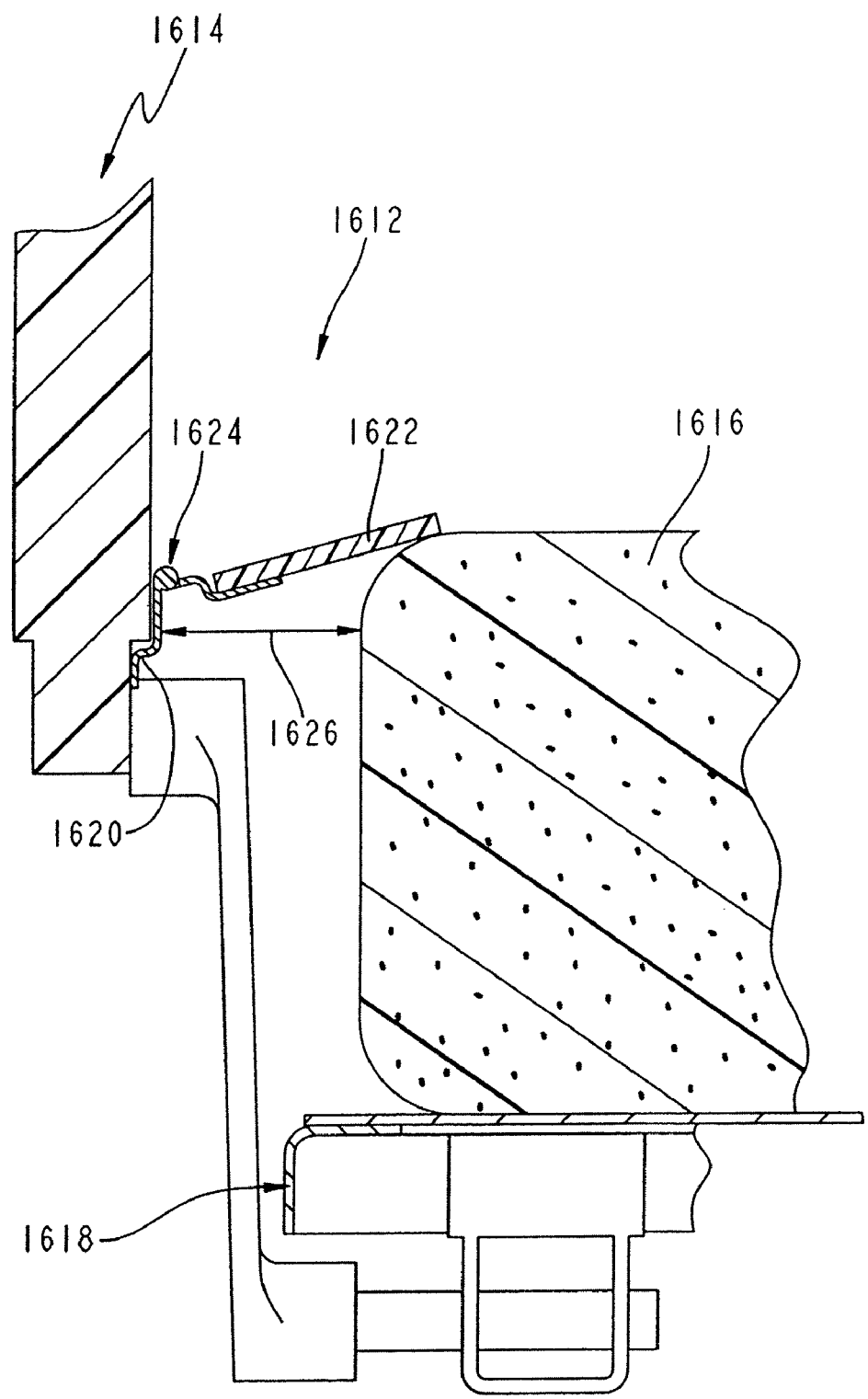
FIG. 13 is a cross sectional view of the patient support of FIG. 11 taken along the line 13-13 of FIG. 11.
Figure 14:
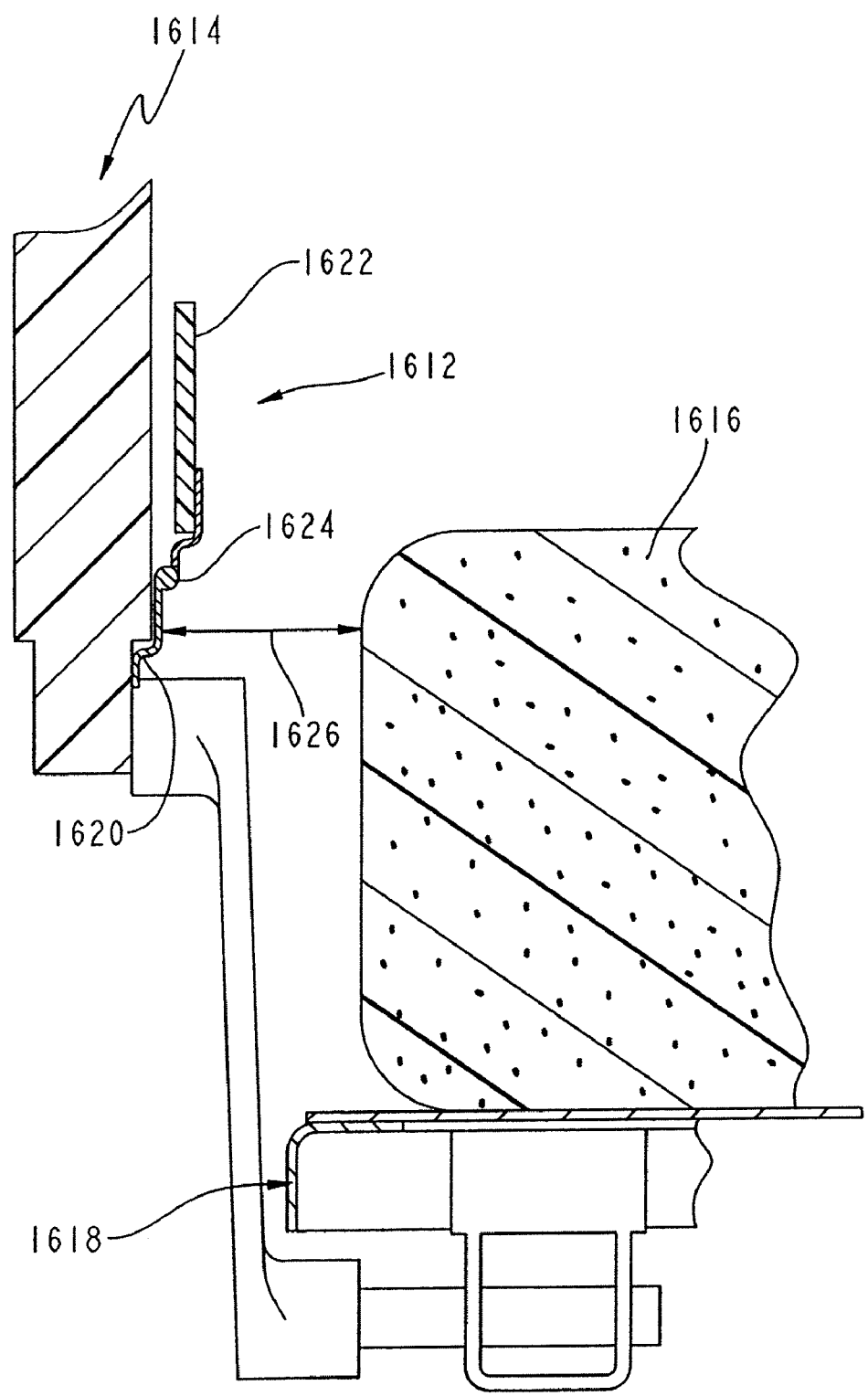
FIG. 14 is a view similar to FIG. 13 showing the flap in a raised position.
Figure 15:
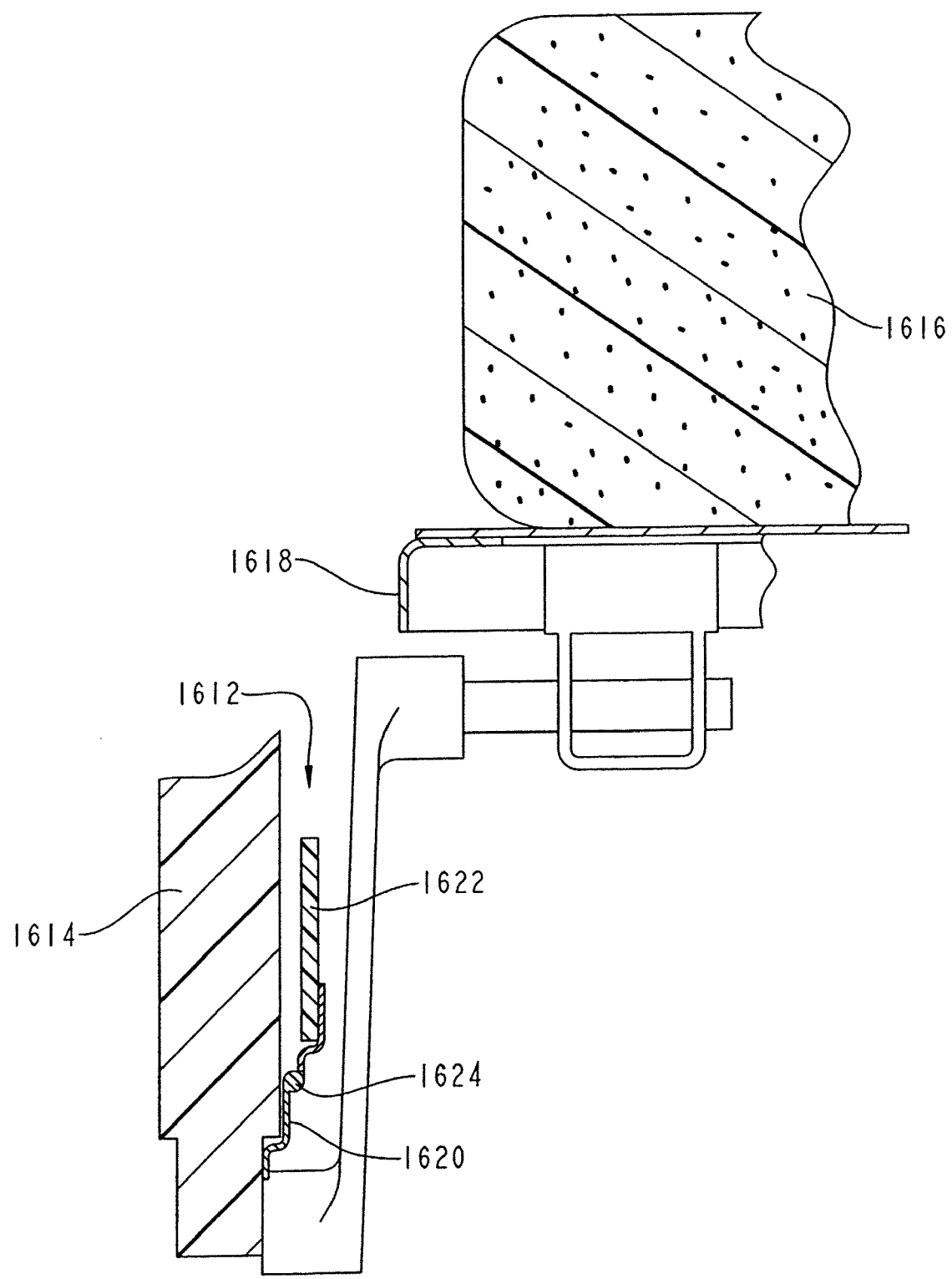
FIG. 15 is a cross sectional view of the patient support of FIG. 11 taken along the line 15-15 of FIG. 12.
Figure 16:
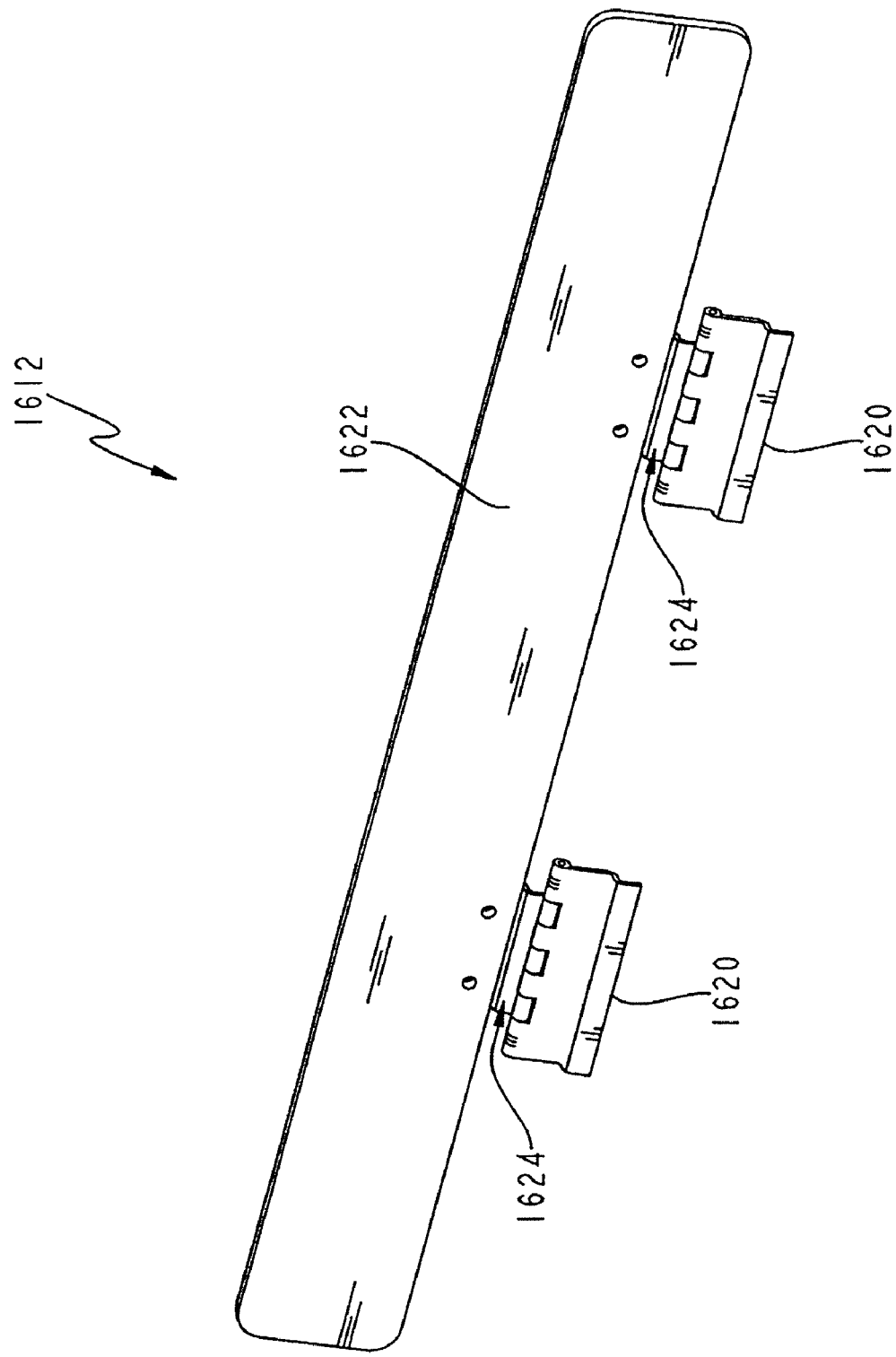
FIG. 16 is a perspective view of the flap of FIG. 11 showing the side of the flap that faces the siderail.

An alternative embodiment patient support 1610 is shown in FIGS. 11-16. Patient support 1610 includes a deck 1618, a mattress 1616 positioned on deck 1618, siderails 1614 coupled to deck 1618, and flaps 1612 coupled to siderails 1614 and positioned on mattress 1616. Flaps 1612 include base plates 1620, flap members 1622, and hinges 1624. Base plates 1620 are fixedly coupled to siderails 1614 and flap members 1622 are hingedly coupled to base plates 1620 via hinges 1624. Each flap 1612 is configured to block a gap 1626 defined between siderail 1614 and mattress 1616. Flaps 1612 span gap 1626 when siderails 1614 are in a raised position. As shown in FIG. 13, when siderail 1614 is raised, flap member 1622 assumes a down position and contacts mattress 1616. Lowering siderails 1614 causes flap members 1622 to rotate via hinges 1624 relative to base plate 1620 and assume a raised position as shown in FIGS. 12 and 15. When in the lowered position, siderails 1614 and flap 1612 permit patient entry and egress. When siderails 1614 are raised, flap member 1622 remains in the raised position, as shown in FIG. 14, until a force (applied by gravity, a caregiver, or patient) acts upon flap member 1622 and it falls to the lowered position shown in FIG. 13. Alternatively, flap member 1622 contacts mattress 1616 as it raises and changes position as siderail 1614 changes position.

Figure 17:
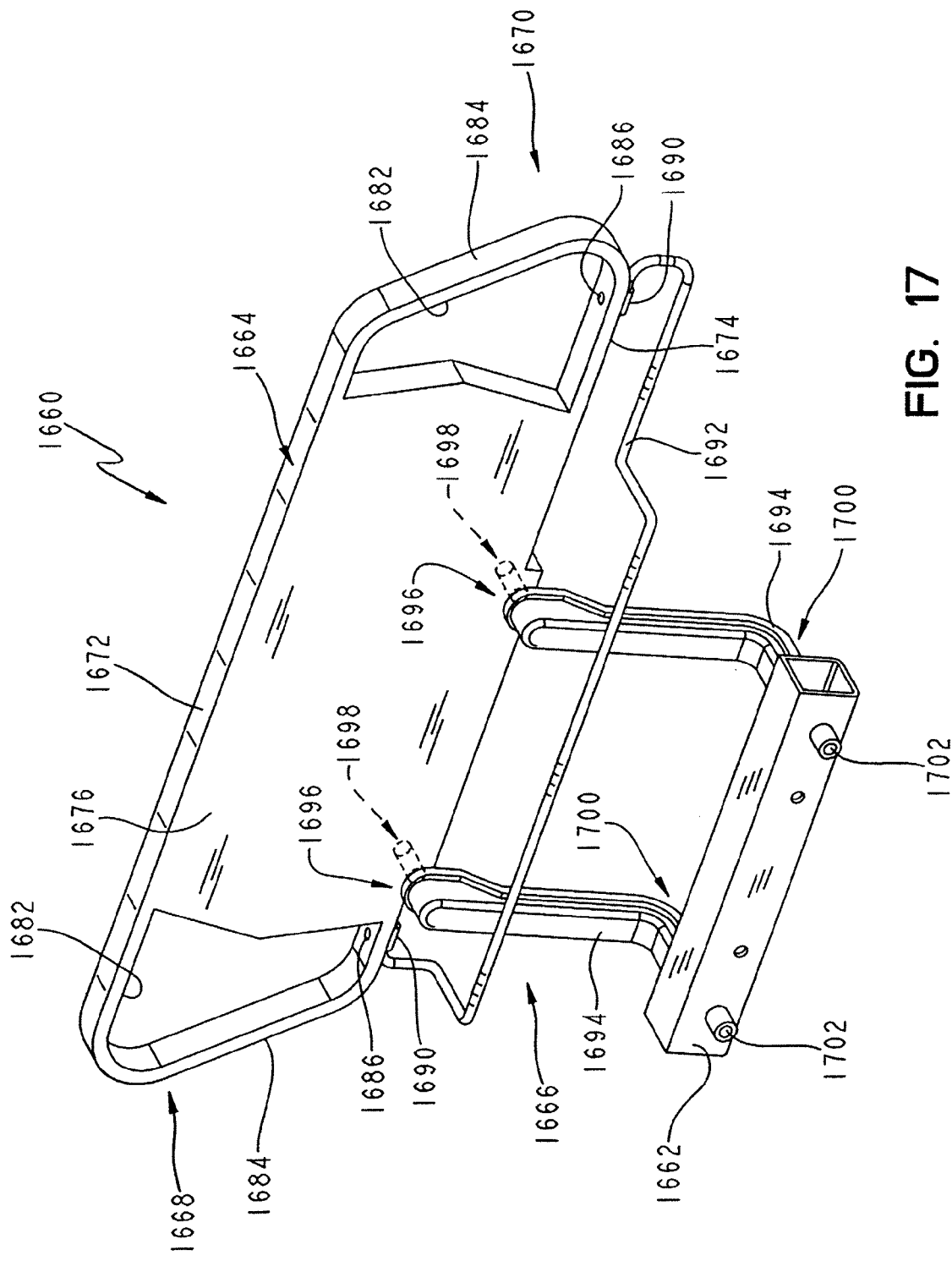
FIG. 17 is a perspective view of another alternative embodiment siderail showing a drop down bar.
Figure 18:
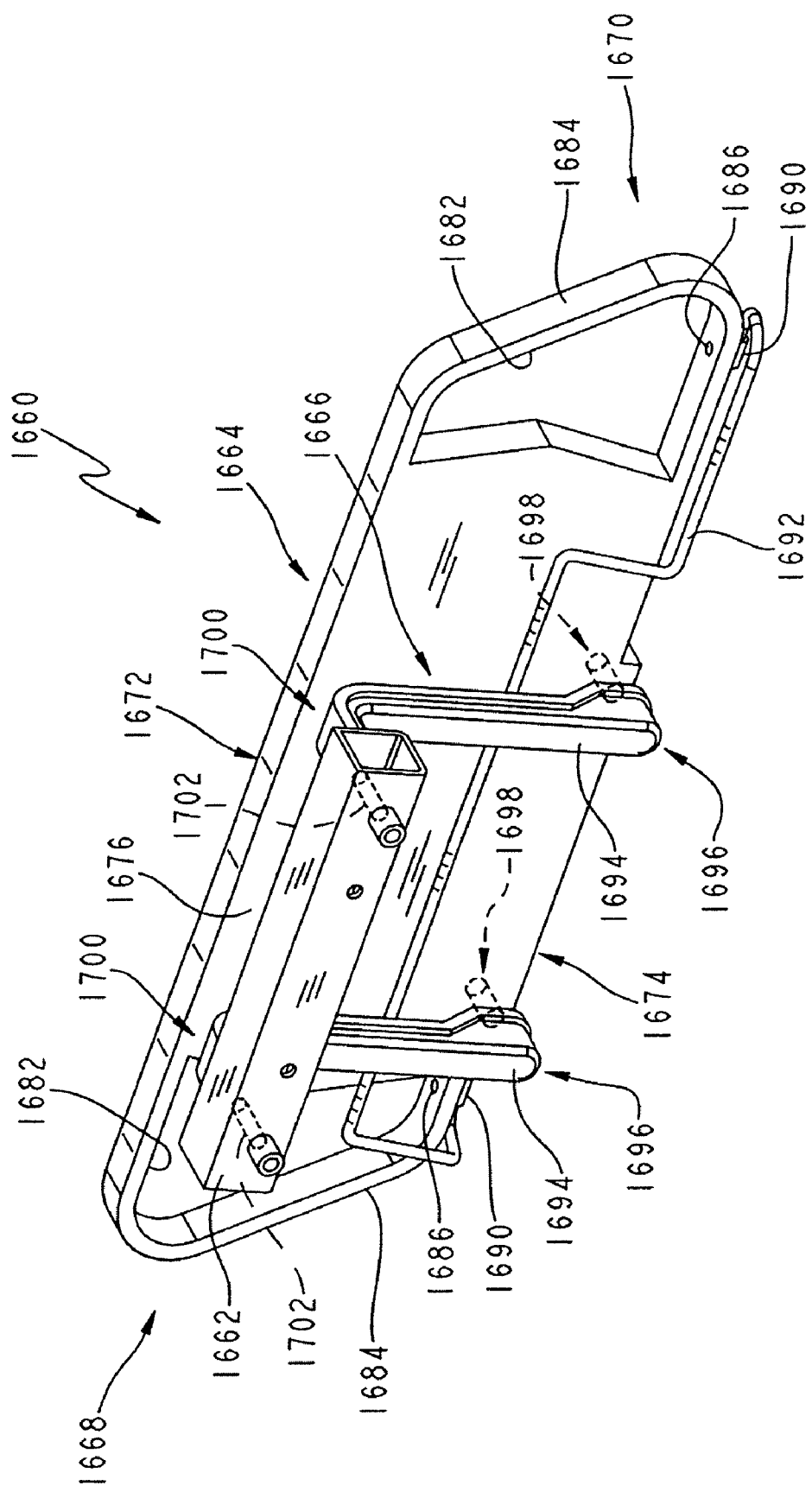
FIG. 18 is a perspective view of the siderail of FIG. 17 in a lowered position.

An alternative embodiment siderail 1660 is shown in FIGS. 17-21 including a rail extension 1692. Siderails 1660 are configured to be coupled to a deck (not shown). Each siderail 1660 is configured to move between raised blocking positions, as shown in FIG. 17, and lowered egress positions, to permit entry and egress of patients into and out of a patient support, as shown in FIG. 18. Each siderail 1660 includes a rail member 1664, linkage assembly 1666, and a deck mount 1662 configured to mount to the underside of a deck. Linkage assembly extends between rail member 1664 and deck mount 1662 and permits rail member 1664 to be moved between the raised and lowered positions.

Rail member 1664 is an elongated, substantially flat piece of metal, plastic, or combination thereof. Rail member 1664 has two ends 1668, 1670, an upper side 1672, a lower side 1674, an inner side 1676 that faces a mattress (not shown), and an outer side 1680. Rail member 1664 also has apertures 1682 defined therein near each end 1668, 1670. Because of the clearance provided by apertures 1682, rail member 1664 define relatively thin handles 1684 suitable for grasping by a user.

The bottom of each handle 1684 further has a void 1686 defined therein. Void 1686 is sized to receive a screw, bolt, rivet, or other suitable fastener 1688 that couples a rail extension holder 1690 to rail member 1664. Rail extension 1692 is rotatably coupled to rail extension holder 1690. Preferably, rail extension 1692 is a shaped metal rod as shown in FIGS. 17-21. Rail extension holder 1690 allows rail extension 1692 to assume a plurality of positions relative to rail member 1664 during raising and lower of rail member 1664.

Linkage assembly 1666 is attached to inner side 1676 of rail member 1664. Linkage assembly 1666 includes two link members 1694. Link members 1694 are substantially identical angled metal or plastic pieces. First ends 1696 of link members 1694 have axles 1698 extending therefrom. Axles 1698 rotatably couple to rail members 1664 so as to rotatably couple link members 1694 to rail members 1664. Likewise, second ends 1700 of link members 1694 have axles 1702 extending therefrom. Axles 1702 rotatably couple to deck mount 1662.

Figure 19:
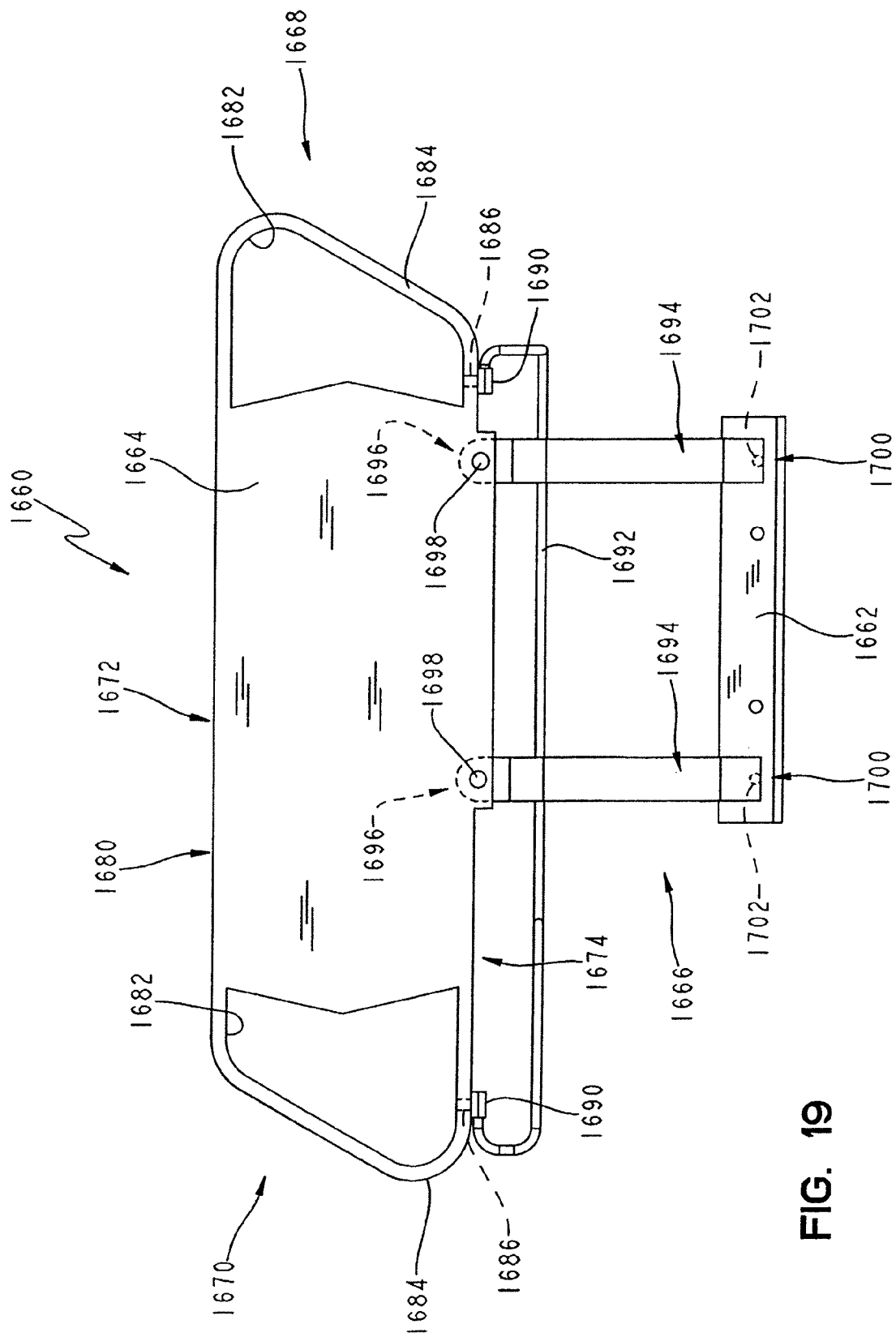
FIG. 19 is a side elevation view of the siderail of FIG. 17.
Figure 20:
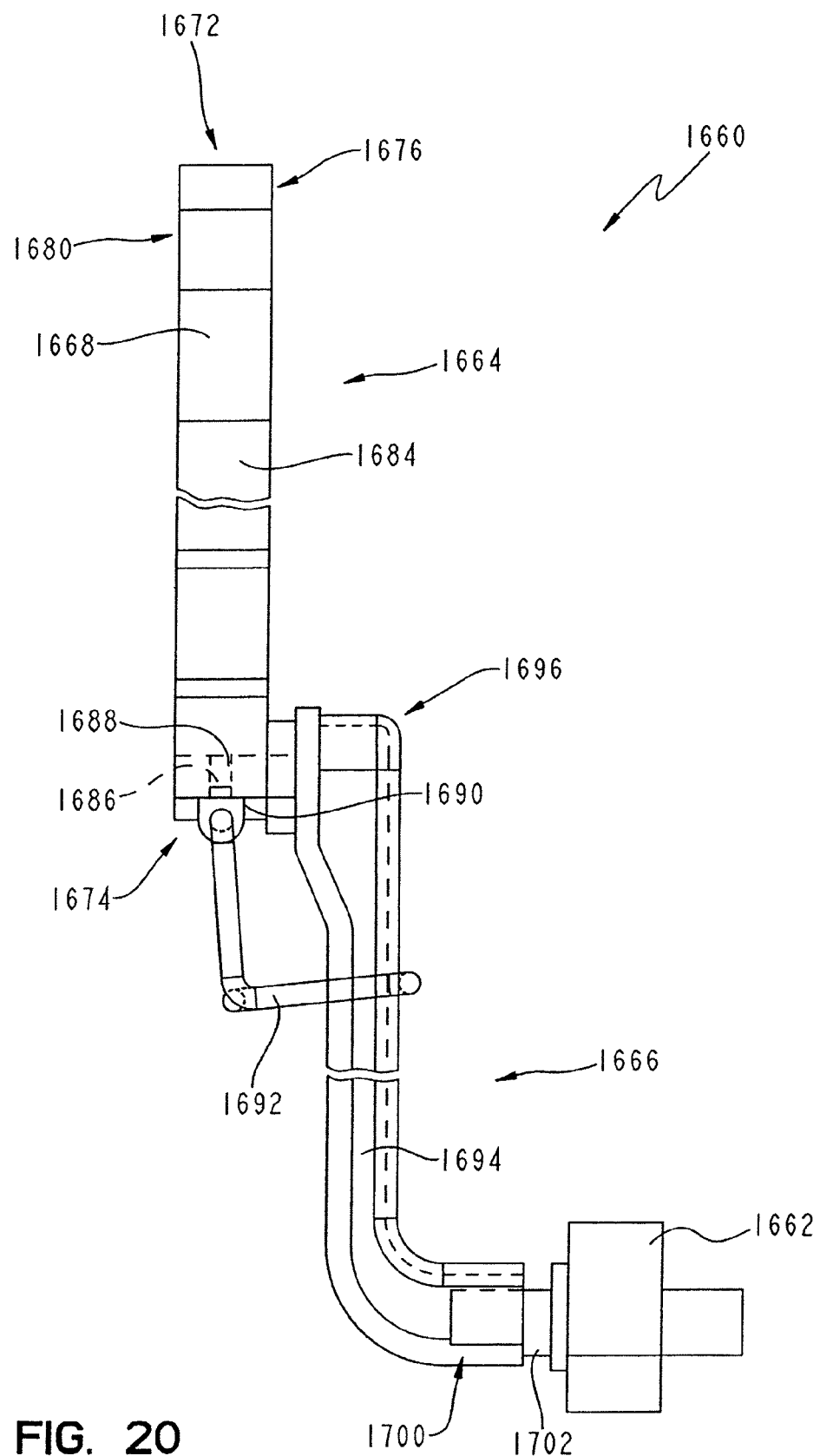
FIG. 20 is a side elevation view of the siderail of FIG. 17 shown perpendicular to the view of FIG. 19.
Figure 21:
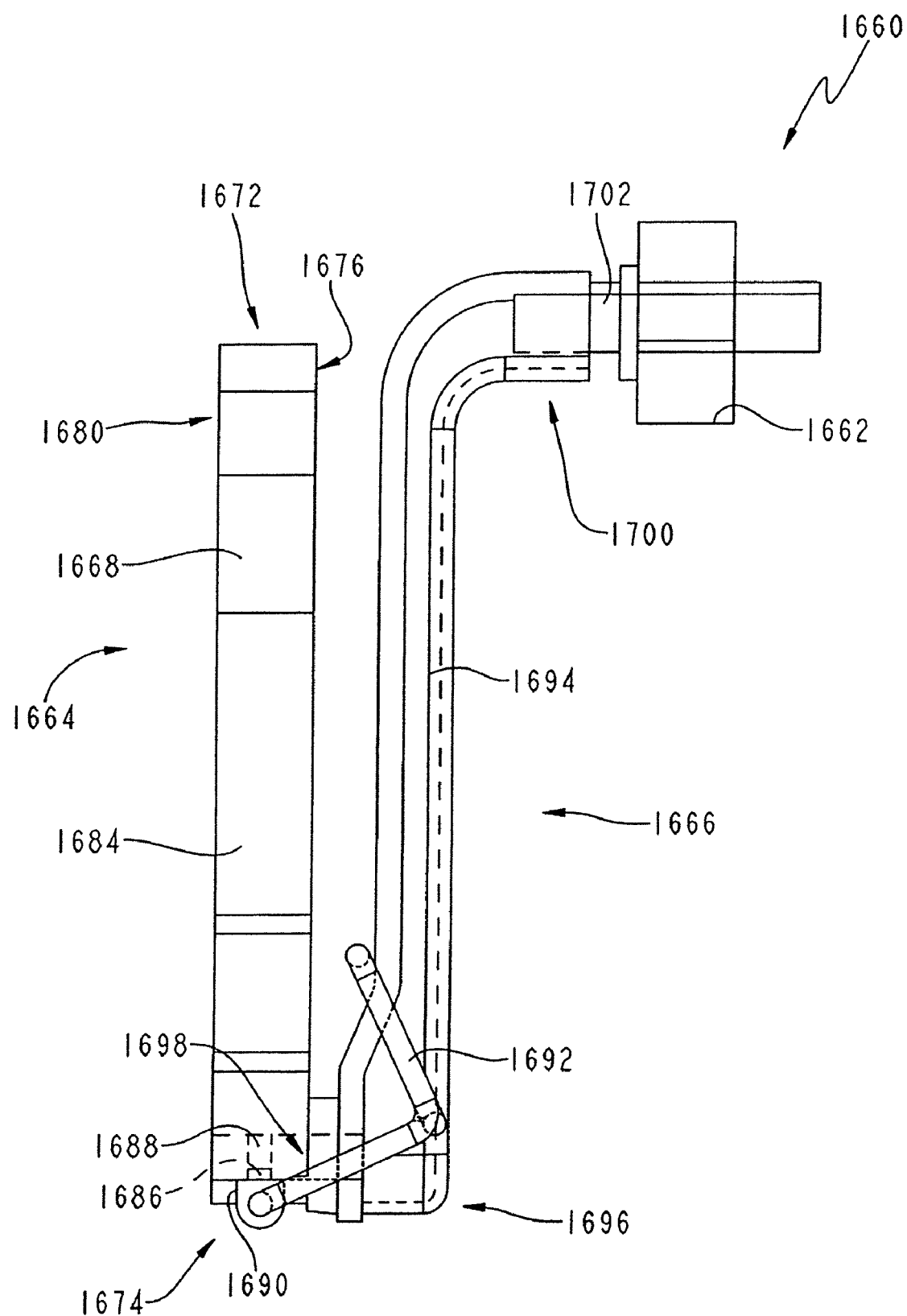
FIG. 21 is a side elevation view of the siderail of FIG. 18.
Figure 22:
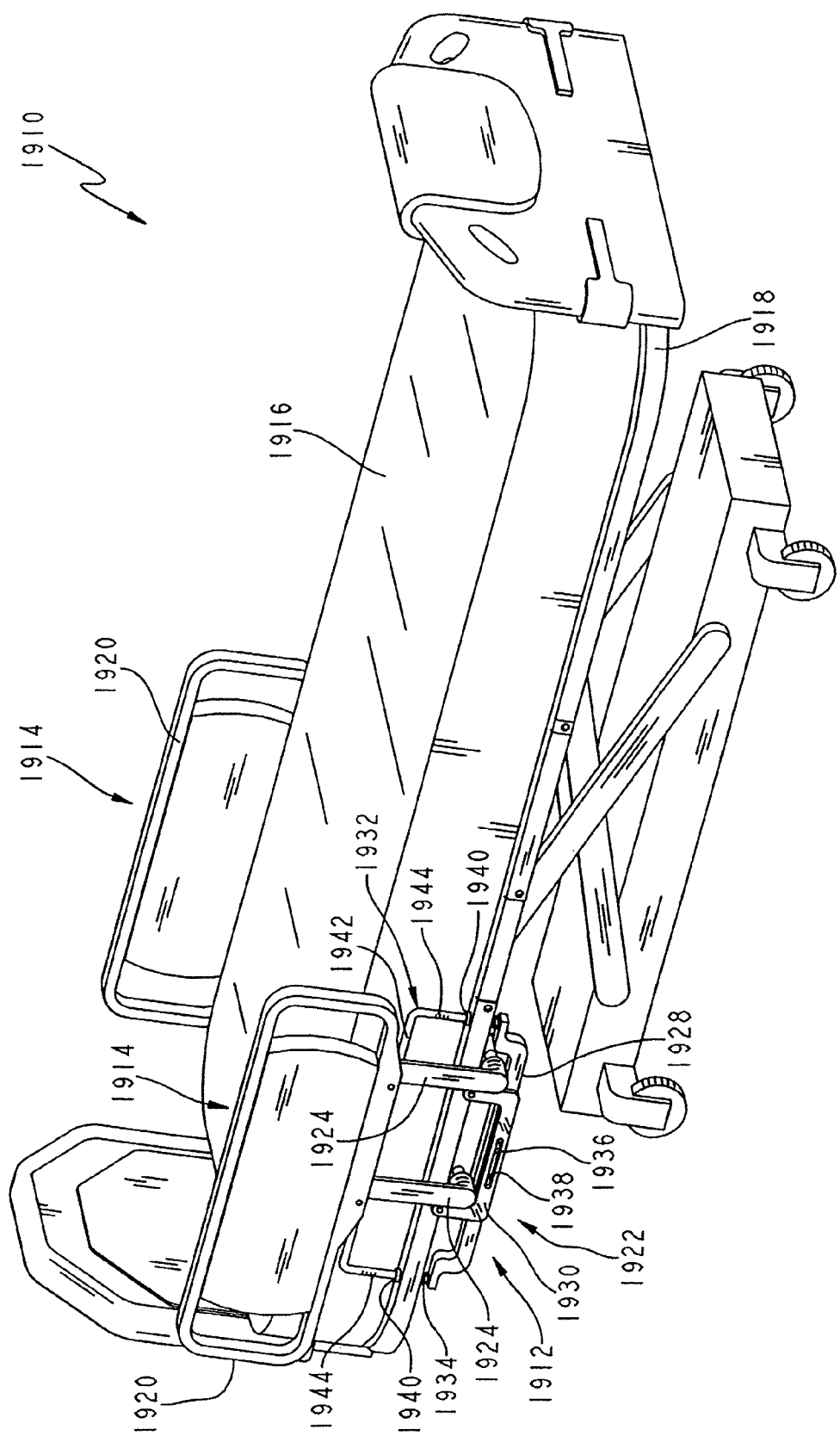
FIG. 22 is a perspective view of another alternative embodiment patient support showing the patient support including mattress retainers.

Rail member 1664 may assume a plurality of positions relative to deck 1662 such as a raised position, shown in FIGS. 17, 19 and 20, a lowered position, shown in FIGS. 18 and 21, and intermediate positions. When rail member 1664 is in the raised position, rail extension 1692 is able to assume a lowered position hanging from rail member 1664. Rail extension 1692 blocks a gap defined between rail member 1664 and a mattress (not shown). When rail member 1664 is lowered, link members 1694 contact rail extension 1692. After initial contact between rail extension 1692 and link member 1694, further lowering of rail member 1664 causes rail extension 1692 to rotate within extension holder 1690 towards a raised position shown in FIG. 18. Thus, rail extension 1692 does not impede the movement of rail member 1664 between the raised and lowered positions. When rail member 1664 is in a fully lowered position, rail extension 1692 is in a fully raised position relative to rail member 1164. When rail extension 1692 is not in a fully lowered position, the rotational position of rail extension 1692 is dictated by contact with link members 1694 and contact between rail extension 1692 and link members 1694 remains constant.

Figure 23:
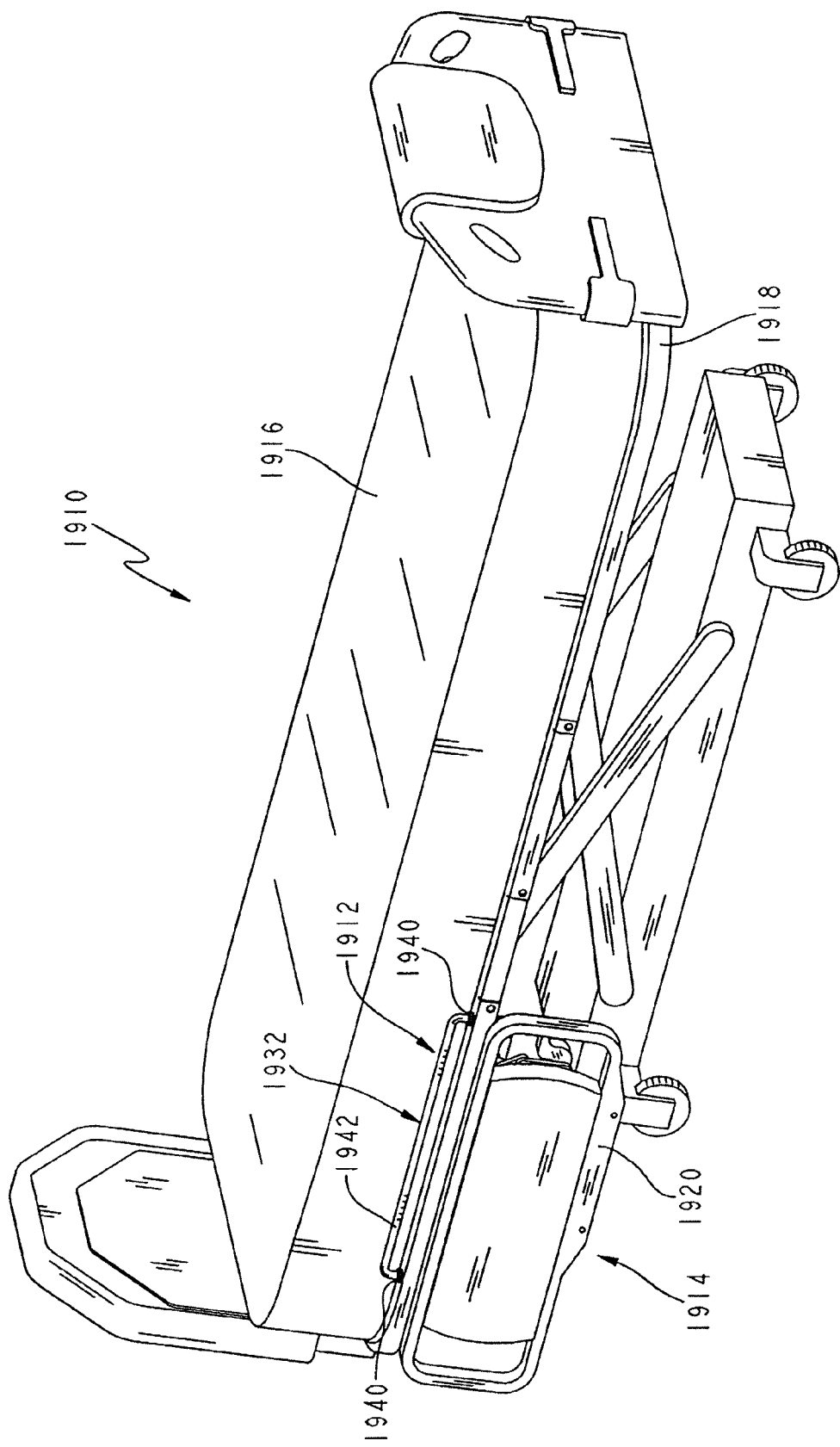
FIG. 23 is a perspective view of the patient support showing a siderail in a lowered position.
Figure 24:
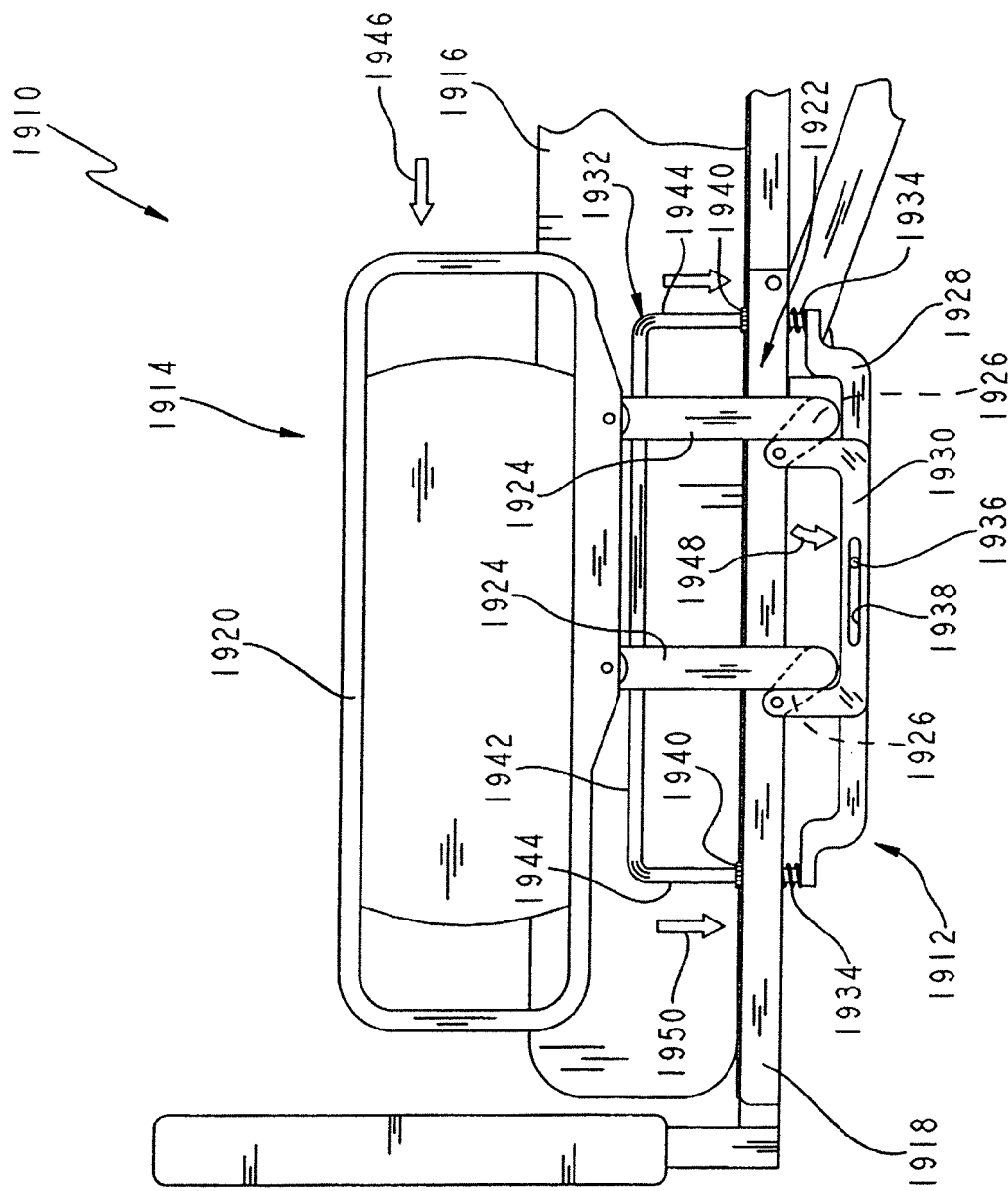
FIG. 24 is a side elevation view of the siderail showing the mattress retainers.

Another embodiment patient support 1910 is shown in FIGS. 22-25. Patient support 1910 includes mattress retainers 1912 similar to mattress retainers 1862, siderails 1914, a mattress 1916, and a deck 1918. Siderails 1914 include rail members 1920 and linkages 1922 that couple rail members 1920 to deck 1918. Linkages 1922 include two linkage members 1924 and lever members 1926 fixedly coupled to each linkage member 1924. As shown in FIG. 24, mattress retainers 1912 include base members 1928, height adjust sliders 1930 slidably coupled to base members 1928, retainer members 1932 fixedly coupled to base members 1928 and slidably coupled to deck 1918, and springs 1934 that surround portions of retainer members 1932.

Connector pins 1936 are provided that are positioned in connector voids 1938 formed in height adjust sliders 1930 to slidably couple base member 1928 to slider 1930. Height adjust sliders 1930 are rotatably coupled to lever members 1926. Deck 1918 has a pair of apertures 1940 defined therein through which retainer member 1932 extends.

Retainer members 1932 are preferably rigid U-shaped metal wires or rods. A base 1942 of U-shaped retainer member 1932 is positioned above deck 1918 so as to allow tines 1944 of U-shaped retainer member 1932 to extend through apertures 1940 of deck 1918 and cores of coil springs 1934 and couple to base member 1928. Each mattress retainer 1912 is configured to limit or block a gap between siderail 1914 and mattress 1916. Mattress retainers 1912 achieve the limiting of gaps by securing the positioning of mattress 1916. Mattress retainers 1912 engage sides of mattress 1916 to prevent lateral mattress 1916 shifting. Furthermore, retainers 1912 block the compression of the upper corners of mattress 1916 when a patient lies near siderail 1914. According to alternative embodiments of the present disclosure, retainers are provided adjacent the foot end siderails, if any.

Mattress retainers 1912 are configured to retract or lower when siderails 1914 are moved to a lowered position as shown in FIG. 23. By lowering retainer 1912 when siderail 1914 is lowered, retainer 1912 no longer presents an obstacle to the entry or egress of a patient.

As shown in FIG. 24, to lower siderail 1914 from a raised siderail position, rail member 1920 is urged in direction 1946 and "clocks" toward the lowered position. Movement of siderail 1914 in direction 1946 causes linkage members 1924 to rotate counterclockwise in direction 1948. Rotation of linkage members 1924 in a counterclockwise direction causes attached lever members 1926 to rotate therewith. Rotation of lever members 1926 cause attached height adjustment sliders 1930 to move therewith. Height adjustment sliders 1930 are able to slide horizontally relative to base members 1928 because of elongated connection voids 1938 of sliders 1930 and connector pins 1936 of base members 1938 so that only the vertical component of the rotation of lever members 1926 is translated to base members 1938.

Figure 25:
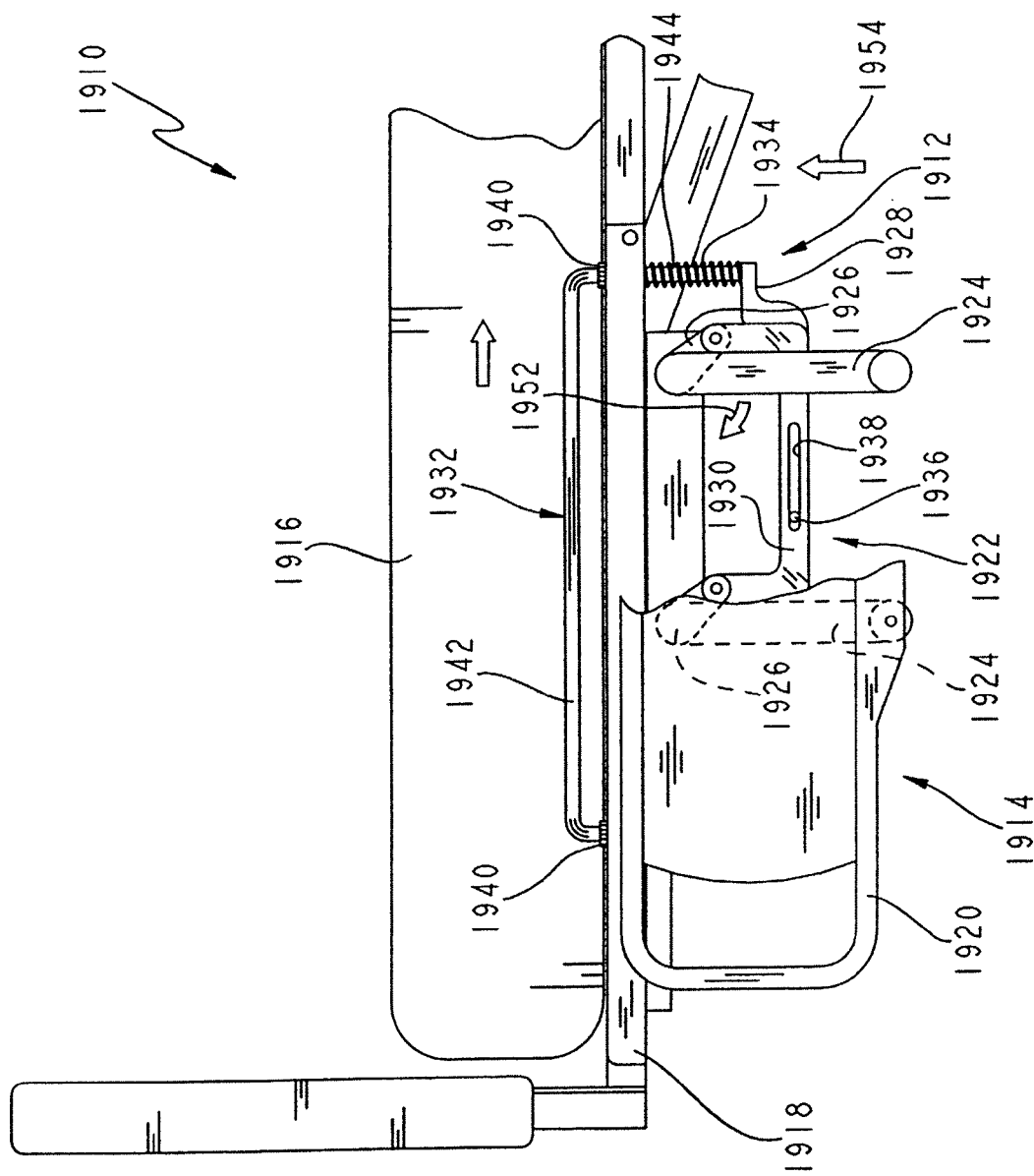
FIG. 25 is a side elevation view of the siderail of FIG. 23 showing the siderail in the lowered position.

Base members 1938 then lower in direction 1950 as urged by height adjustment members 1930 and springs 1934 that bias base members 1938 toward deck 1918 are expanded. Thus, as rail members 1920 are lowered, retainer members 1932 are likewise lowered as shown in FIG. 25. Conversely, raising of rail member 1920 by rotating rail member 1920 clockwise in direction 1952 causes retain member 1932 to raise in direction 1954 as shown in FIG. 25 to the position shown in FIG. 24.

Figure 26:
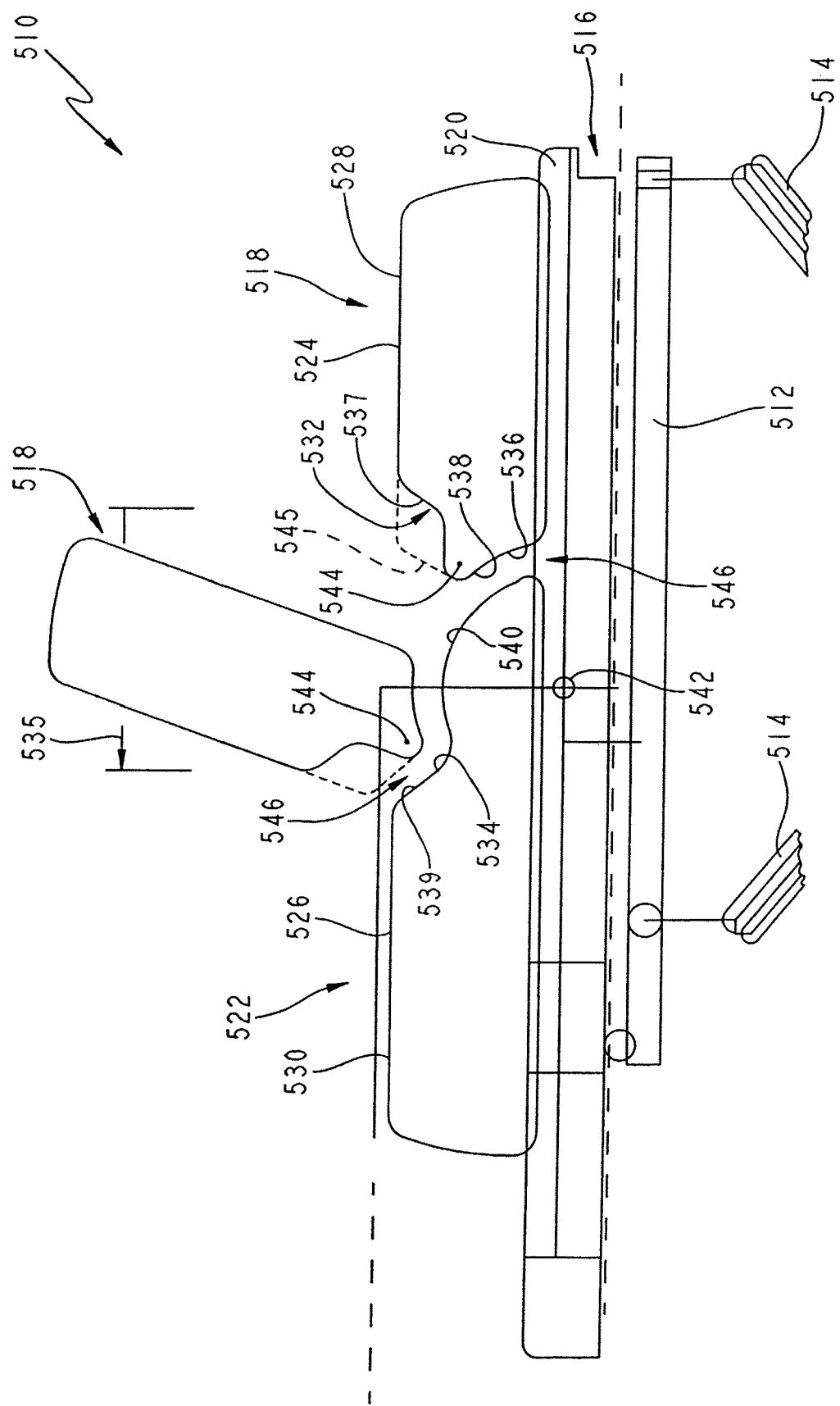
FIG. 26 is a partial diagrammatic view of a patient support showing the patient support including a bedframe, a mattress positioned on the bedframe, and a pair of siderails, each of the side rails including a notched upper edge.

Another patient support 510 is provided in FIG. 26. Patient support 510 includes a bedframe including a base frame (not shown), and intermediate frame 512 supported above the base frame by lift arms 514, and an articulating deck 516 supported on intermediate frame 512. Patient support 510 further includes a head end siderail 518 coupled to a head section 520 of deck 516 and an intermediate siderail 522 coupled to intermediate frame 512.

Each siderail 518, 522 includes an upper edge 524, 526 that includes a substantially flat portion 528, 530 and a notched portion 532, 534. Additionally, siderail 518 includes an leftmost edge 536 that includes a circular portion 538 and upper edge 526 of side rail 522 includes a circular portion 540. Circular portions 538, 540 have radii of curvature that extend from an axis of rotation 542 of head section 520 of deck 516.

Notched portion 534 permits a portion 544 of siderail 518 positioned nearest a foot end of patient support 510 to rotate further about axis of rotation 542 before a gap 546 between portion 544 and siderail 522 begins to close. Thus, head section 520 of deck 516 can rotate further about axis of rotation 542. Circular portions 538, 540 permit siderail 518 to rotate relative to siderail 522 without gap 546 narrowing.

Notched portions 532, 534 define a distance 535 between their respective vertically extending edges 537, 539 that is at least 318 mm (12.5 inches). Gap 546 is preferably between 25 mm (1 inch) and 60 mm (2.4 inches). By providing notched portions 532, 534, a caregiver is provided easier access to a patient positioned on the mattress.

According to an alternative embodiment of the present disclosure, notched portion 532 of upper edge 524 is not provided and a left-most edge 545 (partially shown in phantom) is provided that is the inverse of notched portion 534 of side rail 522. Thus, when head section 520 and siderail 518 are rotated to the inclined position, left-most edge 545 is parallel to notched portion 532 of upper edge 524 and spaced equidistant therefrom.

Figure 27:
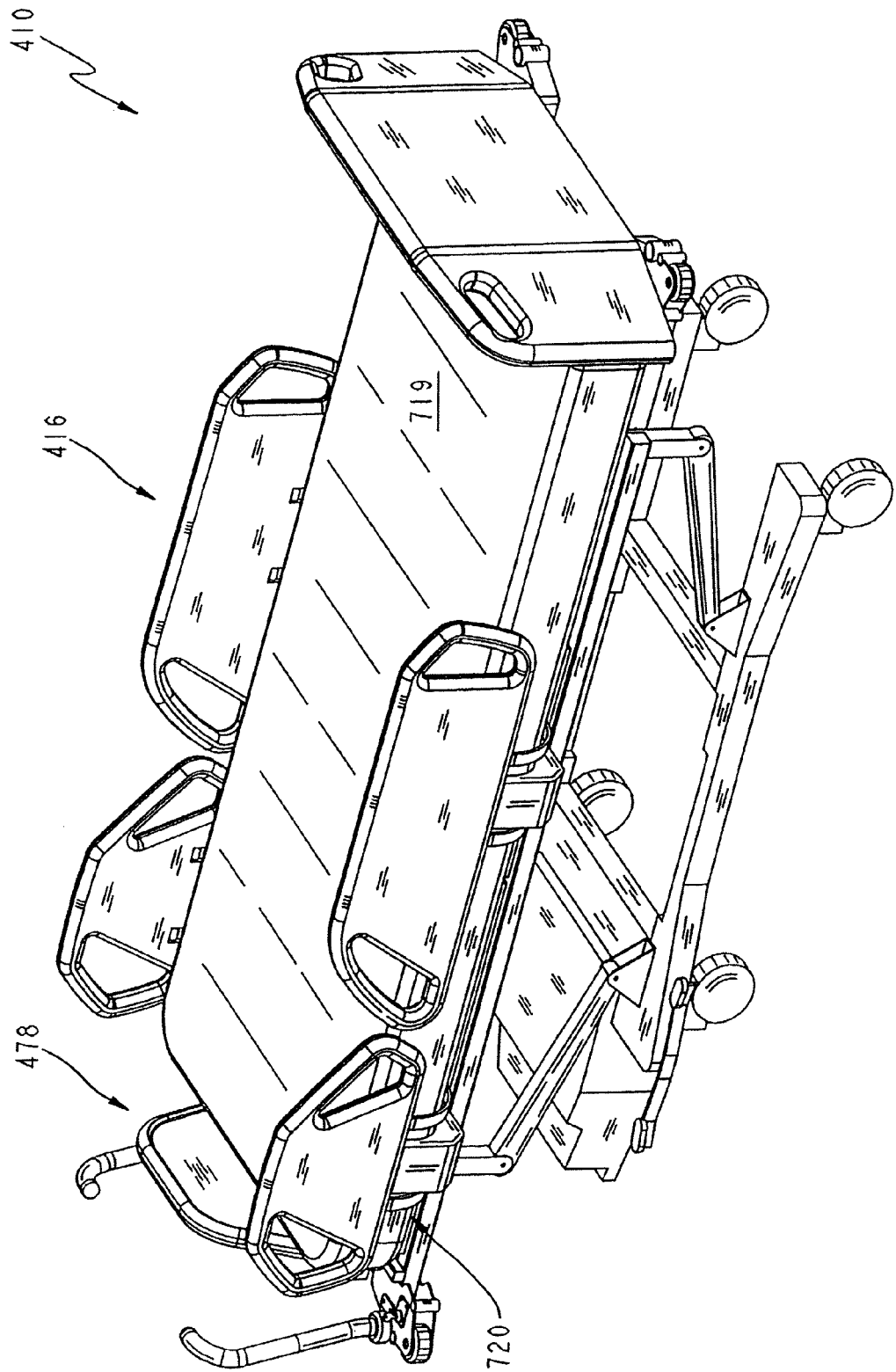
FIG. 27 is a perspective view of an alternative embodiment patient support showing the patient support including a base frame, a deck, a mattress positioned on the deck, a footboard, a head board, a pair of head end siderails, and a pair of foot end siderails.
Figure 28:
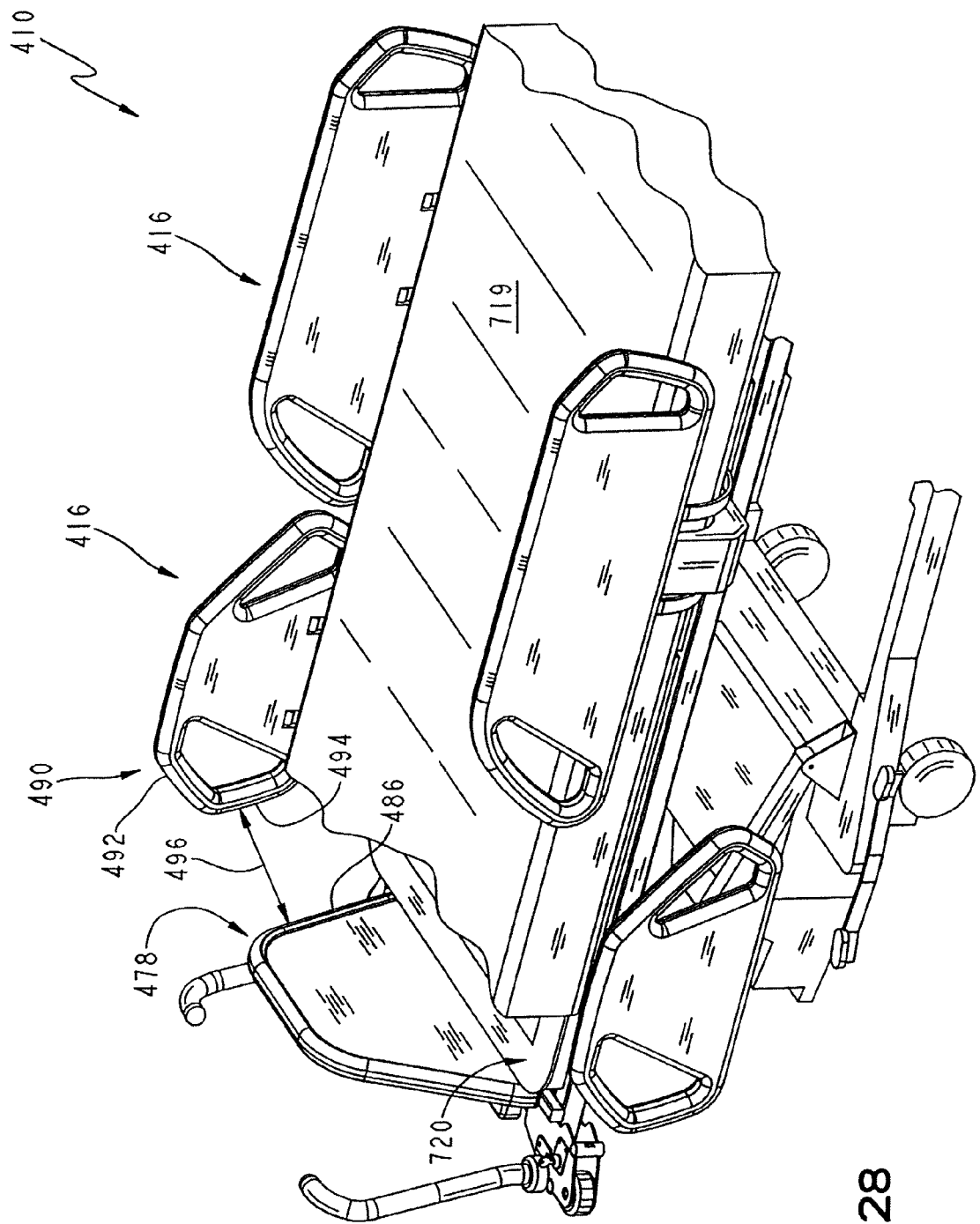
FIG. 28 is a perspective view of the head end of the patient support of FIG. 27 showing the head end siderail and the headboard cooperating to define a gap therebetween of equal to or greater than 300 millimeters.
Figure 29:
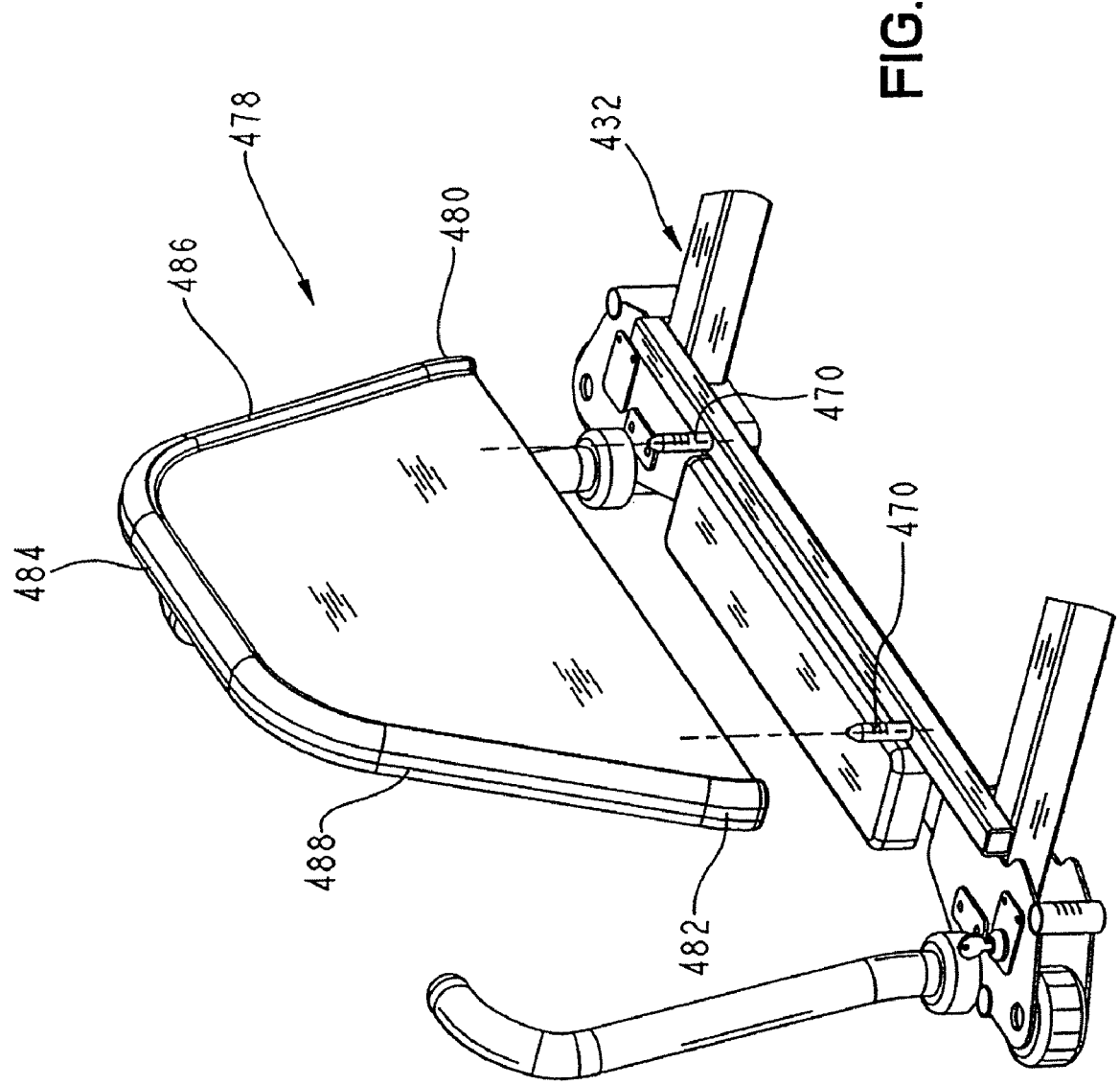
FIG. 29 is a view similar to FIG. 28 showing the headboard removed from the bedframe and aligned with a pair of posts on the bedframe.
Figure 30:
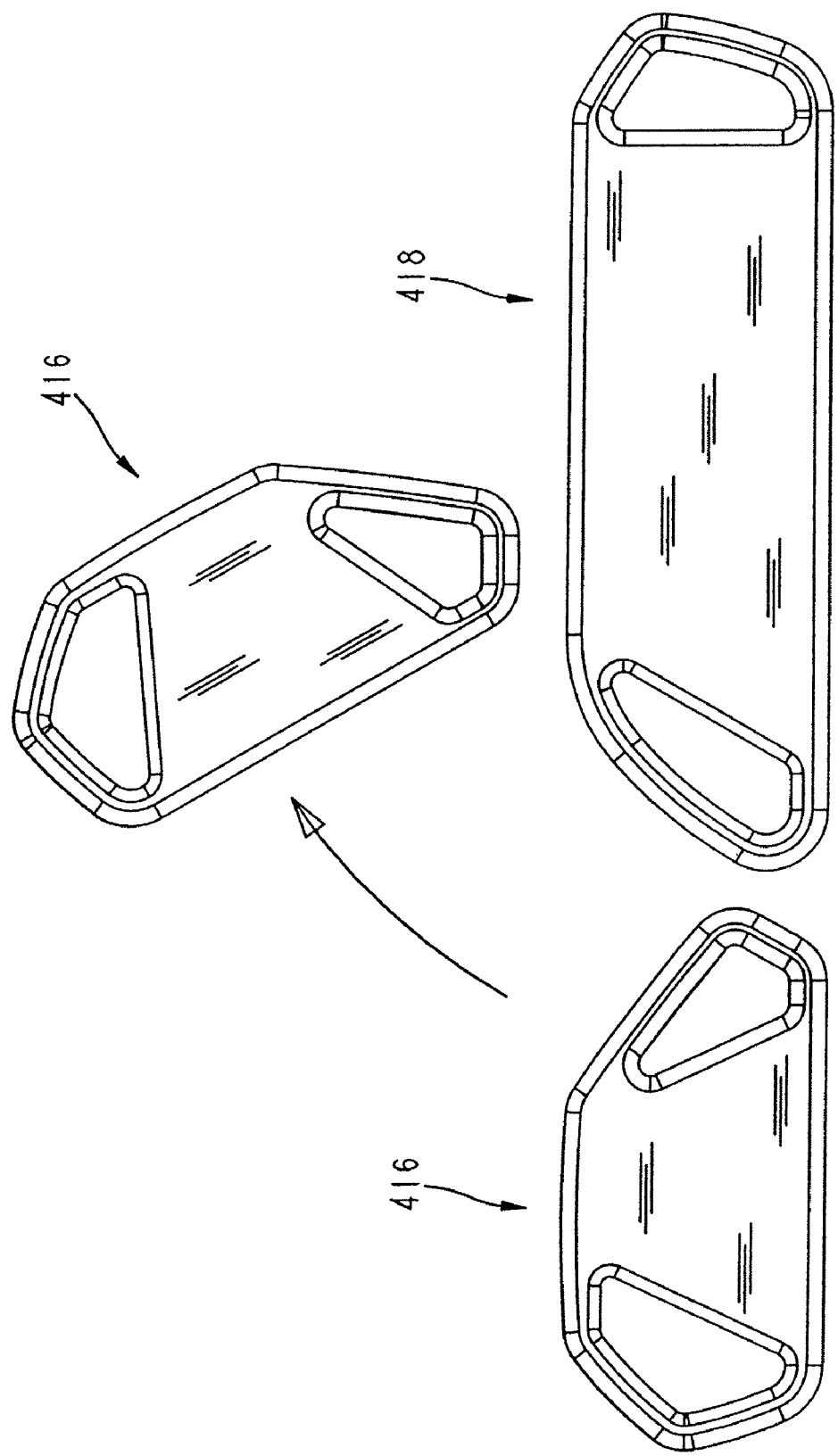
FIG. 30 is a side elevation view of rail members of the head and foot end siderails showing the head end rail member in first and second positions.

According to one embodiment of the present disclosure, a patient support 410 is provided with head and foot end siderails 416, 418, a headboard 478 shown in FIGS. 27-29. Headboard 478 includes a pair of substantially vertical side edges 480, 482, a horizontal top edge 484, and a pair of angled edges 486, 488 extending between side edges 480,482 and top edge 484. When a mattress 719 is positioned on a deck 720, vertical edges 480, 482 are positioned below the upper surface of mattress 719.

As shown in FIG. 28, head end siderail 416 includes a side edge 490 having upper and lower angled portions 492, 494. Lower angled portion 494 of siderail 416 and angled edge 486 cooperate to define a gap 496 therebetween of a consistent distance. Preferably, this distance is greater than or equal to 318 mm (12.5 inches). Headboard 478 includes a pair of apertures sized to receive posts 470 on an intermediate frame 432.

Figure 31:
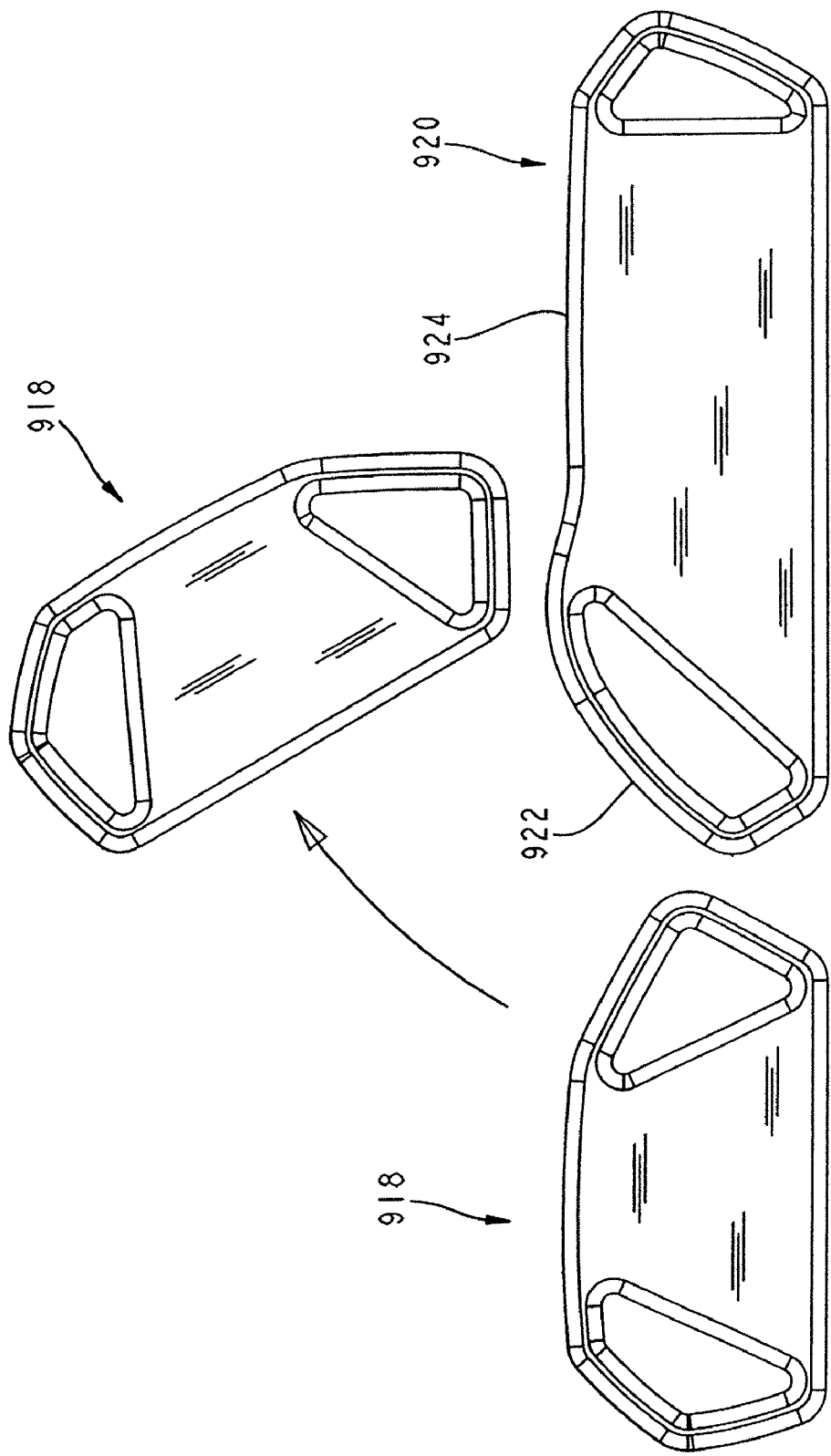
FIG. 31 is a view similar to FIG. 30 showing a pair of alternative embodiment rail members.

An alternative pair of head and foot end siderail members 918, 920 is shown in FIG. 31. Foot end siderail member 920 includes a circular end edge 922 that peaks and travels downward before meeting a substantially flat edge 924.

Figure 32:
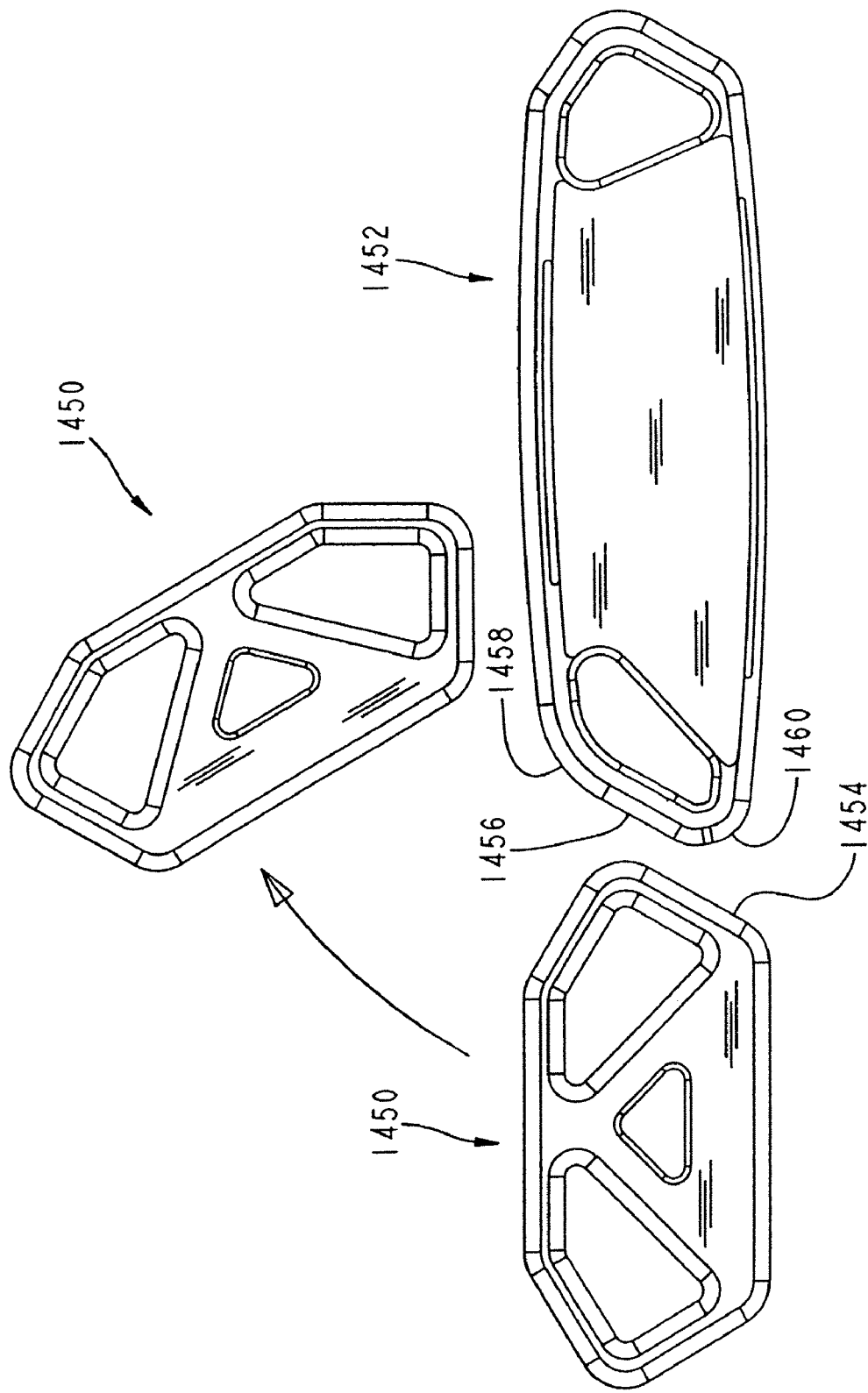
FIG. 32 is a view similar to FIG. 30 showing another pair of alternative embodiment rail members.

An alternative embodiment pair of head and foot end siderails 1450, 1452 is provided in FIG. 32. Head and foot end siderails 1450, 1452 including a pair of substantially flat, parallel surfaces 1454, 1456. Foot end siderail 1452 includes an upper circular corner 1458 having a radius of curvature of approximately 8.5 inches and a lower rounded corner 1460. When head end siderail 1450 is in the lowered position, surfaces 1454, 1456 are spaced apart by more than 25 mm, but less than 60 mm. Because of upper circular corner 1458, as head end side rail 1450 is raised, this gap remains greater than 25 mm. Additional details of how siderails 1450, 1452 are coupled to the deck are provided with the disclosure for patient support 210.

Figure 33:
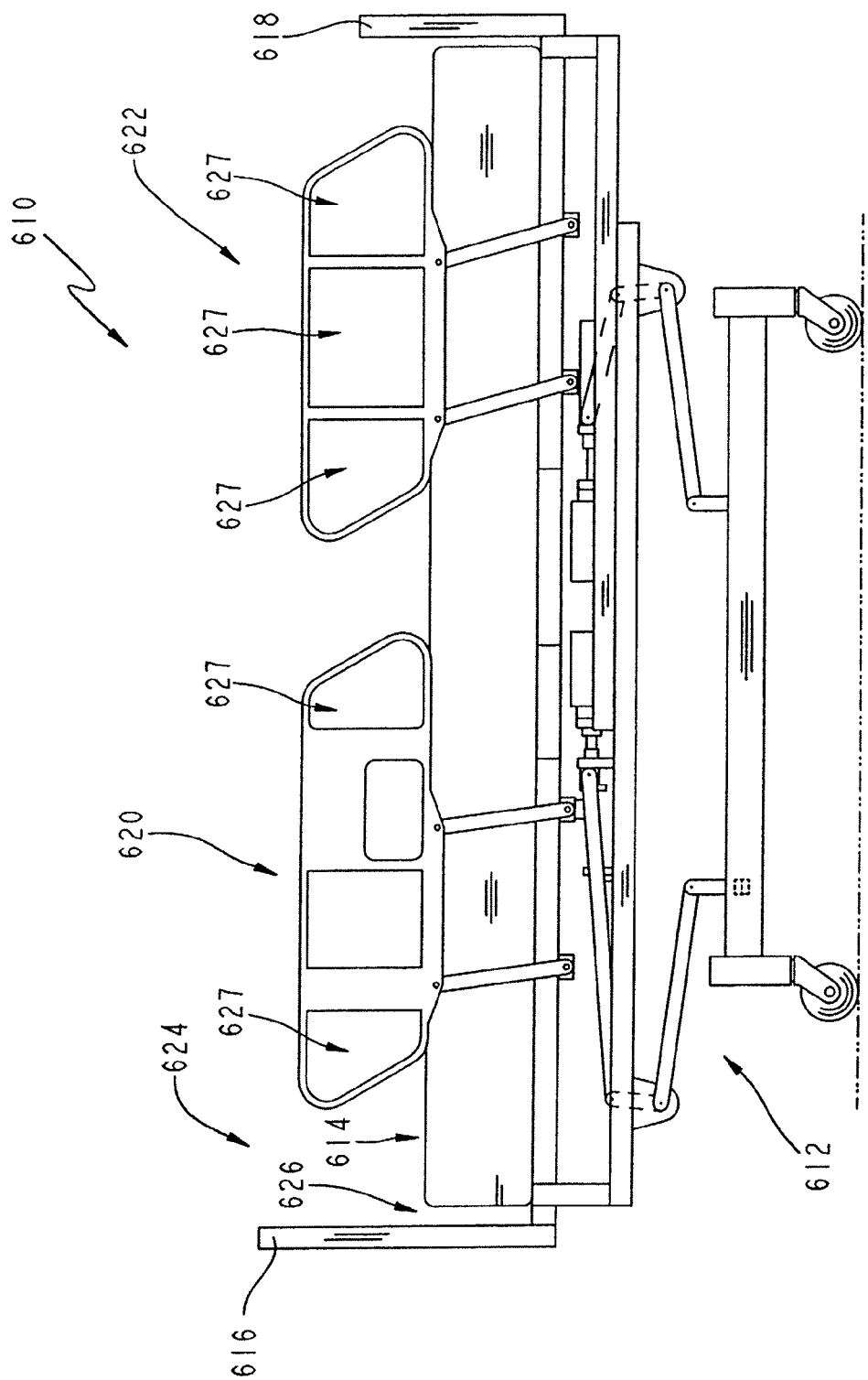
FIG. 33 is side elevation view of a patient support showing the patient support including a mattress supported by a bedframe, a headboard coupled to the bedframe, a footboard coupled to the bedframe, and a pair of siderails coupled to the bedframe.

A patient support 610 is shown in FIG. 33 for supporting a patient before, after, or during medical treatment or for resting. Patient support 610 includes a bedframe 612, a mattress 614 supported by bedframe 612, a headboard 616 coupled to bedframe 612, a footboard 618 coupled to bedframe 612, and a pair of siderails 620, 622 also coupled to bedframe 612. Gaps may exist between these components. For example, a headboard/siderail gap 624 is defined between headboard 616 and siderail 620. Other similar gaps may exist between siderails 620, 622 and footboard 618. A headboard/mattress gap 626 is defined between headboard 616 and mattress 614. Other similar gaps may exist between siderails 620, 622 and mattress 614. Furthermore, gaps or openings 627 may also exist in headboard 616, footboard 618, and siderail 620, 622 themselves. According to the present disclosure, various apparatus and methods are provided to reduce or eliminate these and other gaps and openings on patients supports.

Figure 34:
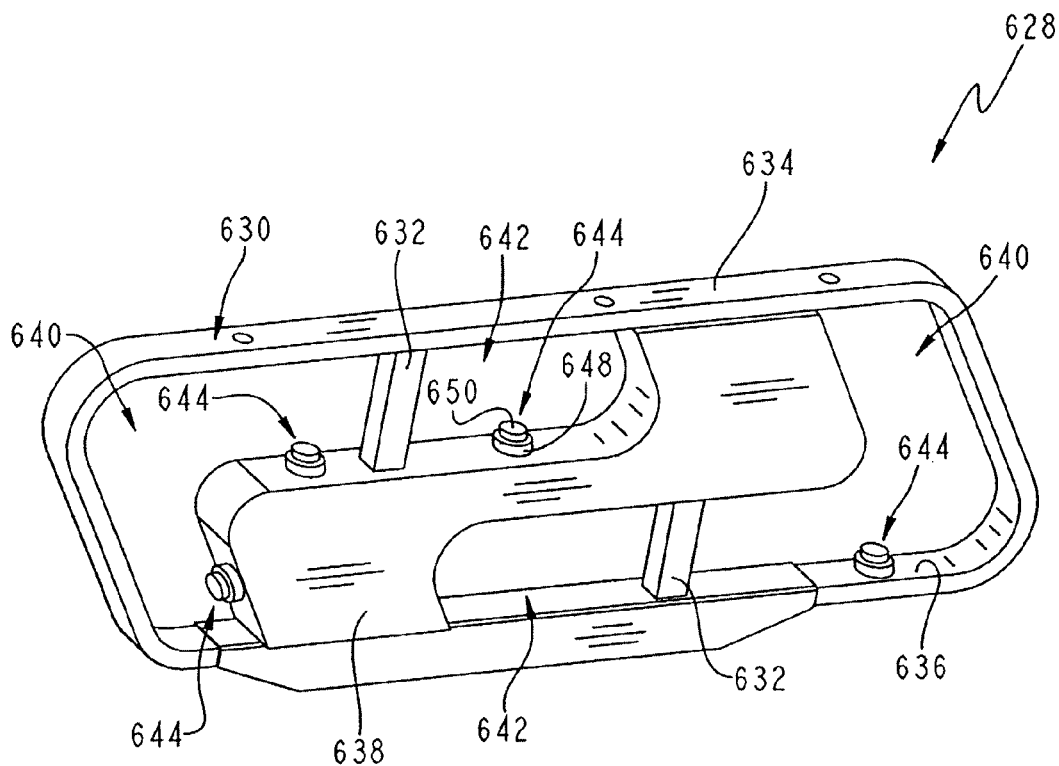
FIG. 34 is a perspective view of a siderail showing the siderail including a perimeter rail and a plurality of cross members cooperating with the perimeter rail to define a plurality of openings through the siderail, and a plurality of bumpers coupled to the perimeter rail and cross members to limit the width of the openings.

As shown in FIG. 34, a siderail 628 includes a perimeter rail 630, a pair of vertical cross members 632 extending between upper and lower portions 634, 636 of perimeter rail 630, and a Z-shaped insert 638 the covers respective upper and lower portions of vertical cross members 632 and extends therebetween. Perimeter rail 630, cross members 632, and insert 638 cooperate to define openings 640, 642 in siderail 628.

Bumpers 644 are provided to decrease the width of openings 640, 642. For example, two bumpers 644 are coupled to insert 638 to decrease the width of the upper and side portions of opening 640. A bumper 644 is coupled to insert 638 to decrease the width of opening 642. Alternatively, bumpers 644 may be coupled to other locations on siderail 628. For example, as shown in the lower right-hand portion of rail 628, bumper 644 is coupled to perimeter rail 630. According to the preferred embodiment of the present disclosure, bumpers 644 are provided so that a cone having a maximum diameter of 120 mm cannot pass through openings 640, 642. Thus, after installation of bumpers 644, the maximum open area in the siderail does not exceed 120 mm in diameter.

Preferably, bumpers 644 include a rigid base 648 and a compliant top 650 made of a rubber material coupled to base 648. Base 648 is preferably coupled to rail 628 by a screw (not shown). According to alternative embodiments of the present disclosure, the bumpers are coupled to the siderails by other types of fasteners such as adhesives, bolts, rivets, or other fasteners known to those of ordinary skill in the art.

According to one installation procedure, bumpers 644 are installed to siderail 628 at the location of use of siderail 628, such as a hospital or other care facility, after siderail 628 and the remainder of the accompanying bed have been transported to the care facility. According to another installation procedure, bumpers 644 are installed at the manufacturing facility before shipment to the care facility.

Figure 35:
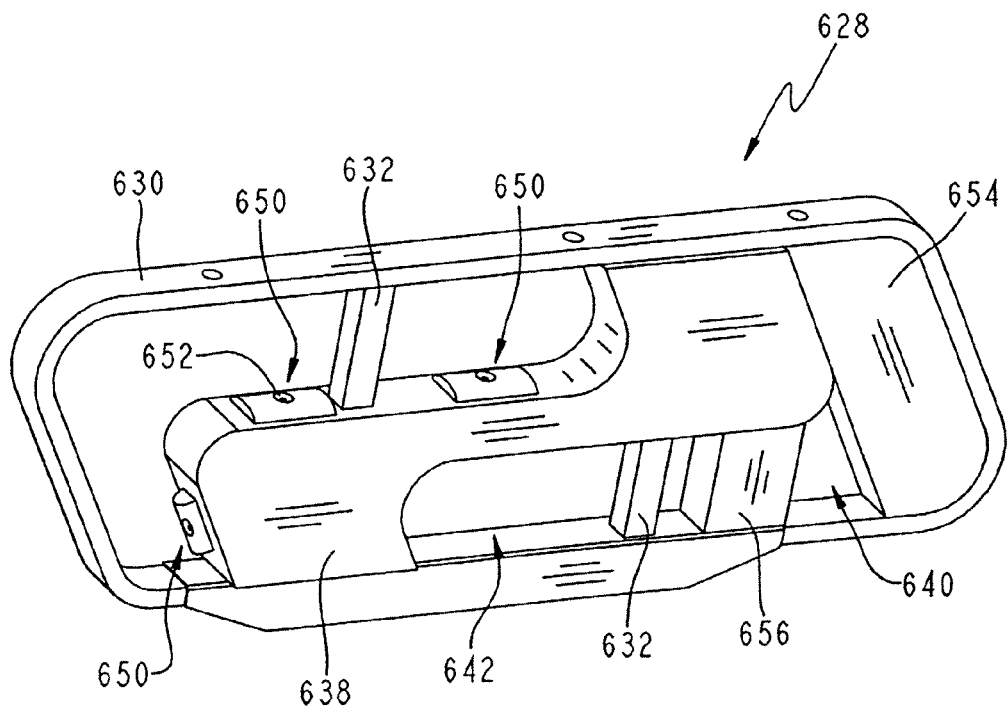
FIG. 35 is a perspective view of a side rail similar to FIG. 34 showing alternative embodiment bumpers coupled to the cross members to limit the width of the openings and panels positioned in the openings to block portions of the openings.

An alternative embodiment bumper 650 is shown in FIG. 35. Bumper 650 is formed from a rubber material in a half-cylinder shape and is coupled to insert 638 by a screw 652. According to an alternative arrangement, bumpers 650 are coupled to other locations on siderail 628 such as on the inner surfaces of perimeter rail 630 or cross members 632 to decrease the width of openings 640, 642. Alternatively, these bumpers 650 may be coupled to siderail 628 using the other fasteners and installation procedures described for bumpers 644 mentioned above.

A plurality of panels 654, 656 are also provided that partially fill opening 640. Panels 654, 656 are configured to reduce to the width of opening 640. According to alternative embodiments of the present disclosure, additional panels are provided that entirely fill openings 640 and either partially or completely fill openings 642. Preferably, panels 654, 656 are made of a transparent material such as polycarbonate, Lexan-brand plastic, Plexiglas-brand plastic, or other material. According to other alternative embodiments, the panels are made of translucent or opaque materials.

Figure 36:
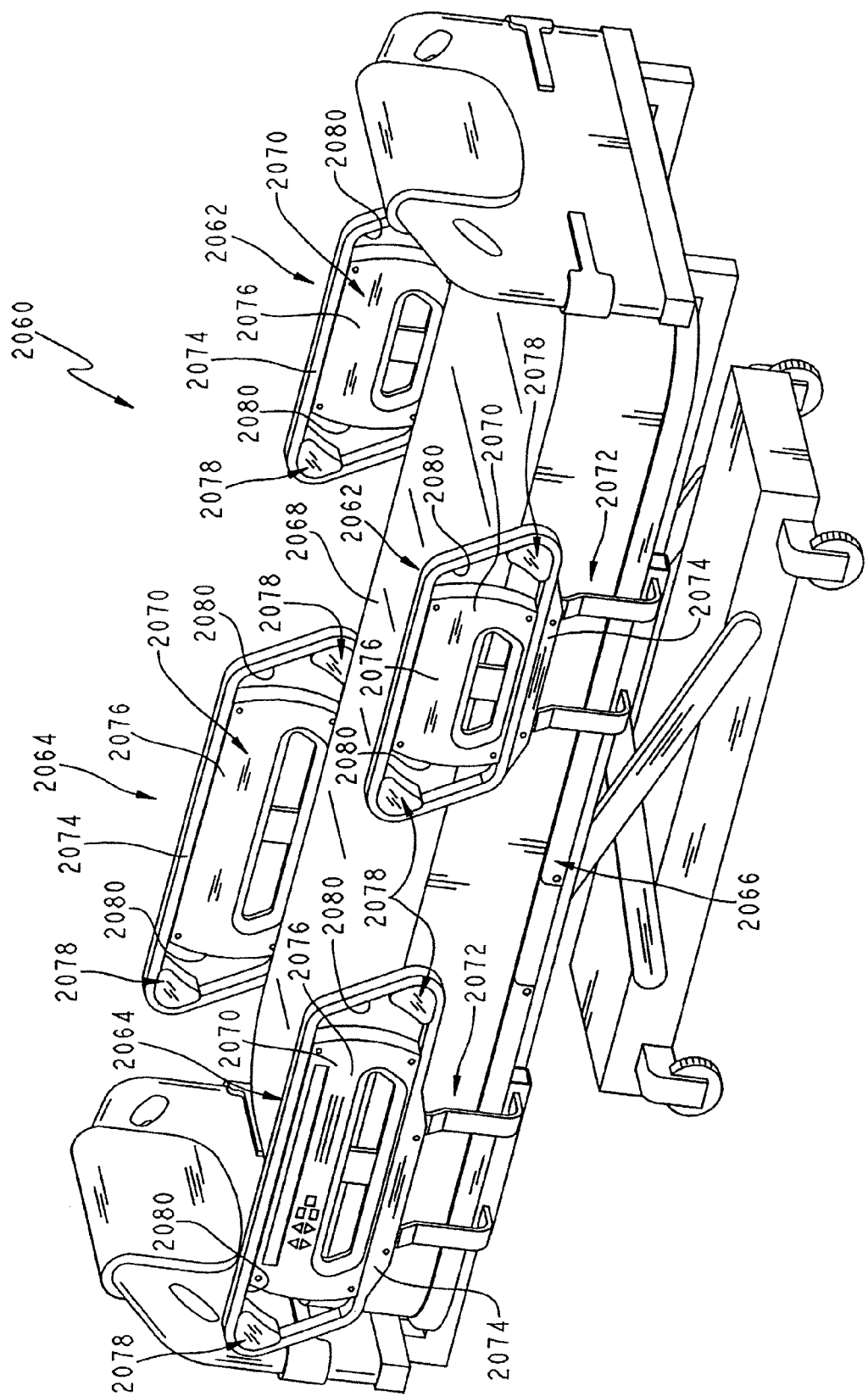
FIG. 36 is a perspective view of another alternative embodiment patient support showing a patient support including siderail inserts.
Figure 37:
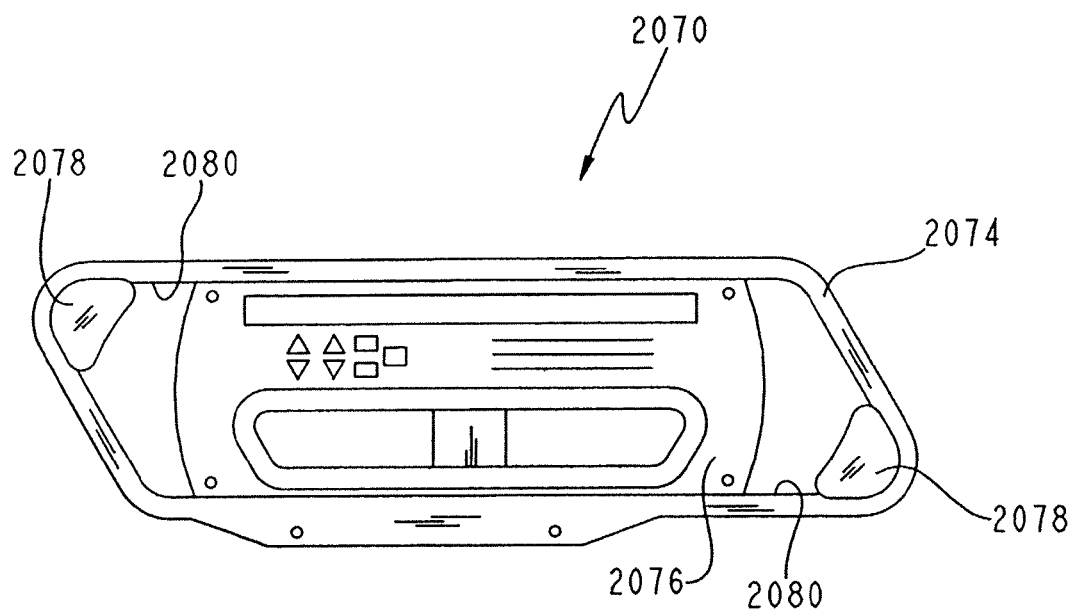
FIG. 37 is a side elevation view of a rail member of the siderail of FIG. 36.

Another alternative embodiment patient support 2060 is shown in FIG. 36. Patient support 2060 includes a deck 2066, a mattress 2068 positioned on deck 2066, and foot and head end siderails 2062, 2064 coupled to deck 2066. Siderails 2062, 2064 include a rail member 2070 and linkages 2072 coupling rail member 2070 to deck 2066. Rail member 2070 includes a perimeter rail 2074, a central body 2076 fixed to perimeter rail 2074, and inserts 2078 removably coupled to perimeter rail 2074. Central body 2076 is coupled within an interior of perimeter rail 2074. Central body 2076 and perimeter rail 2074 cooperate to define openings 2080 in siderails 2062, 2064.

Figure 38:
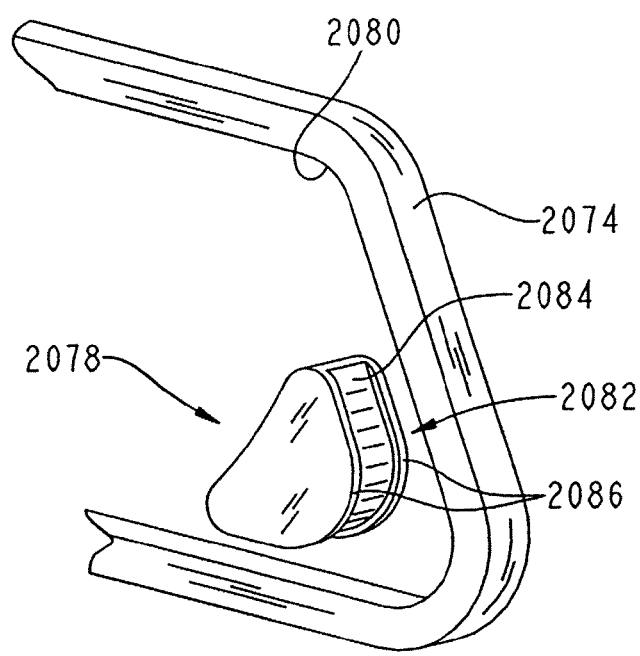
FIG. 38 is a perspective cut away view of the rail member and siderail insert of FIG. 36.

Inserts 2078 are provided to decrease the width of openings 2080. Inserts 2078 include a rail engagement side 2082. Rail engagement side 2082 includes a rail track 2084 and two track walls 2086 as shown in FIG. 38. Rail track 2084 is a recessed area approximately the width of perimeter rail 2074. When positioned adjacent rail 2074, rail track walls 2086 engage perimeter rail 2074. Preferably, when inserts are positioned in openings 2080, a cylinder having a diameter of 60 mm or greater cannot be inserted into opening 2080.

Figure 39:
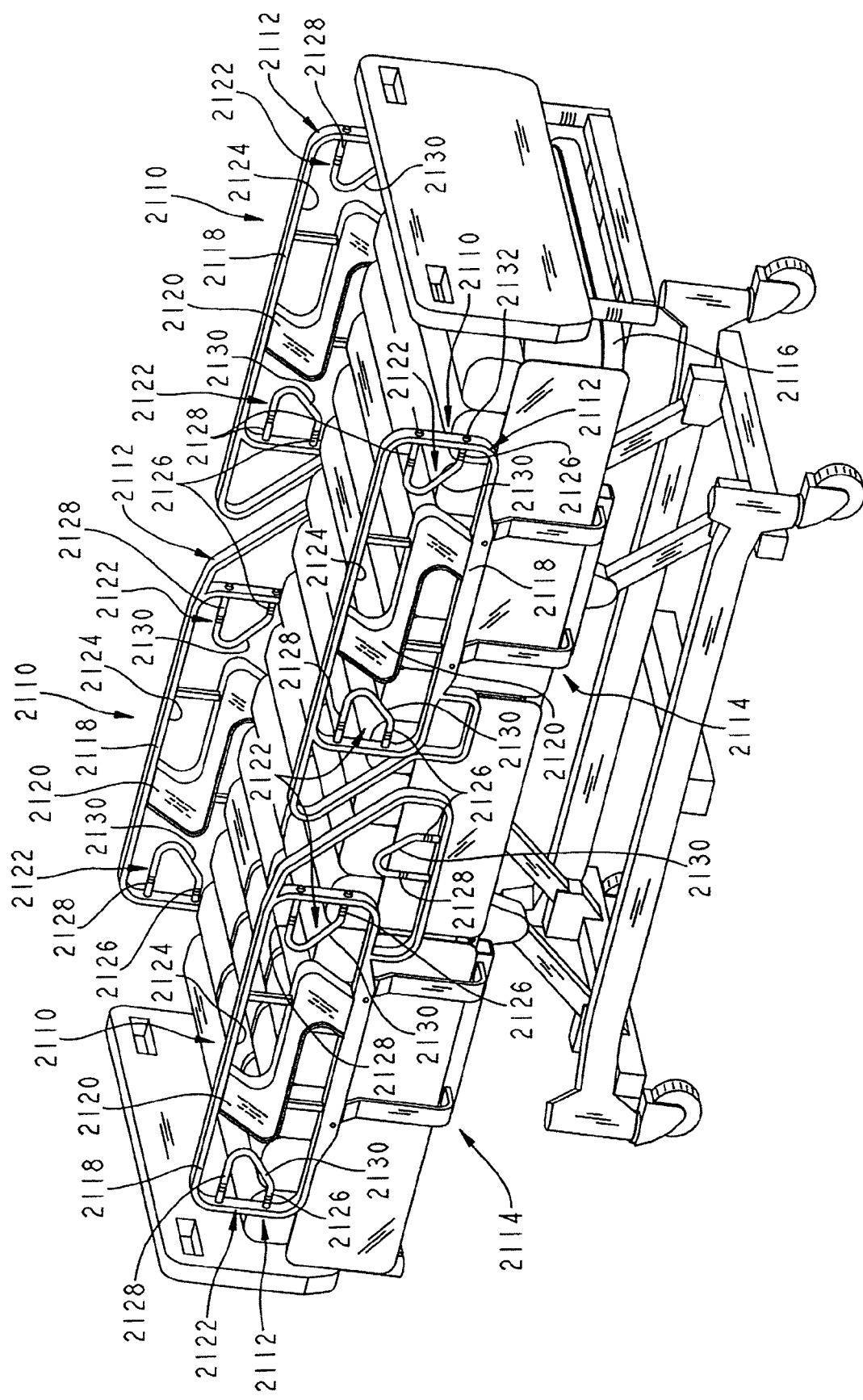
FIG. 39 is a perspective view of another alternative embodiment patient support showing a patient support including siderails.
Figure 40:
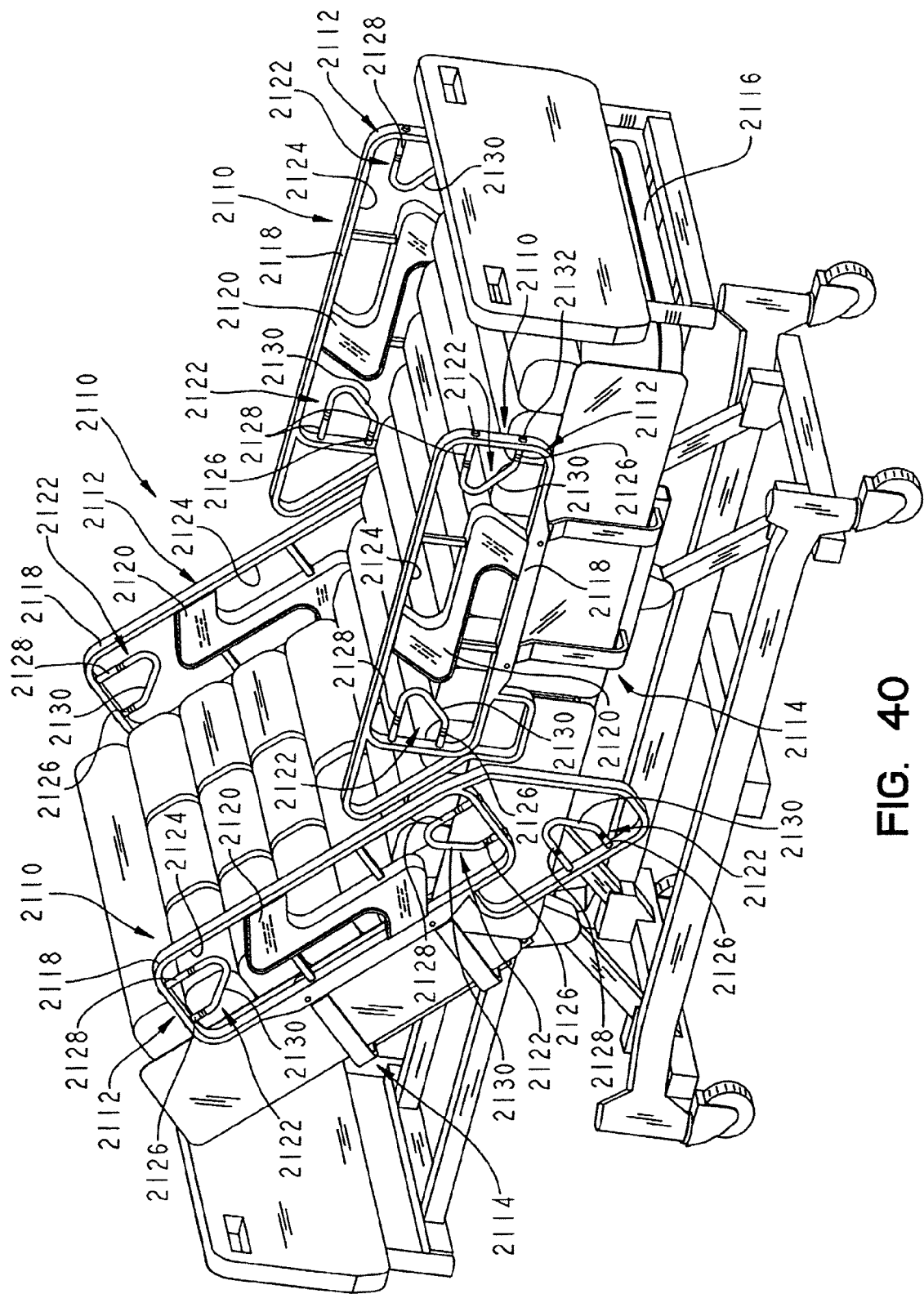
FIG. 40 is a perspective view of the patient support of FIG. 39 in an articulated position.

Another alternative embodiment siderail 2110 is shown in FIG. 39. Siderails 2110 include a rail member 2112 and linkages 2114 coupling rail member 2112 to deck 2116. Rail member 2112 includes a perimeter rail 2118, a central body 2120 fixed to perimeter rail 2118, and inserts 2122 coupled to perimeter rail 2118. Central body 2120 is coupled within an interior of perimeter rail 2118. Central body 2120 and perimeter rail 2118 cooperate to define openings 2124 in siderails 2110.

Figure 41:
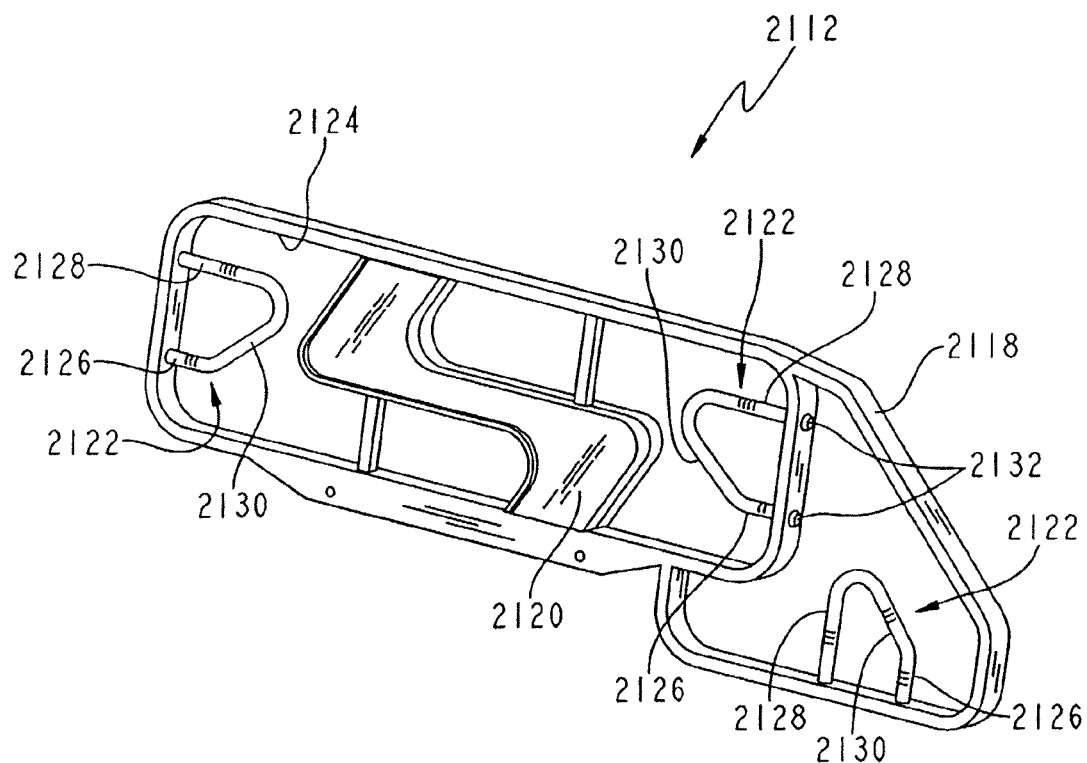
FIG. 41 is a perspective view of a rail member of the siderails of FIG. 39.
Figure 42:
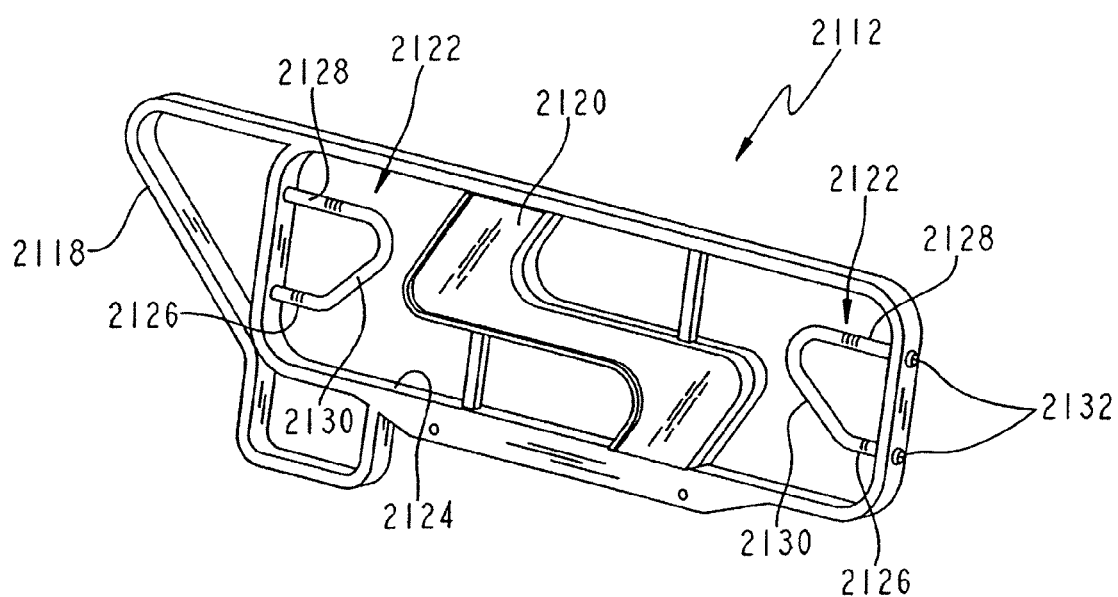
FIG. 42 is a perspective view of a rail member of the siderails of FIG. 39.

Inserts 2122 are provided to decrease the width of openings 2124. Inserts 2122 are preferably metal tubes bent to the shape shown best in FIGS. 41 and 42. Inserts 2122 include a short side 2126, a long side 2128, and an end 2130 linking the two sides 2126, 2128. Perimeter rails 2118 have pairs of apertures 2132 configured to receive ends of sides 2126, 2128 of inserts 2122. Inserts 2122 are attached to perimeter rails 2118 with fasteners that extend through apertures 2132. Inserts 2122 extend from perimeter rails 2118 into openings 2124 to decrease the width of openings 2124. Preferably, when inserts 2122 are positioned in the openings, a cylinder having a diameter of 60 mm or greater cannot be inserted into the openings.

Figure 43:
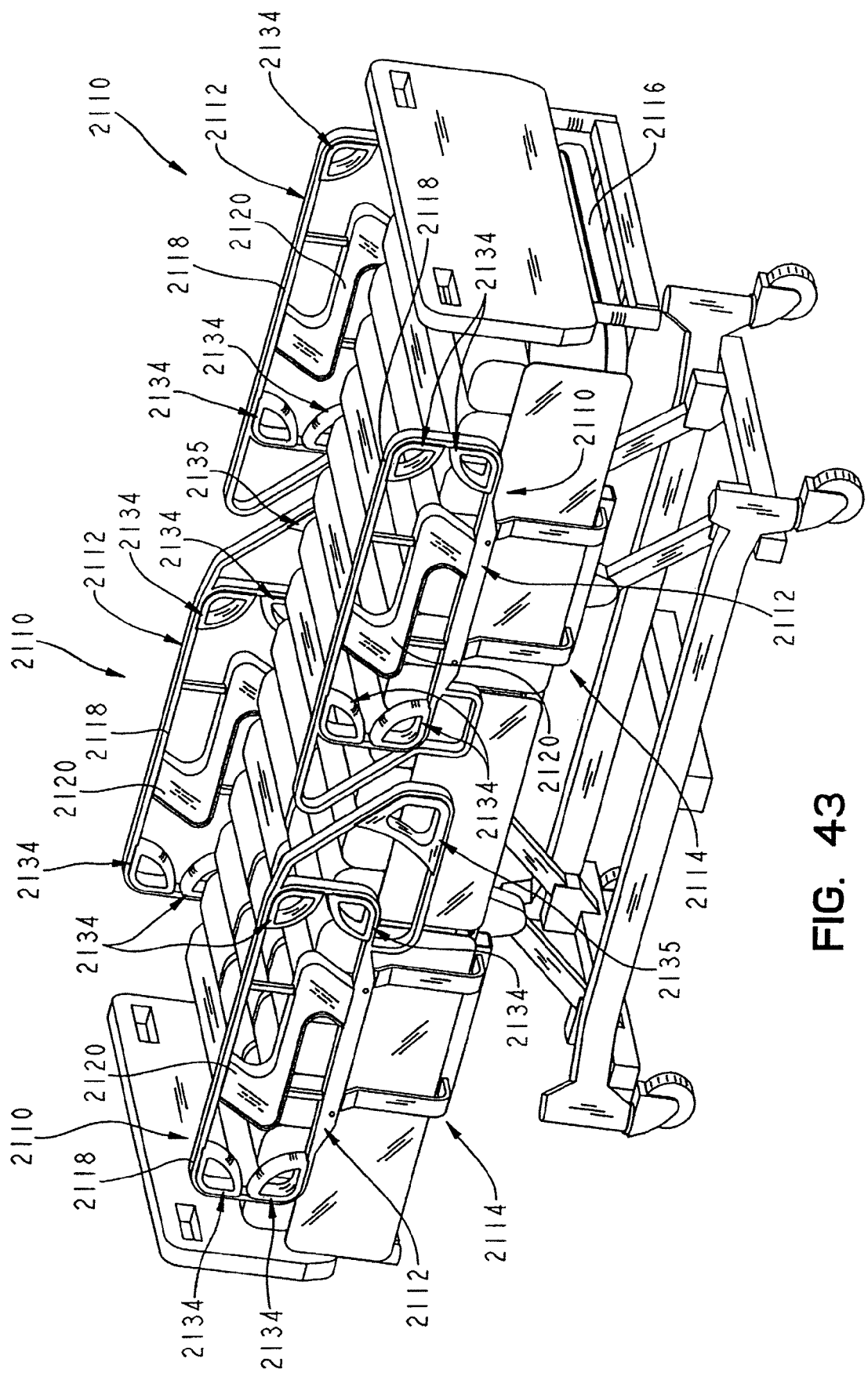
FIG. 43 is perspective view of another alternative embodiment patient support showing a patient support including siderails.
Figure 44:
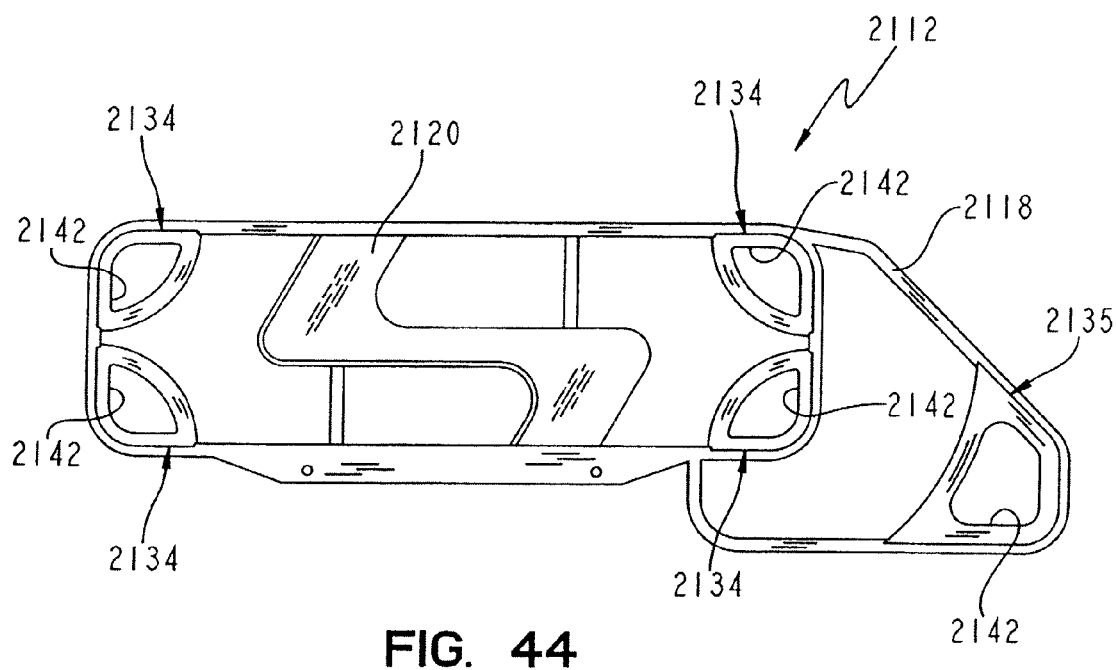
FIG. 44 is a side elevation view of a rail member of the siderails of FIG. 43.
Figure 45:
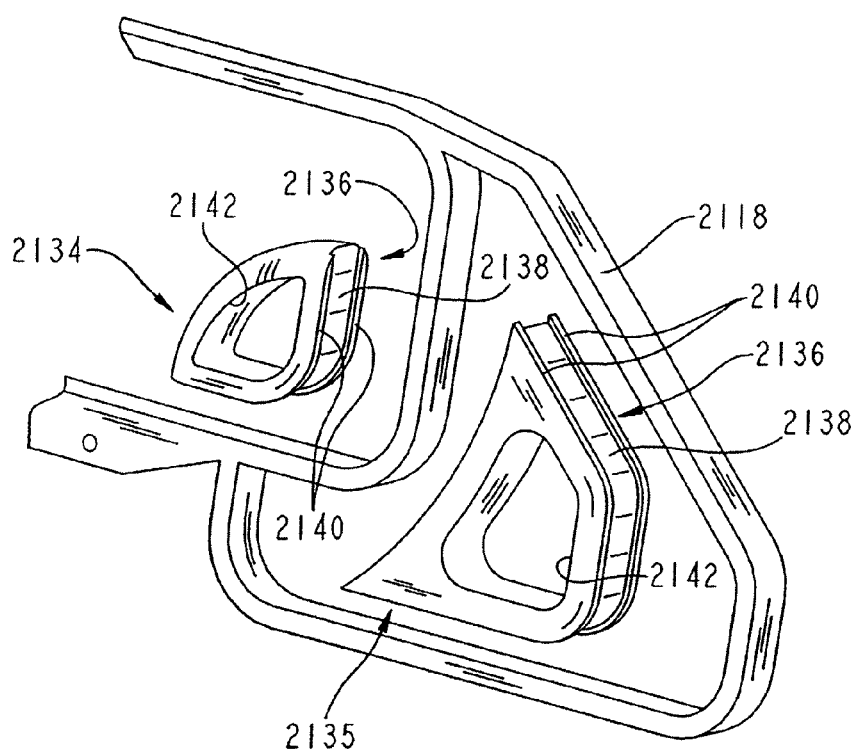
FIG. 45 is a perspective view of a rail member of the siderails of FIG. 43 showing detached bumpers.

Alternative embodiment inserts 2134, 2136 are shown in FIGS. 43-45. Inserts 2134, 2135 are similar to insert 2078 but designed to fit siderail 2110. Inserts 2134, 2136 have rail engagement sides 2136 including rail tracks 2138, rail track walls 2140, and a void 2142 defined therein as shown in FIG. 45. Rail tracks 2138 are a recessed area approximately the width of perimeter rail 2118. When inserts 2134, 2136 are positioned adjacent rail 2118, rail track walls 2140 engage perimeter rail 2118. Inserts 2134, 2136 are coupled to rail 2118 by fasteners, adhesives, or other couplers known to those of ordinary skill in the art. Preferably, when inserts 2134, 2136 are positioned in the openings, a cylinder having a diameter of 60 mm or greater cannot be inserted into the openings.

Figure 46:
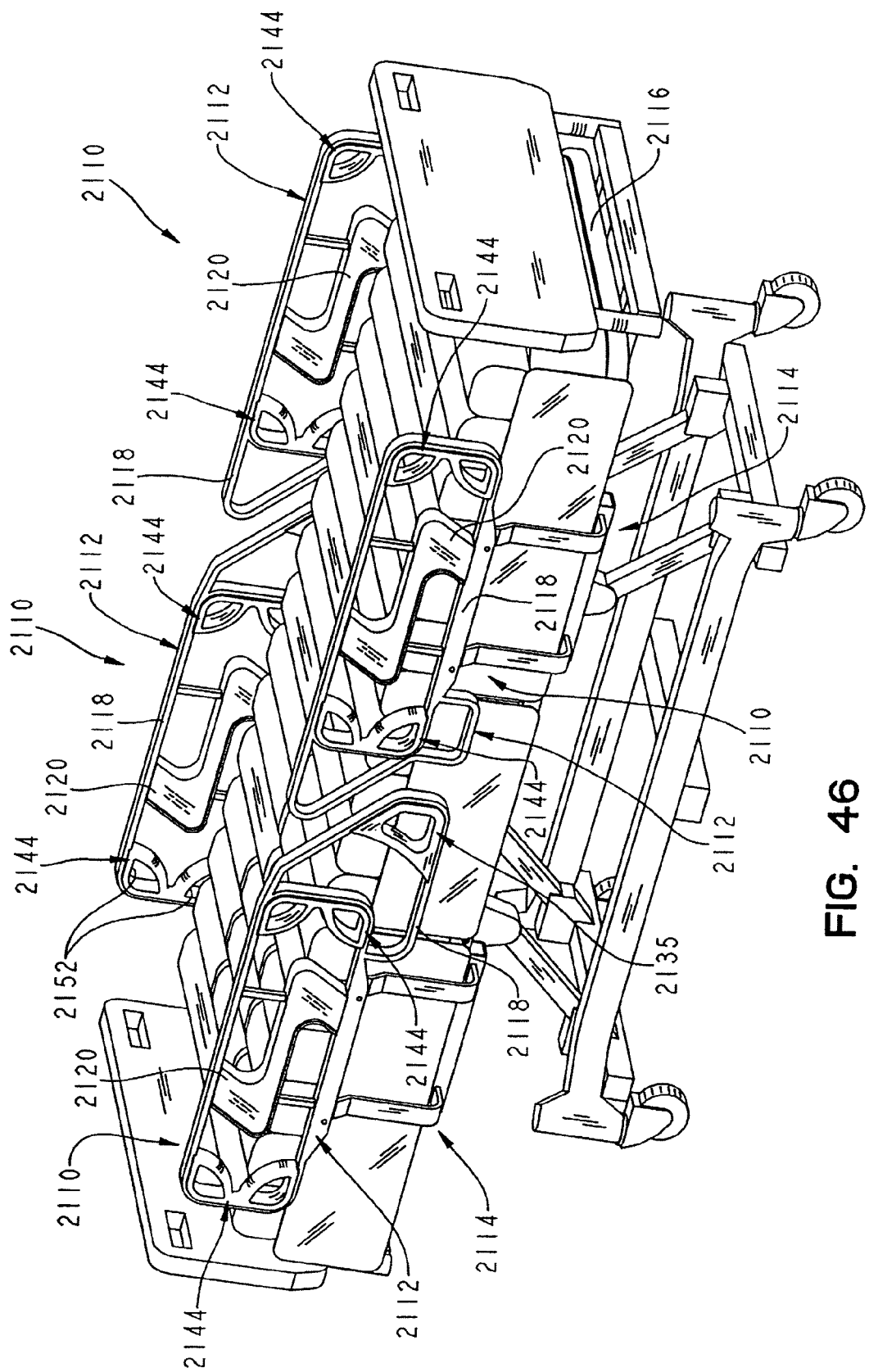
FIG. 46 is a perspective view of another alternative embodiment patient support showing a patient support including siderails.
Figure 47:
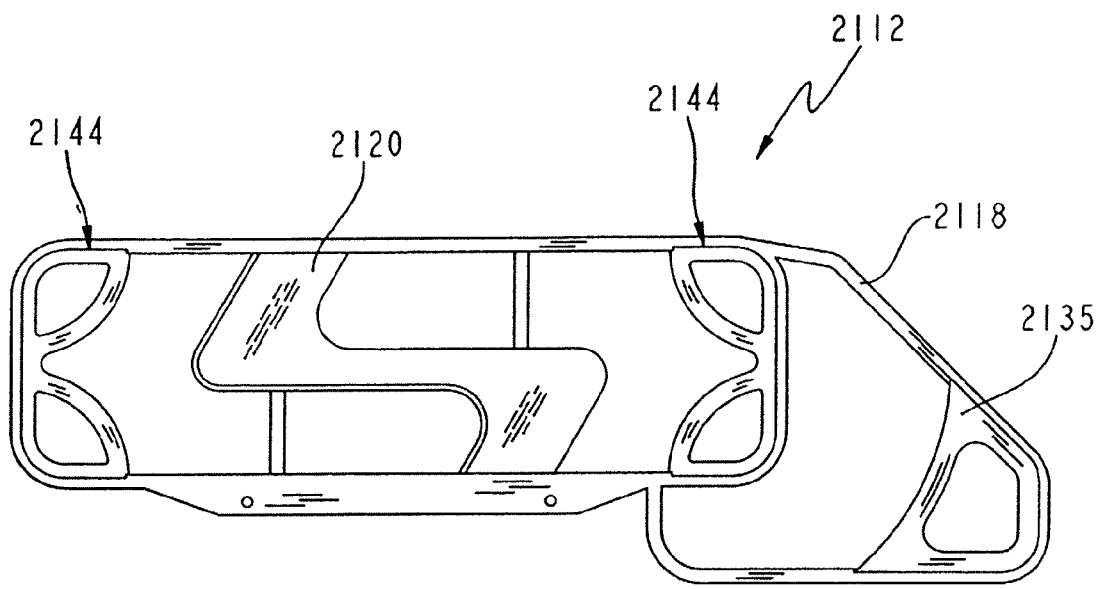
FIG. 47 is a side elevation view of a rail member of the siderails of FIG. 46.
Figure 48:
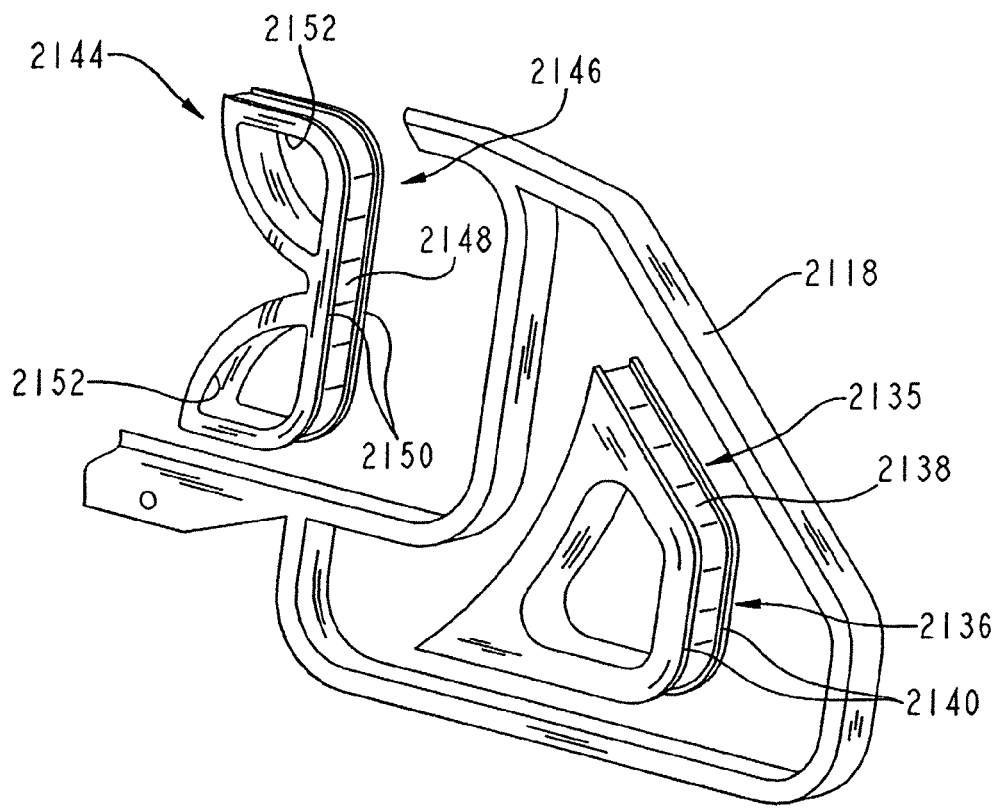
FIG. 48 is a perspective view of a rail member of the siderails of FIG. 46 showing detached bumpers.

Another alternative embodiment insert 2144 is shown in FIGS. 46-48. Insert 2144 is similar to inserts 2134, but extend to fill two corners. Insert 2144 has rail engagement sides 2146, rail tracks 2148, rail track walls 2150, and voids 2152 defined therein as shown in FIG. 48. Insert 2144 is designed to attach within two rounded 90-degree corners of perimeter rail 2118. Inserts 2144 are coupled to rail 2118 by fasteners, adhesives, or other couplers known to those of ordinary skill in the art. Preferably, when inserts 2144 are positioned in the openings, a cylinder having a diameter of 60 mm or greater cannot be inserted into the openings.

Figure 49:
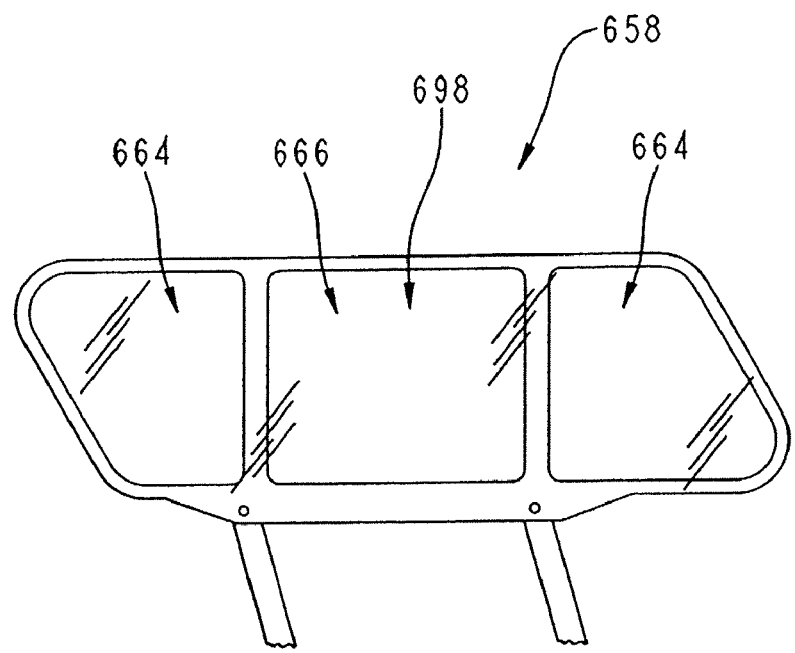
FIG. 49 is a side elevation view of a siderail showing a plastic cover positioned over the siderail to block the openings in the siderail.
Figure 50:
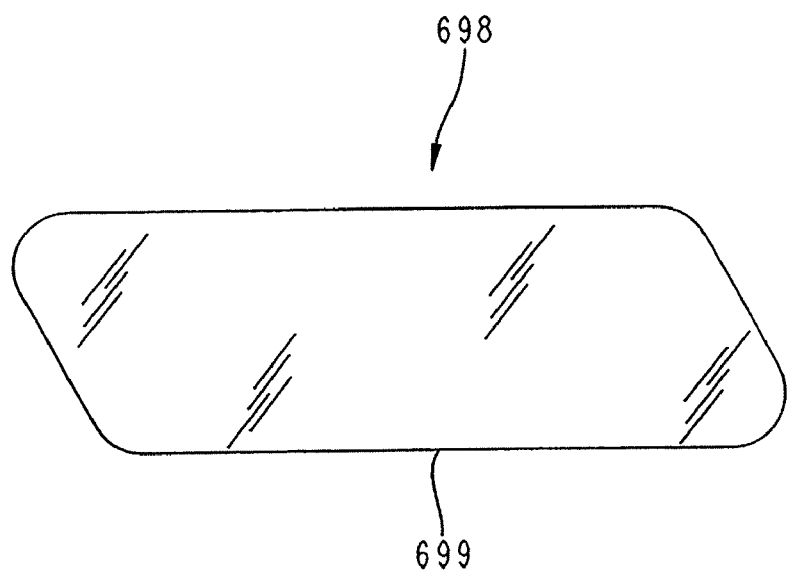
FIG. 50 is a side elevation view of the plastic cover of FIG. 49 before being placed over the siderail.

As shown in FIG. 49, a siderail 658 is provided with a clear plastic cover 698. Plastic cover 698 is a sleeve that slides over siderail 658 to block openings 664, 666. When a new patient is positioned on the associated patient support, plastic cover 698 is removed and replaced with a new or cleaned plastic cover. At least one edge 699 of cover 698 is open to permit placement of cover 698 over siderail 58. Fasteners, such as hook-and-loop type fasteners are provided to hold open edge 699 together after placement of cover 698 over siderail 658. According to alternative embodiments of the present disclosure, other types of fasteners are provided to hold the open edge together such as adhesives, straps, ties, button, snaps, or other fasteners known to those of ordinary skill in the art.

Figure 51:
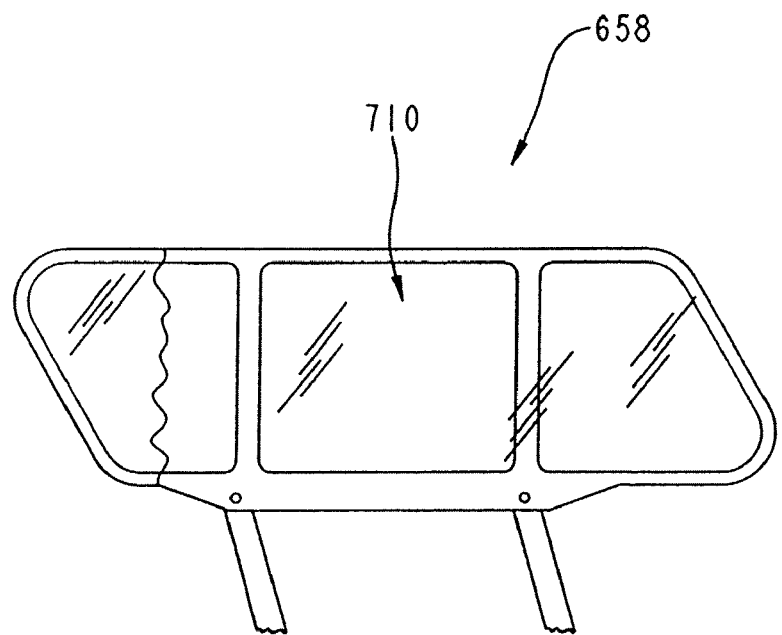
FIG. 51 is a side elevation view of a siderail showing a sheet of plastic material covering the siderail to block the openings in the siderail.
Figure 52:
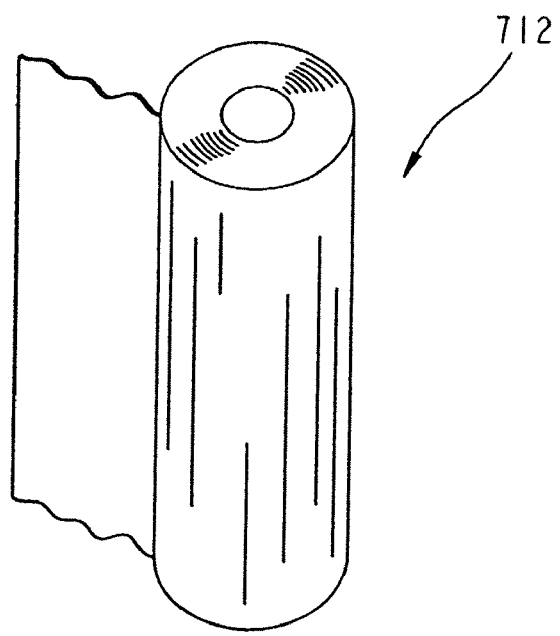
FIG. 52 is a perspective view of a roll of the plastic material.

Siderail 658 is provided with another embodiment clear plastic cover 710 shown in FIG. 51. Cover 710 is a clear plastic sheet of material that is wrapped around siderail 658 from a roll 712 of plastic sheet. An example of such a plastic sheet of material is plastic shrink wrap used for packing.

According to one alternative embodiment, the plastic sheet is thermally reactive and shrinks in reaction to heat. Such plastic materials are commonly used to cover windows during cold months. After siderail 658 is wrapped, a heat source (such as a hair dryer) is used to blow hot air over the sheet. The sheet then shrinks to form a tight fit over siderail 658. When a new patient uses the patient support, the plastic sheet is removed and replaced with a new wrapping of plastic material.

Figure 53:
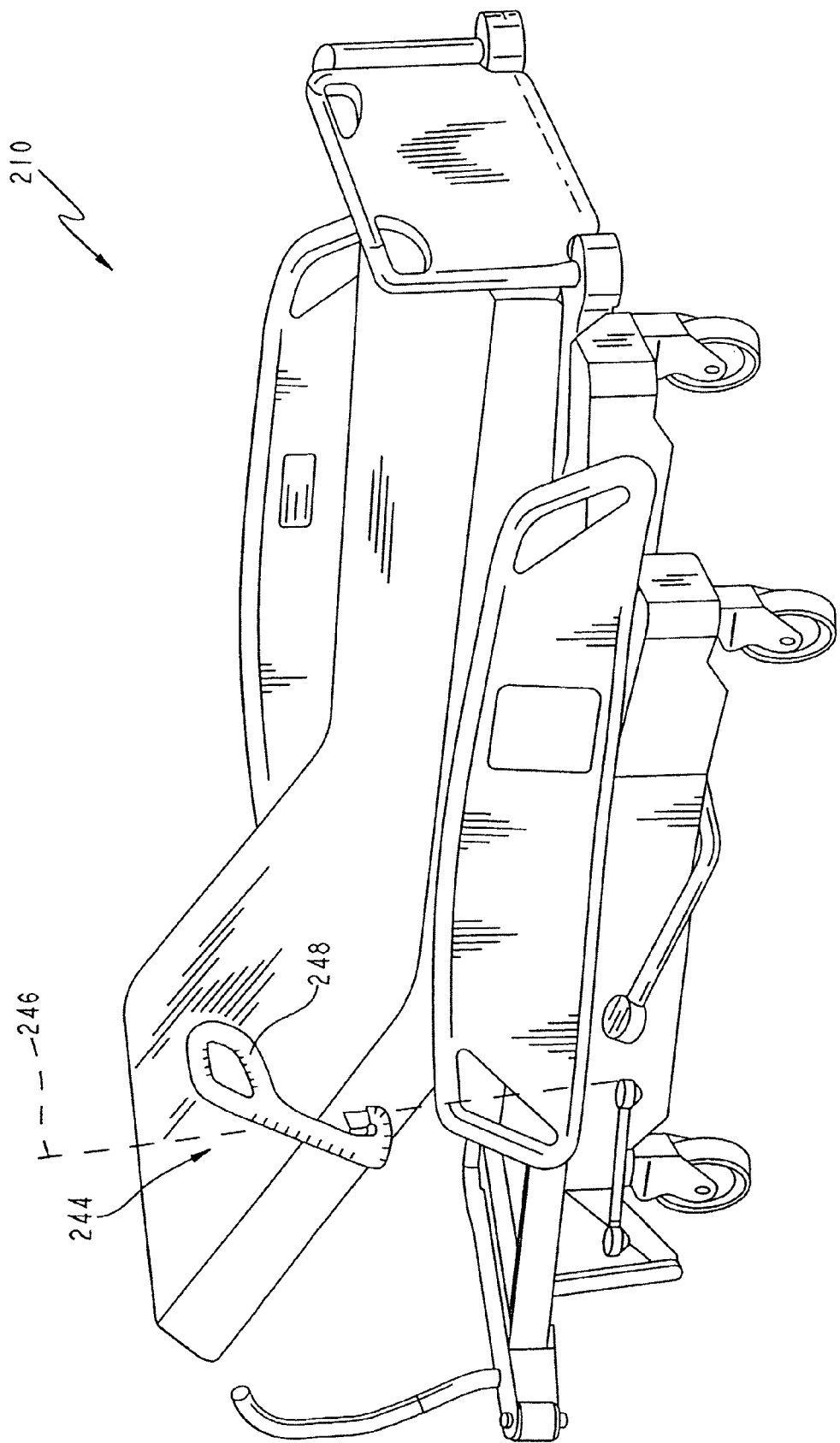
FIG. 53 is perspective of an alternative embodiment patient support showing one of the siderails in a lowered position and a patient-assist arm coupled to an inclined head section of the bedframe.

According to an alternative embodiment of the present disclosure, patient support 210 is provided with a patient-assist arm 244 as shown in FIG. 53. Patient-assist arm 244 is pivotally coupled to a head section of the articulating deck to move therewith. Preferably, patient-assist arm is raised when the siderail is lowered to provide something for the patient positioned on patient assist to grab when entering or exiting patient support 210.

Patient-assist arm 244 pivots about an axis of rotation 246 that is located in a vertical plane and at an angle of 45 degrees relative to the head section of the deck. Thus, when patient-assist arm 244 is moved from a raised position, as shown in FIG. 53, to a lowered position tucked under the head section of the deck, a handle portion 248 of patient-assist arm 244 moves transversely away from mattress 222 until patient assist arm 244 is in the same plane as the head section. As patient-assist arm 244 is rotated further toward the lowered position, handle portion 248 moves transversely toward mattress 222. Furthermore, as patient-assist arm 244 is lowered, handle portion 248 moves toward a head end of patient support 210.

Additional disclosure of patient-assist arm 244 and configuration for coupling and latching patient-assist arm to a deck section is provided in U.S. Pat. No. 5,060,327 to Celestina et al, the disclosure of which is expressly incorporated by reference herein. According to alternative embodiments of the present disclosure, other configurations of patient-assist arms are coupled to the head section of the deck using the angled pivot arrangement shown U.S. Pat. No. 5,060,327. According to another embodiment, the patient-assist arms shown in U.S. Pat. No. 6,240,583, filed Nov. 9, 1999 to Brooke et al. are coupled to the head section to rotate about the angle pivot. Alternatively, the patient assist arms are coupled to the head section using the coupling configuration provided in U.S. Pat. No. 6,240,583, the disclosure of which is expressly incorporated by reference herein.

Figure 54:
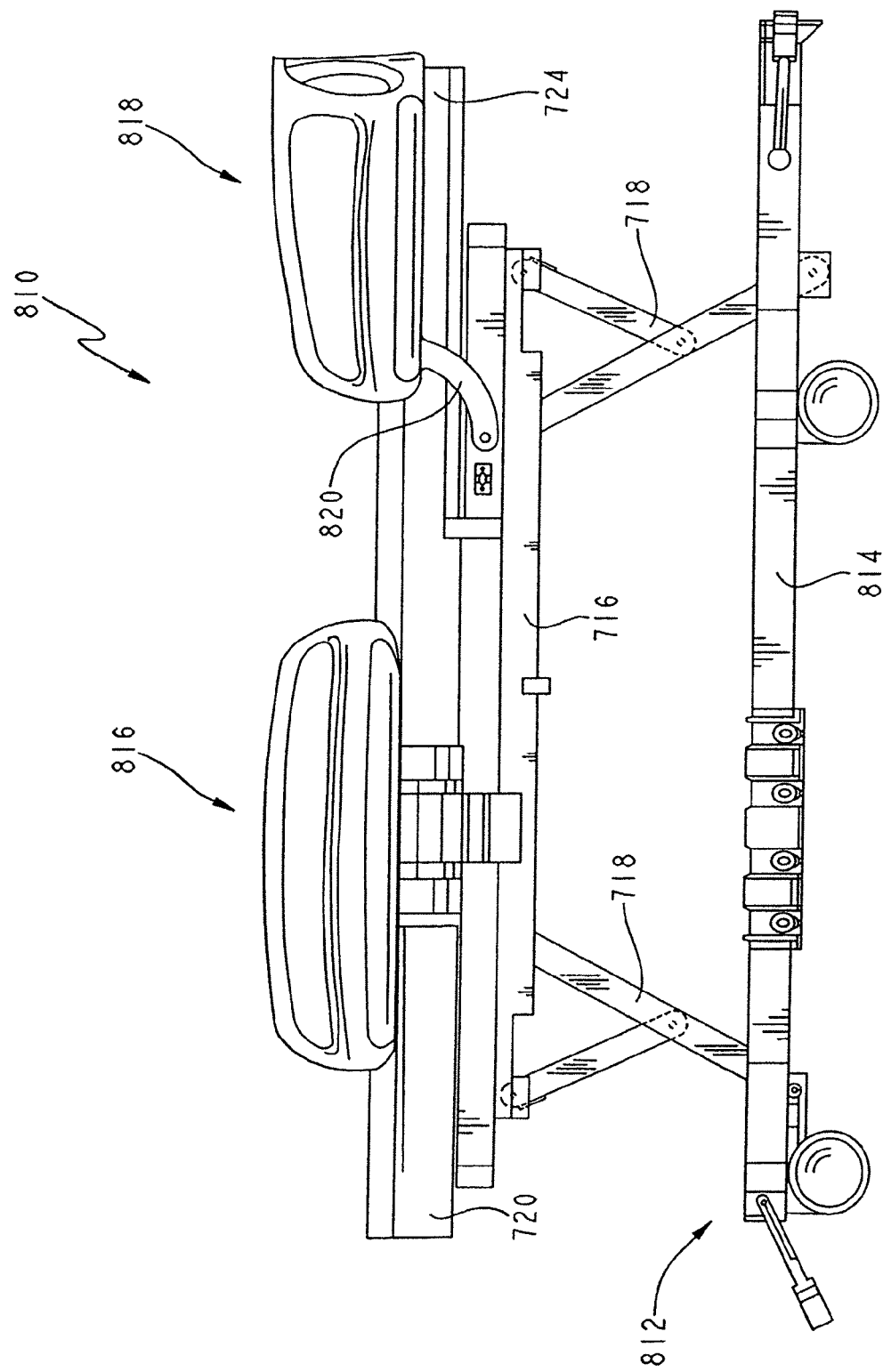
FIG. 54 is a side elevation view of another patient support showing the patient support including a first siderail coupled to a bedframe and a second siderail/headrail combination coupled to the bedframe.

Another patient support 810 is provided in FIG. 54. Patient support 810 includes a bedframe 812 including a base frame 814 and intermediate frame 716 supported above base frame 814 by lift arms 718, and an articulating deck 720 supported on intermediate frame 716.

Figure 55:
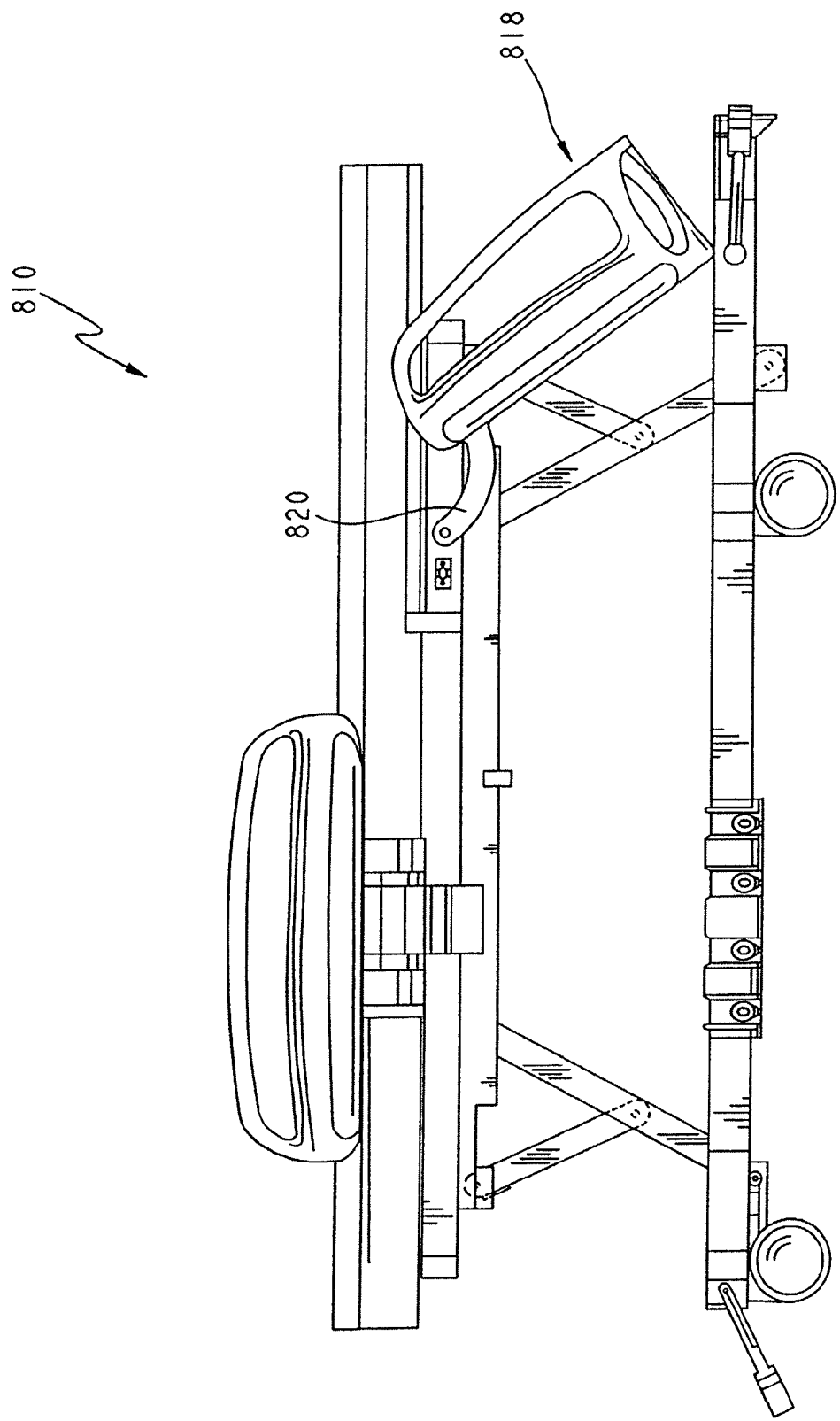
FIG. 55 is a view similar to FIG. 54 showing the second siderail/headrail combination positioned in a lowered position to permit egress of patient from the patient support.

Patient support 810 further includes a foot end siderail 816 coupled to deck 720. According to an alternative embodiment of the present disclosure, the foot end siderail is coupled to the intermediate frame. Patient support 810 further includes a head end siderail/headrail 818 that is positioned on each side of head section 724 and around the end of head section 724. Rail 818 is pivotally coupled to intermediate frame 716 by a support arm 820. As shown in FIG. 55, rail 818 is configured to move to a lowered position permitting egress of a patient from patient support 810. According to alternative embodiments of the present disclosure, the rail is coupled to the head section of the deck.

A portion of a patient support is shown in FIG. 56 along with a blocker 344 coupled to perimeter rail 332 of siderails 324, 328 by a pair of straps 346. Blocker 344 includes a rigid back panel 348 and a foam panel 350 coupled to back panel 348. Panels 348, 350 are formed to include a plurality of apertures 352 therein to facilitate seeing through blocker 344. According to alternative embodiments of the present disclosure, other sizes, and shapes of apertures, if any, are provided.

As shown in FIG. 57, blocker 344 covers or blocks access to a gap 354 between siderails 324, 328 and a mattress 356 when siderails 324, 328 are in the raised position. When siderails 324, 328 are rotated to the lowered position, blocker 344 rotates to the outside of siderail 324, 328 as shown in FIG. 58. When siderails 324, 328 are raised again, blocker 344 is flipped back over siderails 324, 328 to the position shown in FIG. 57. According to alternative embodiments of the present disclosure, the blocker is provided with only a clear rigid panel.

Figure 59:
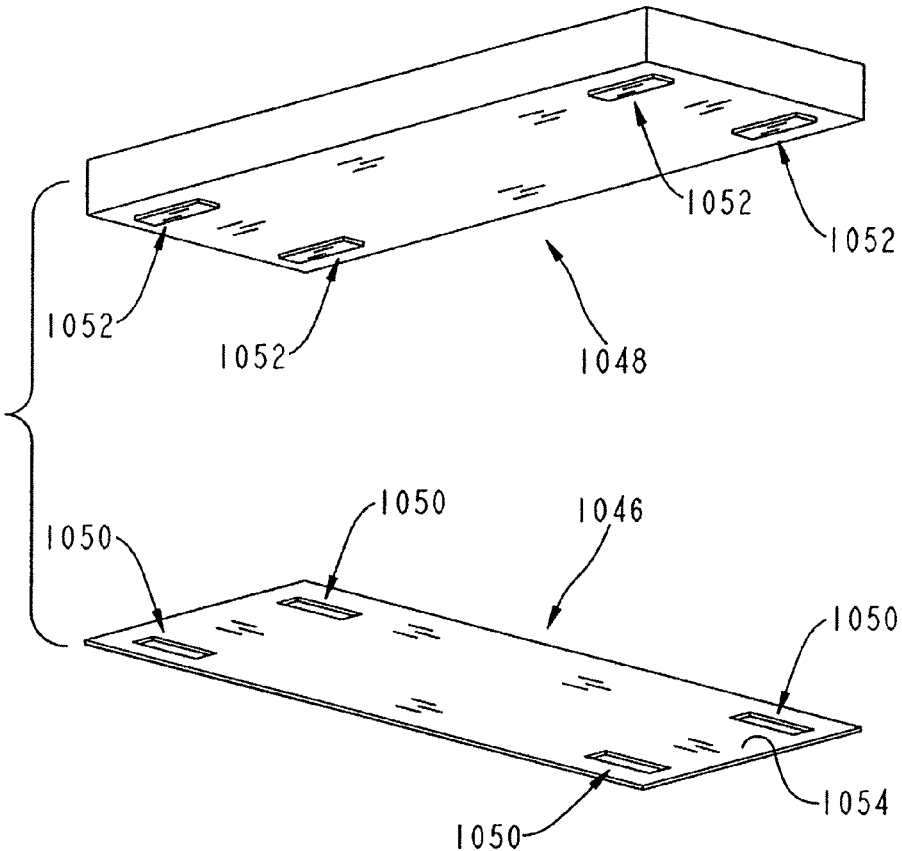
FIG. 59 is an assembly view of a mattress and deck showing the mattress including four rectangular magnets coupled to an underside thereof and the deck including four pockets sized to receive the magnets.

Another deck 1046 and mattress 1048 are shown in FIG. 59. Deck 1046 includes a plurality of voids 1050 sized to receive magnets 1052 coupled to mattress 1048 to prevent transverse shifting of mattress 1048 on deck 1046. According to alternative embodiments of the present disclosure, the deck is an articulating deck such as deck 14 described above.

Figure 60:
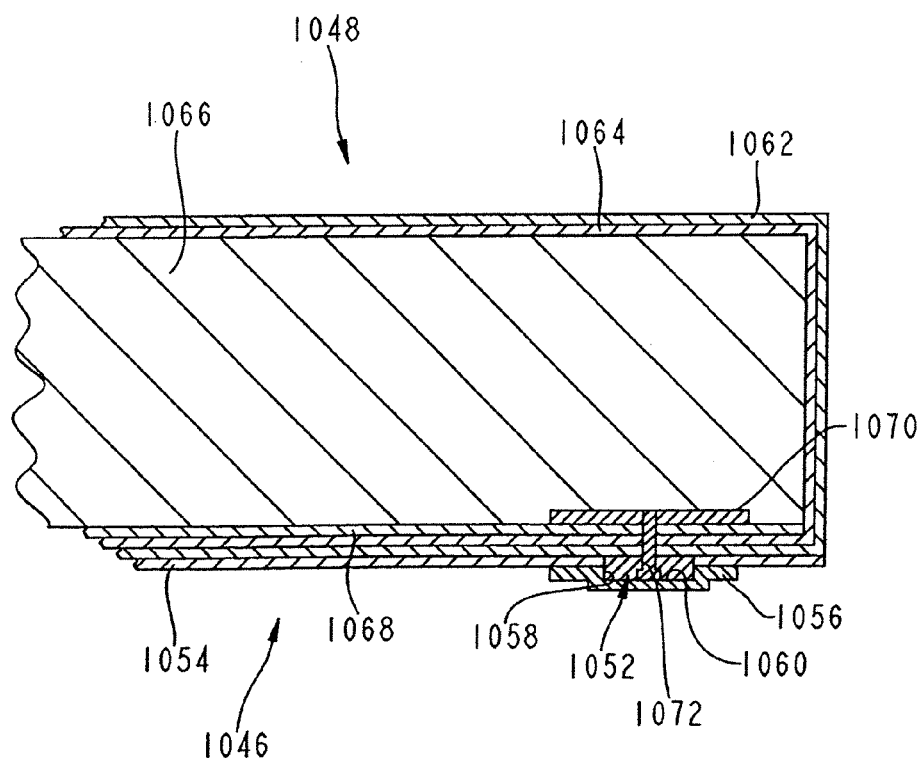
FIG. 60 is a partial cross-sectional view of the mattress and deck of FIG. 59.

As shown in FIG. 60, deck 1046 includes a plastic deck panel 1054 and a steel receptacle 1056 coupled to an underside of panel 1054. Deck panel 1054 includes an aperture 1058 and receptacle 1056 include a depression 1060 that cooperates with aperture 1058 to define voids 1050 sized to receive magnet 1052. Because receptacle 1056 is made of a ferrous metal, magnet 1052 is attracted to receptacle 1056 and "sticks" thereto. According to alternative embodiments of the present disclosure, a flat metal plate is provided in place of the metal receptacles. According to an alternative embodiment, the deck is made of steel and formed to include channels to receive magnets 1052.

Mattress 1026 includes a layer of tick or a cover 1062, a fire barrier 1064, and a foam core 1066 positioned in fire barrier 1064. According to alternative embodiments, other core configurations known to those of ordinary skill in the art are provided. A plastic panel 1068 is adhered to core 1066 and a plywood board 1070 is sandwiched between plastic panel 1068 and core 1066. A screw 1072 is driven through magnet 1052, cover 1062, fire barrier 1064, plastic panel 1068, and into board 1070 to couple magnets 1052 to mattress 1048. Preferably, magnets 1052 are flexible and are 8 inches long, 1.5 inches wide, and 0.25 inches thick.

To couple mattress 1026 to deck 1046, mattress 1026 is first positioned on deck 1026. Mattress 1026 is then slid transversely until magnets 1052 "drop" into voids 1050 and stick to metal receptacles 1056. Because deck panel 1054 is plastic, magnets 1052 are not attracted to panel 1054 and slide freely on panel 1054. In addition to the attraction of magnets 1052 to metal receptacles 1056, the interaction of the edges of magnets 1052 with the edges defining voids 1050 prevents transverse movement of mattress 1026. To remove mattress 1026, magnets 1052 are lifted out of voids 1050 against the magnetic force between magnets 1052 and receptacles 1056.

Figure 61:
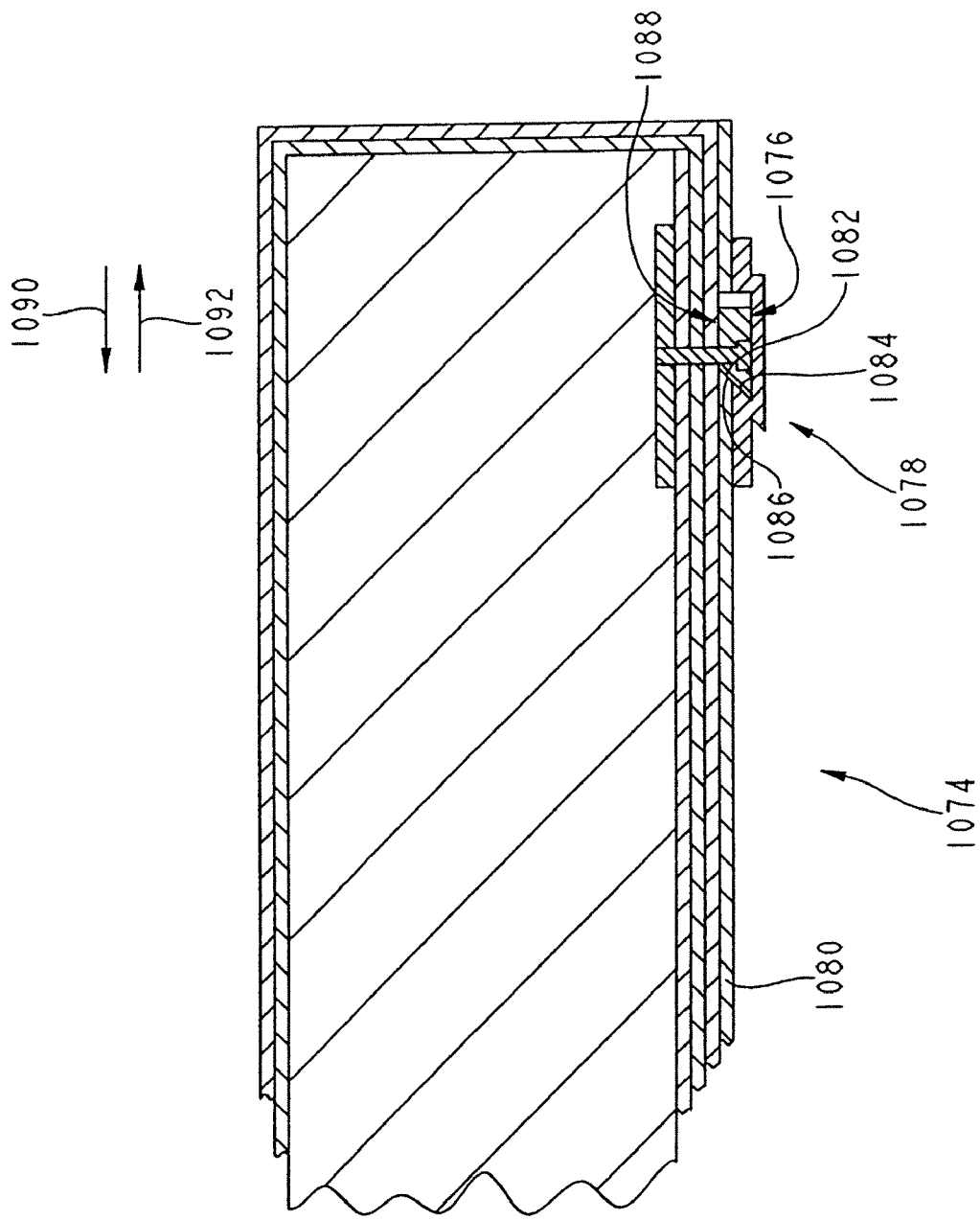
FIG. 61 is a view similar to FIG. 60 of an alternative embodiment mattress and deck.

An alternative embodiment deck 1074, magnet 1076, and receptacle 1078 are shown in FIG. 61. A plastic deck panel 1080 of deck 1074 and receptacle 1078 include inclined edges 1082, 1084 that define an undercut that receive an inclined edge 1086 of magnet 1076. After magnet 1076 drops into void 1088 defined by panel 1080 and receptacle 1078, any movement of mattress 1026 in direction 1090 pulls inclined edge 1086 into the undercut. Contact between inclined edges 1086, 1082, 1084 prevents any further movement of mattress 1026 and locks magnets 1076 against being withdrawn from void 1088. To remove magnet 1076, it must be slide in direction 1092 until magnet 1076 clears the undercut. According to alternative embodiments, the receptacle is a flat metal plate.

Figure 62:
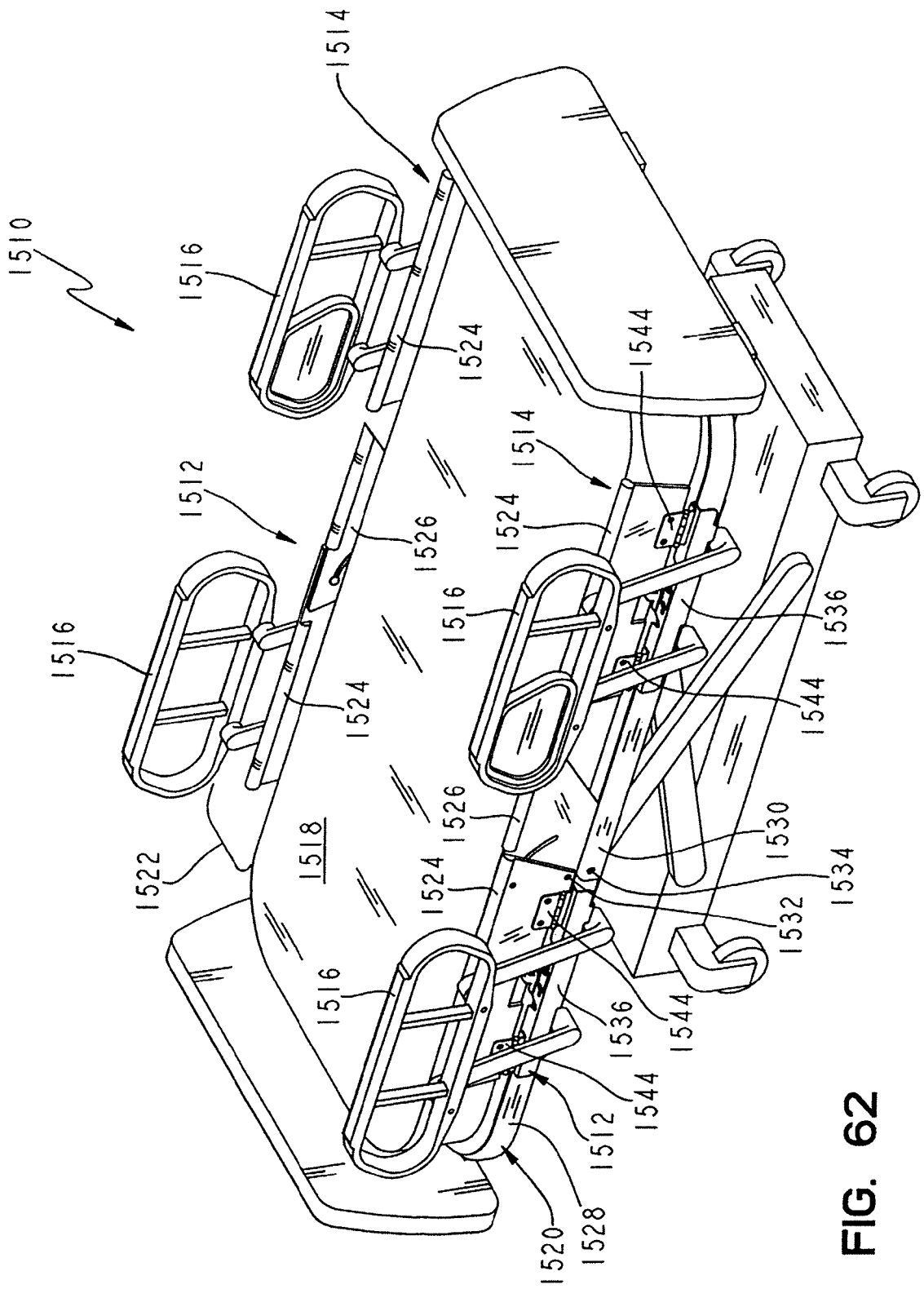
FIG. 62 is a perspective view of another alternative embodiment patient support showing the patient support including flaps between the siderails and the mattress.
Figure 63:
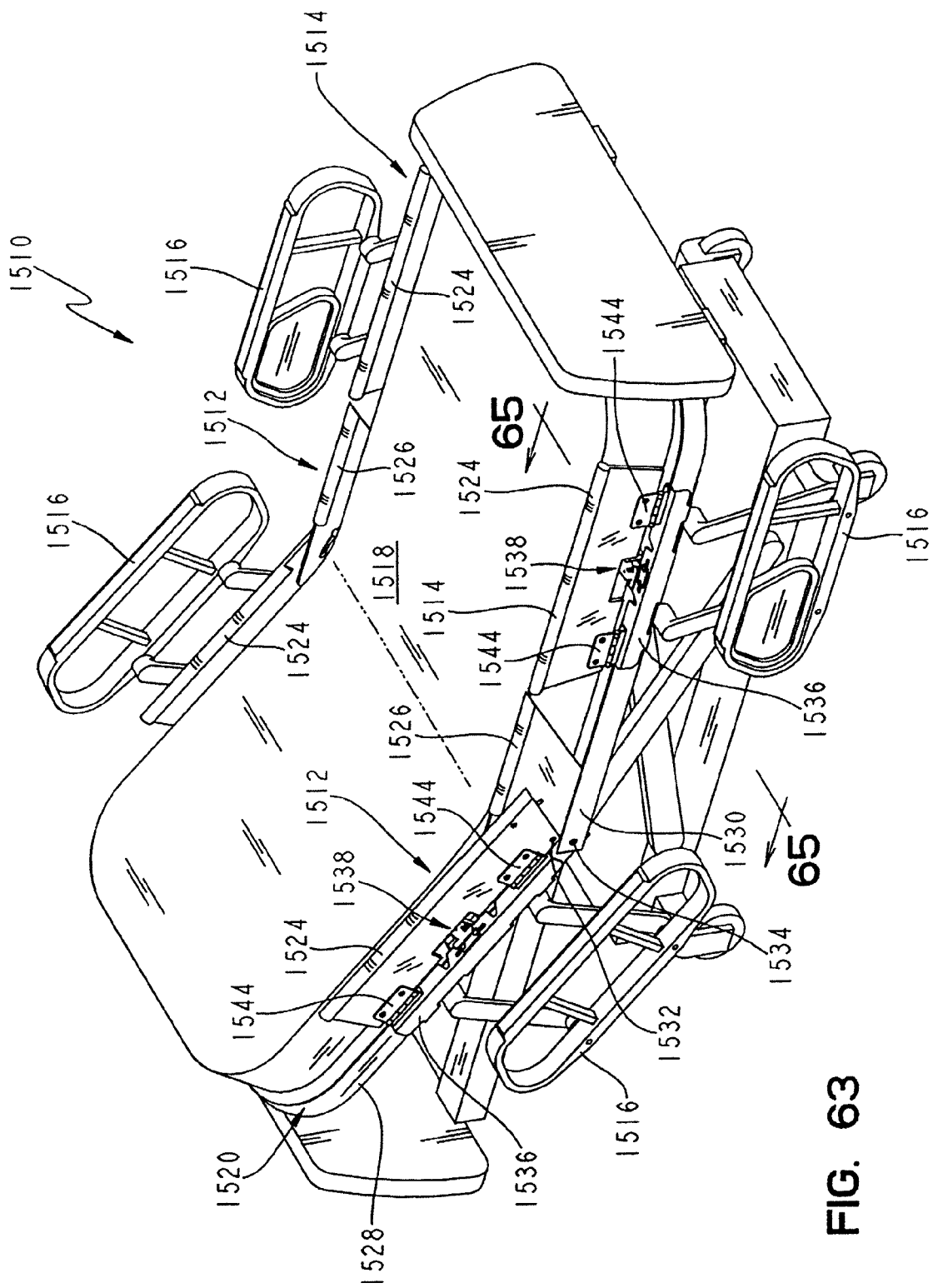
FIG. 63 is a perspective view of the patient support of FIG. 62 showing a head end siderail and foot end siderail in a lowered position.
Figure 64:
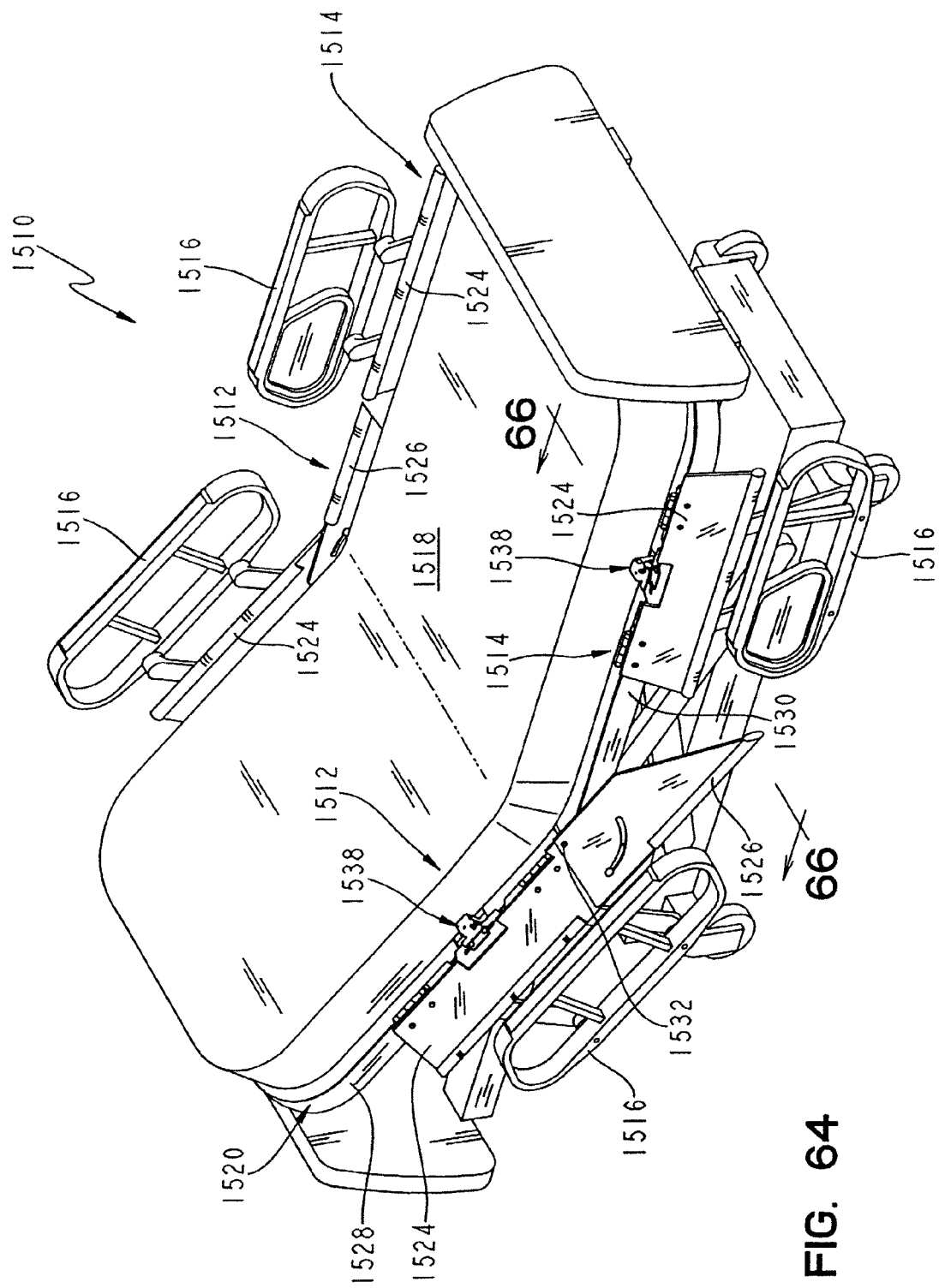
FIG. 64 is a perspective view of the patient support of FIG. 62 showing a head end flap and a foot end flap, both in a lowered position.
Figure 65:
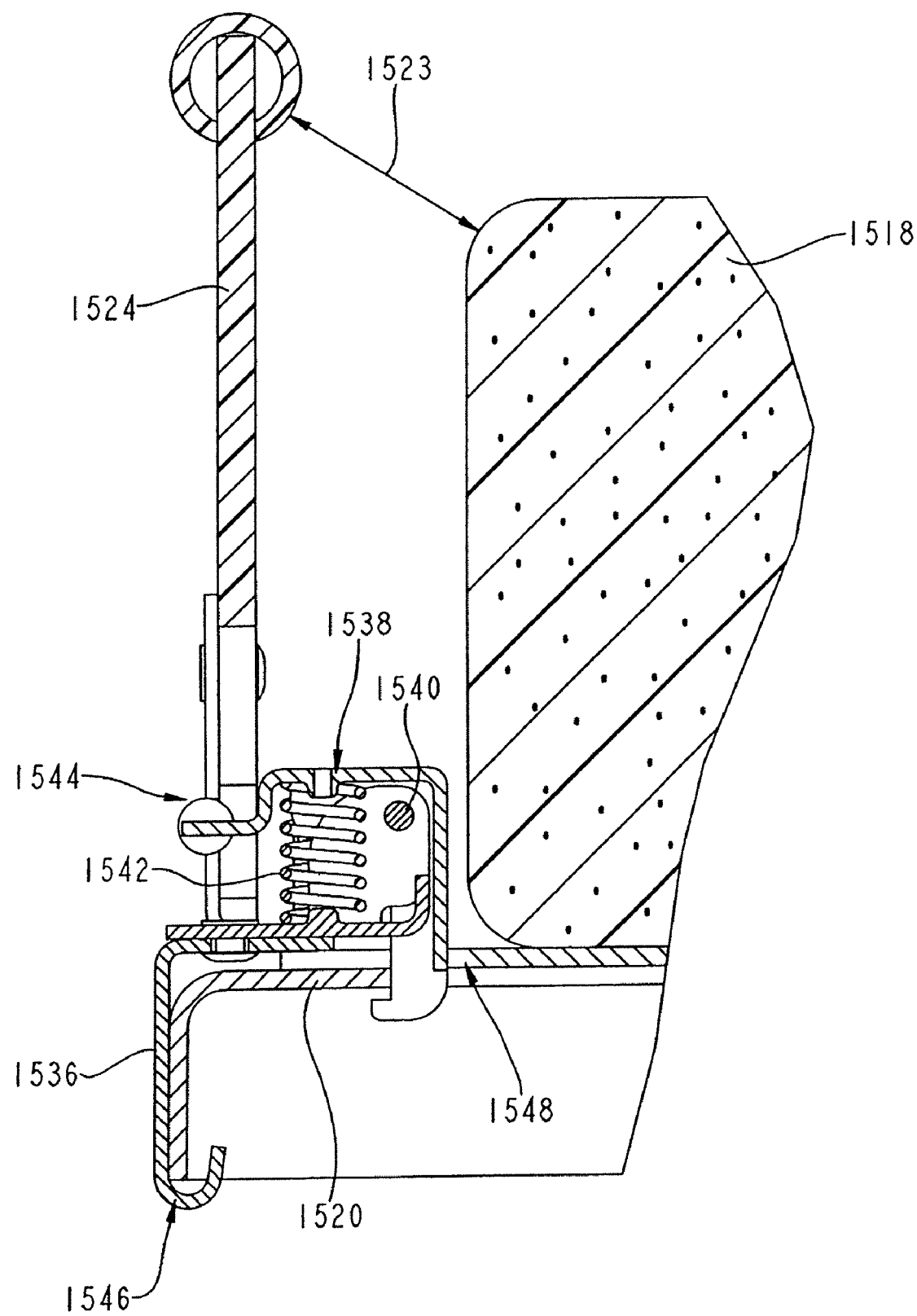
FIG. 65 is a cross sectional view taken along line 65-65 of FIG. 63.
Figure 66:
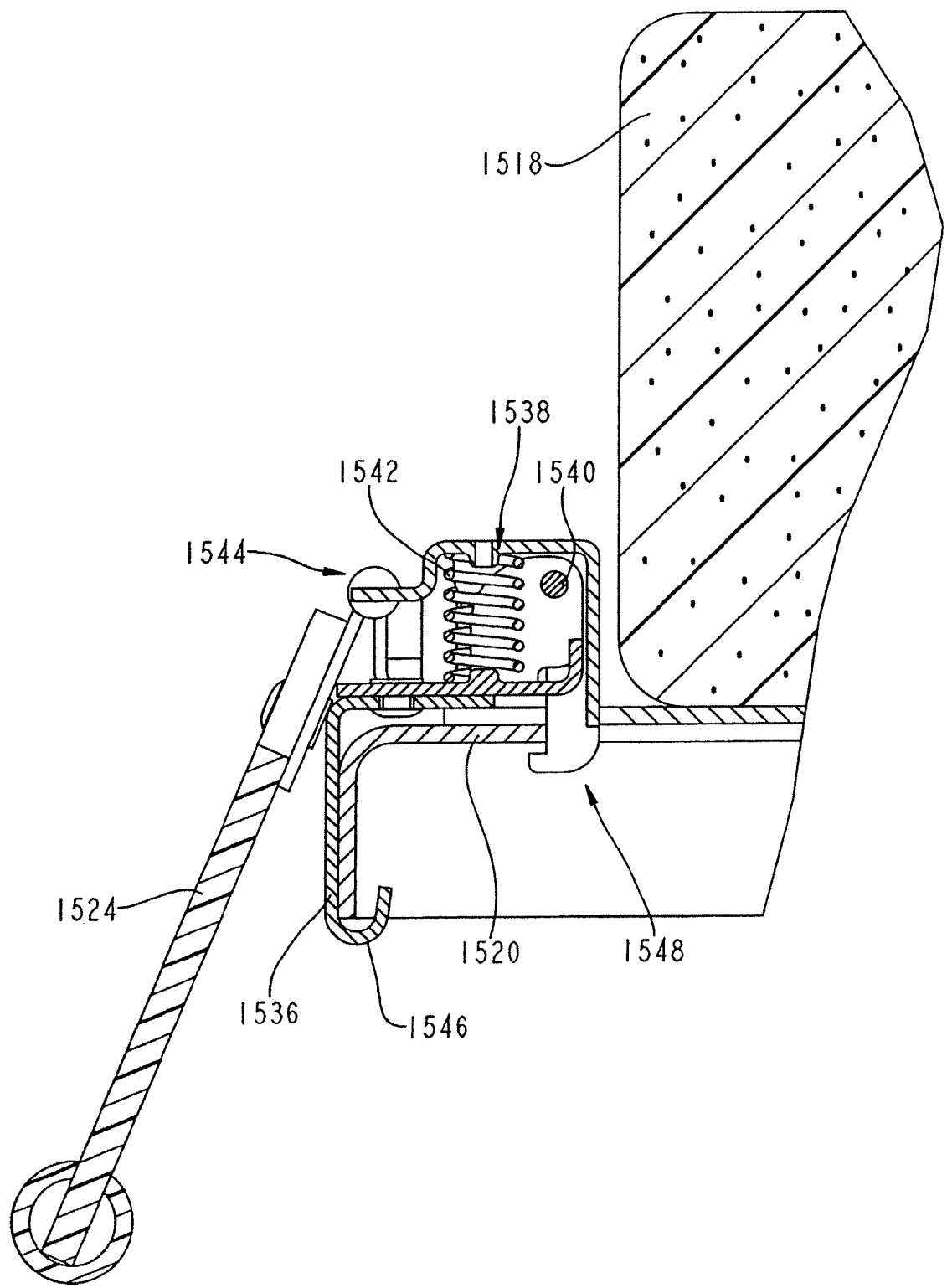
FIG. 66 is a cross sectional view taken along line 66-66 of FIG. 64.

An alternative embodiment patient support 1510 is shown in FIGS. 62-66. Patient support 1510 includes a deck 1520, a mattress 1518, siderails 1516, and a pair of flaps 1512, 1514 coupled to deck 1520. Flaps 1512, 1514 are positioned between siderails 1516 and mattress 1518 as shown in FIG. 62. Each flap 1512, 1514 reduces the width of gaps 1522, 1523 defined between siderails 1516 and mattress 1518. Flaps 1512, 1514 reside within gap 1522 between siderails 1516 and mattress 1518 when siderails 1516 are in a raised position as shown in FIG. 62 and thereby block and/or reduce the size of gap 1523 as shown in FIG. 65.

Figure 67:
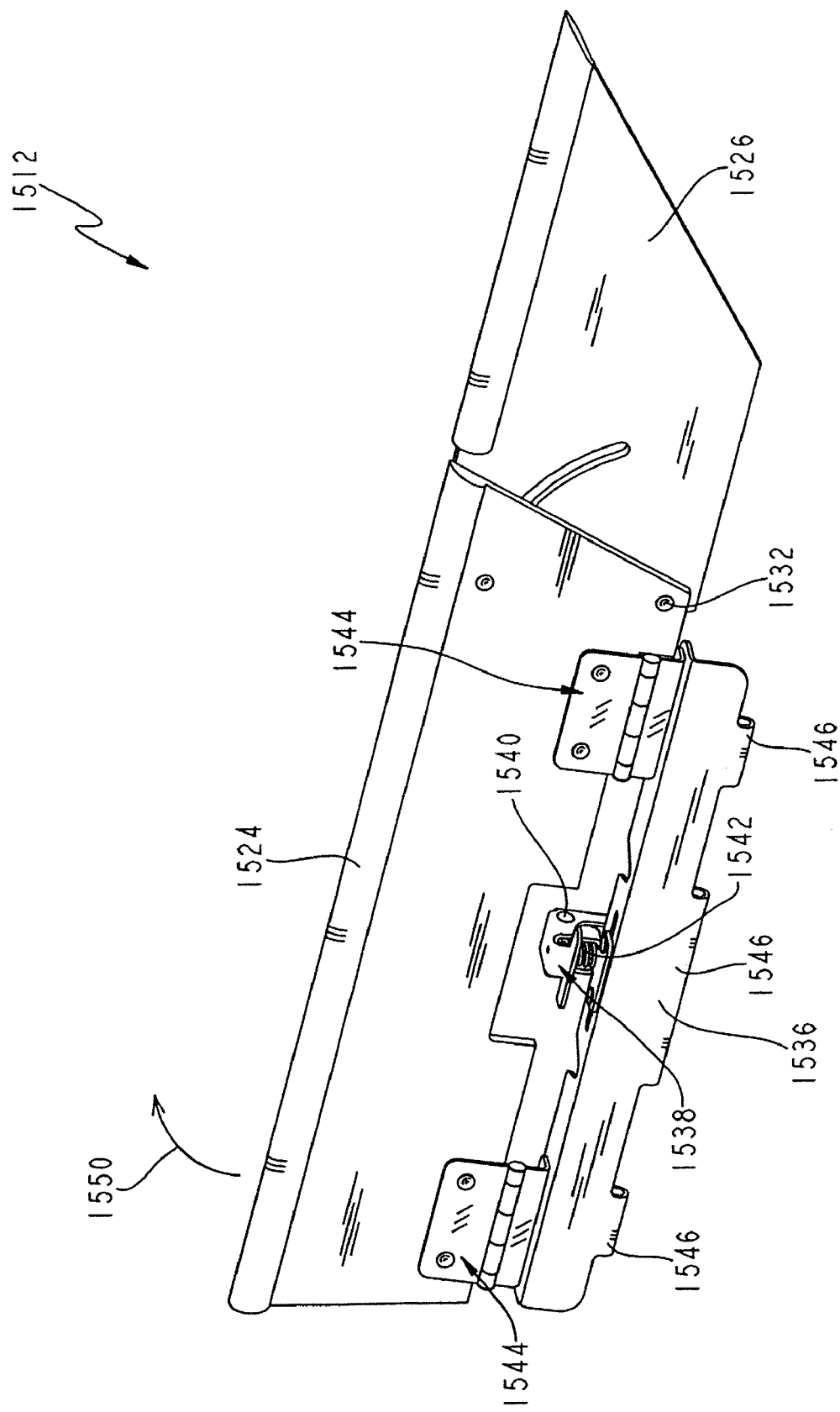
FIG. 67 is a perspective view of a side of a head end flap of FIG. 62 that faces the siderail.
Figure 68:
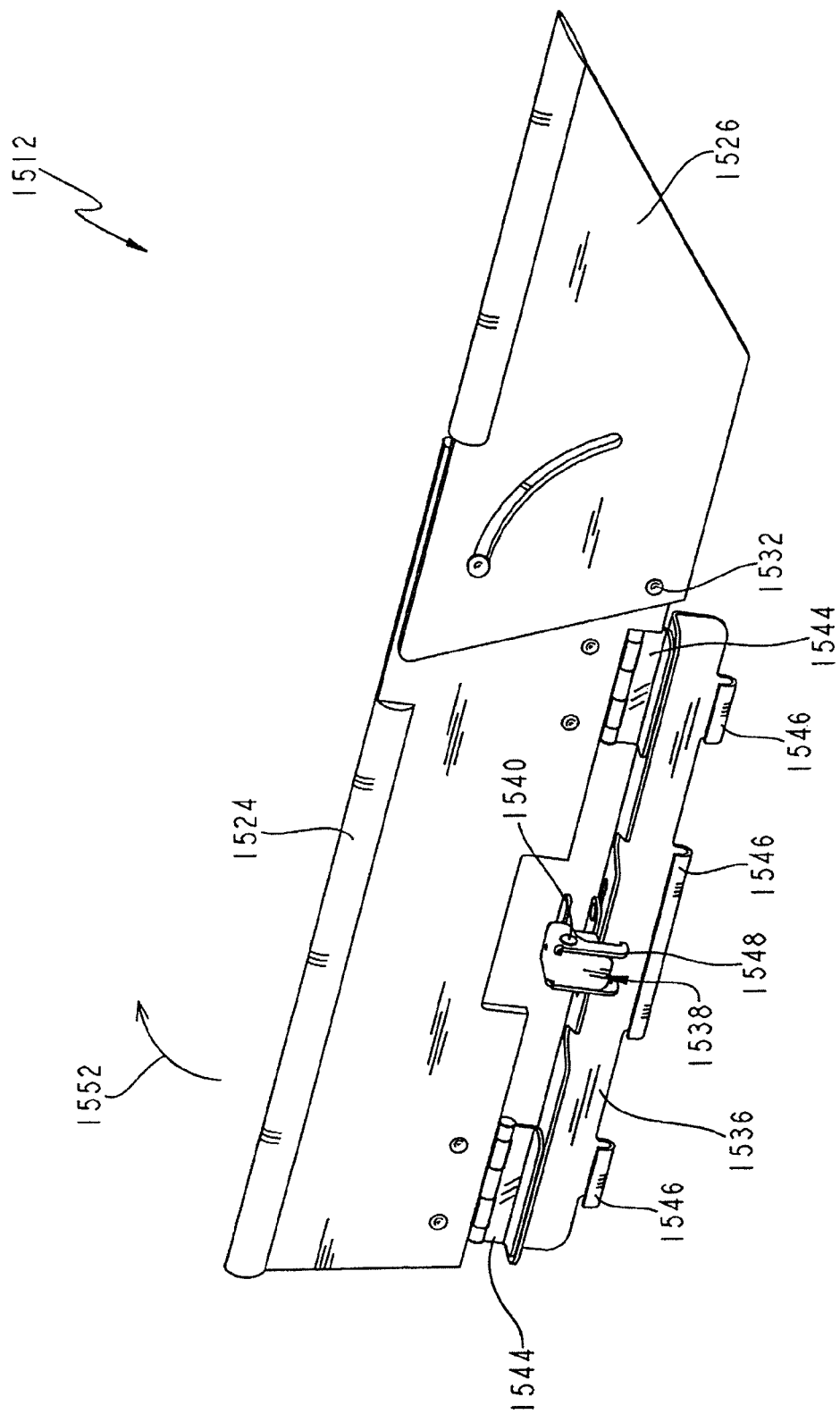
FIG. 68 is a perspective view of a side of the head end flap of FIG. 67 that faces the mattress.

As shown in FIGS. 67 and 68, each flap 1512, 1514 includes a base plate 1536, latch 1538, latch pivot pin 1540 pivotably coupling latch 1538 to base plate 1536, spring positioned between latch 1538 and base plate 1536, and hinges 1544. Base plates 1536 of head end flap 1512 and foot end flap 1514 couple to deck 1520.

Head end flap 1512 includes a main flap 1524 and an auxiliary flap 1526 that is pivotable relative to main flap 1524 at a pivot 1532 between main and auxiliary flaps 1524, 1526. Main flap 1524 is attached to and extends along a head section 1528 of patient support 1510. Auxiliary flap 1526 extends along a seat section 1530 of patient support 1510. Pivot 1532 is positioned above a pivot 1534 of head section 1528 and seat section 1530. As head section 1528 articulates relative to seat section 1530, flaps 1524, 1526 maintain their positions relative to their respective sections 1528, 1530 of patient support 1510 as shown in FIG. 63.

Lowering siderails 1516 allows main flap 1524 to rotate via hinges 1544 relative to deck 1520 and assume a lowered position as shown in FIG. 64. When in the lowered position, siderails 1516 and flaps 1524 do not block egress of a patient.

Figure 69:
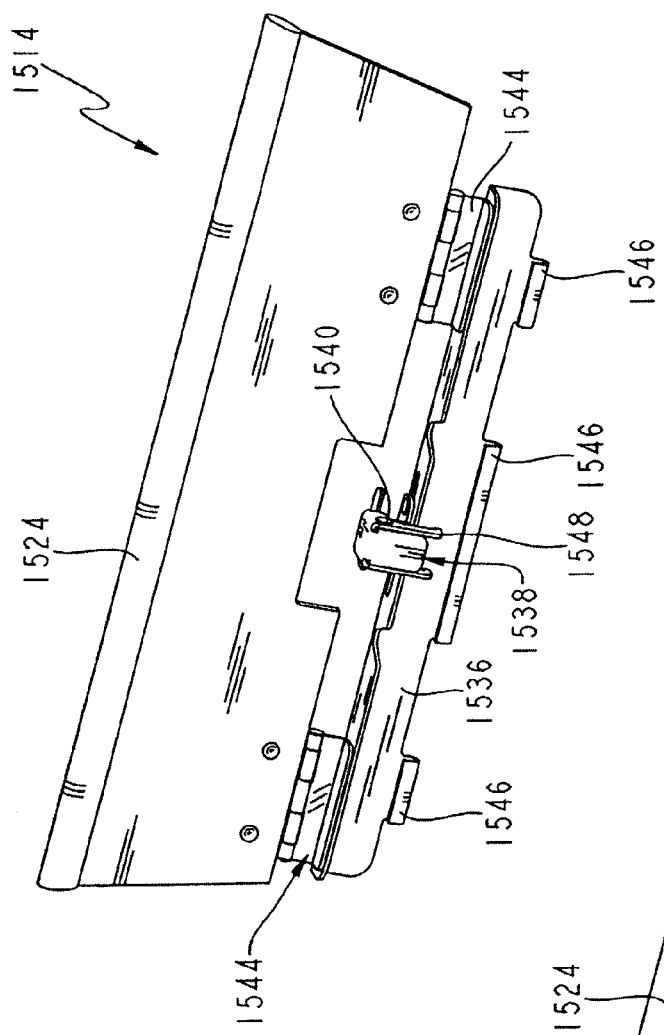
FIG. 69 is a perspective view of a side of a foot end flap of FIG. 62 that faces the mattress.
Figure 70:
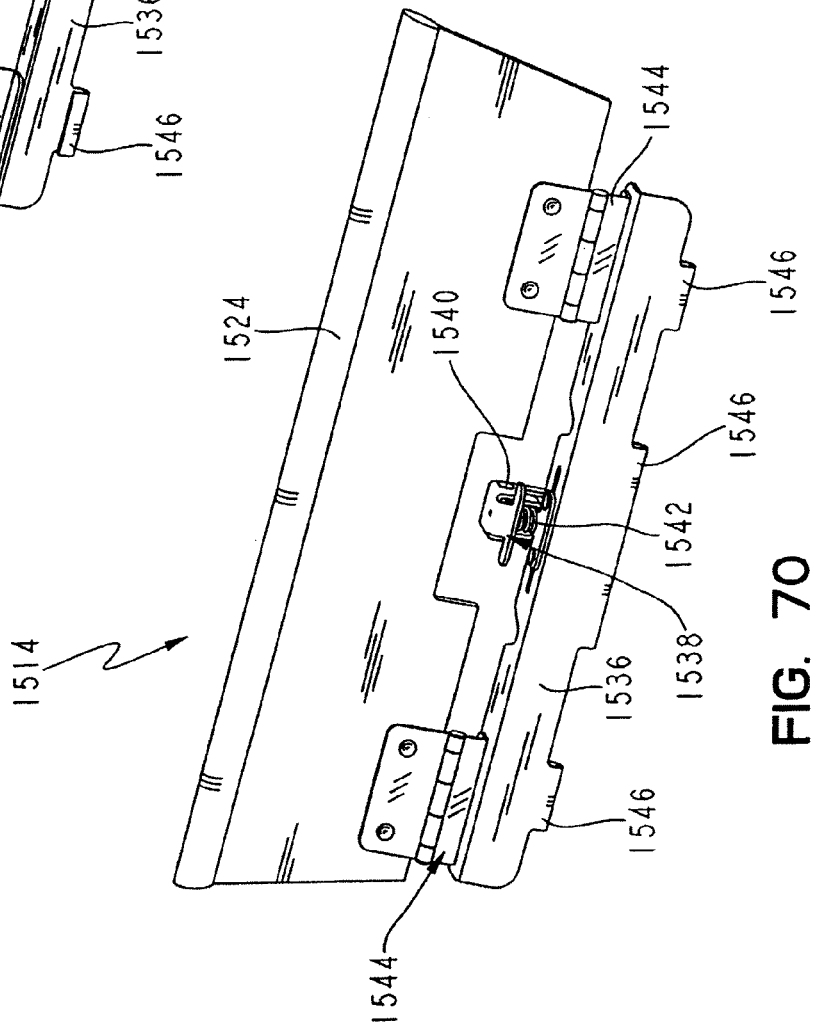
FIG. 70 is a perspective view of a side of the foot end flap of FIG. 69 that faces the siderail.

Flaps 1512, 1514 are preferably detachable from the rest of the patient support to permit removal of flaps 1512, 1514 from deck 1520. Latches 1538 and base plates 1536 removably clamp flaps 1512, 1514 to deck 1520. Base plates 1536 include a hook portion or a plurality of hook portions 1546 that engage a side of deck 1520 as shown in FIGS. 69 and 70. Latch 1538 also has a hook portion 1548. Latch 1538 has a first position wherein latch 1538 engages a top of deck 1520 and a second position wherein latch 1538 disengages deck 1520. Spring 1542 urges latch 1538 to the first position where latch 1538 and hook portions 1546, 1548 combine to clamp flaps 1512, 1514 to deck 1520. To remove flaps 1512, 1514 from deck 1520, latch 1538 is placed in second position to disengage latch 1538 from deck 1520 and allow flaps 1512, 1514 to be removed. Raising siderail 1516 causes siderail 1516 to contact and raise flaps 1512, 1514 in direction of arrow 1550 as shown in FIG. 67.

Figure 71:
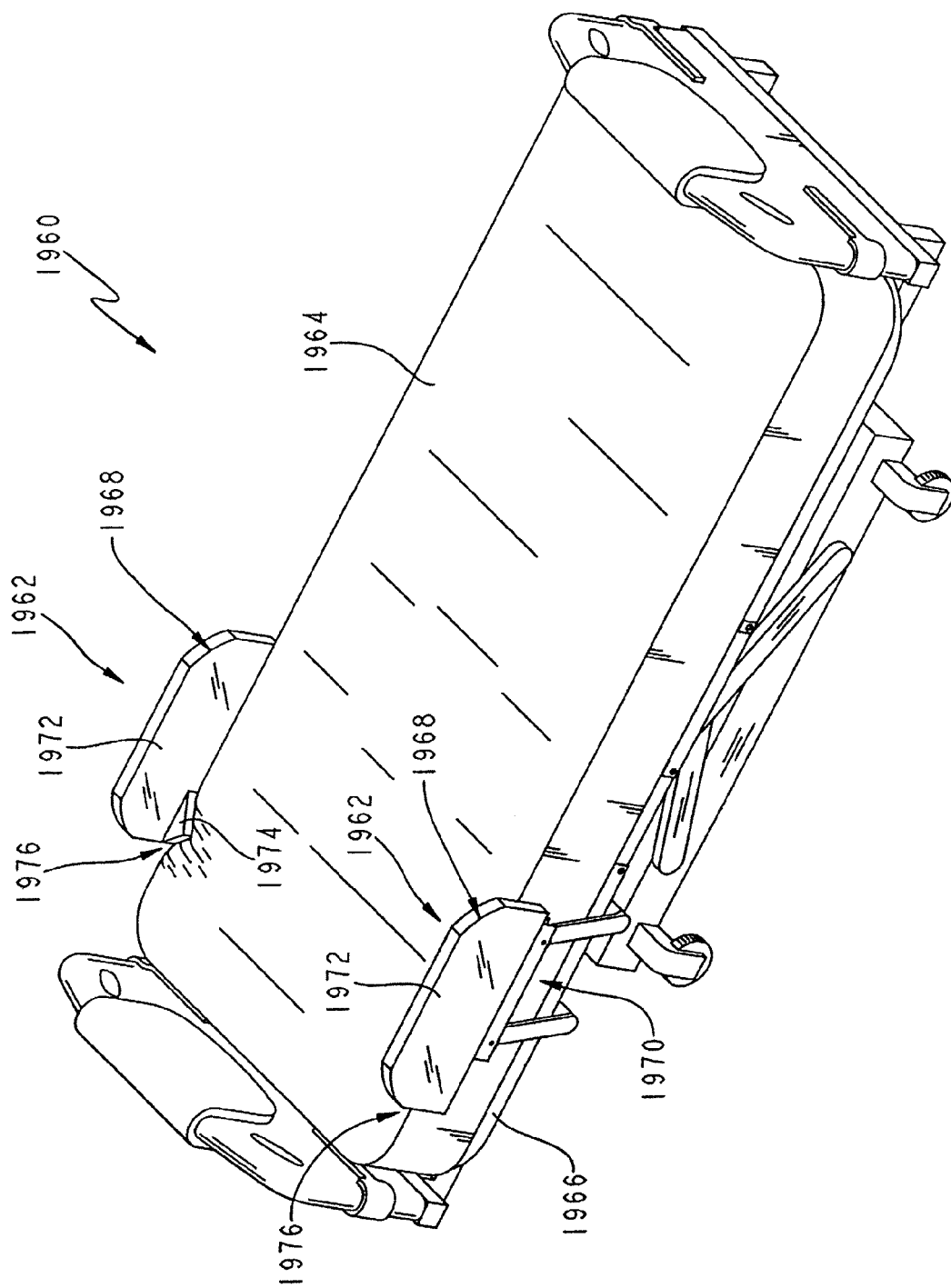
FIG. 71 is a perspective view of another alternative embodiment patient support showing the patient support including siderails.
Figure 72:
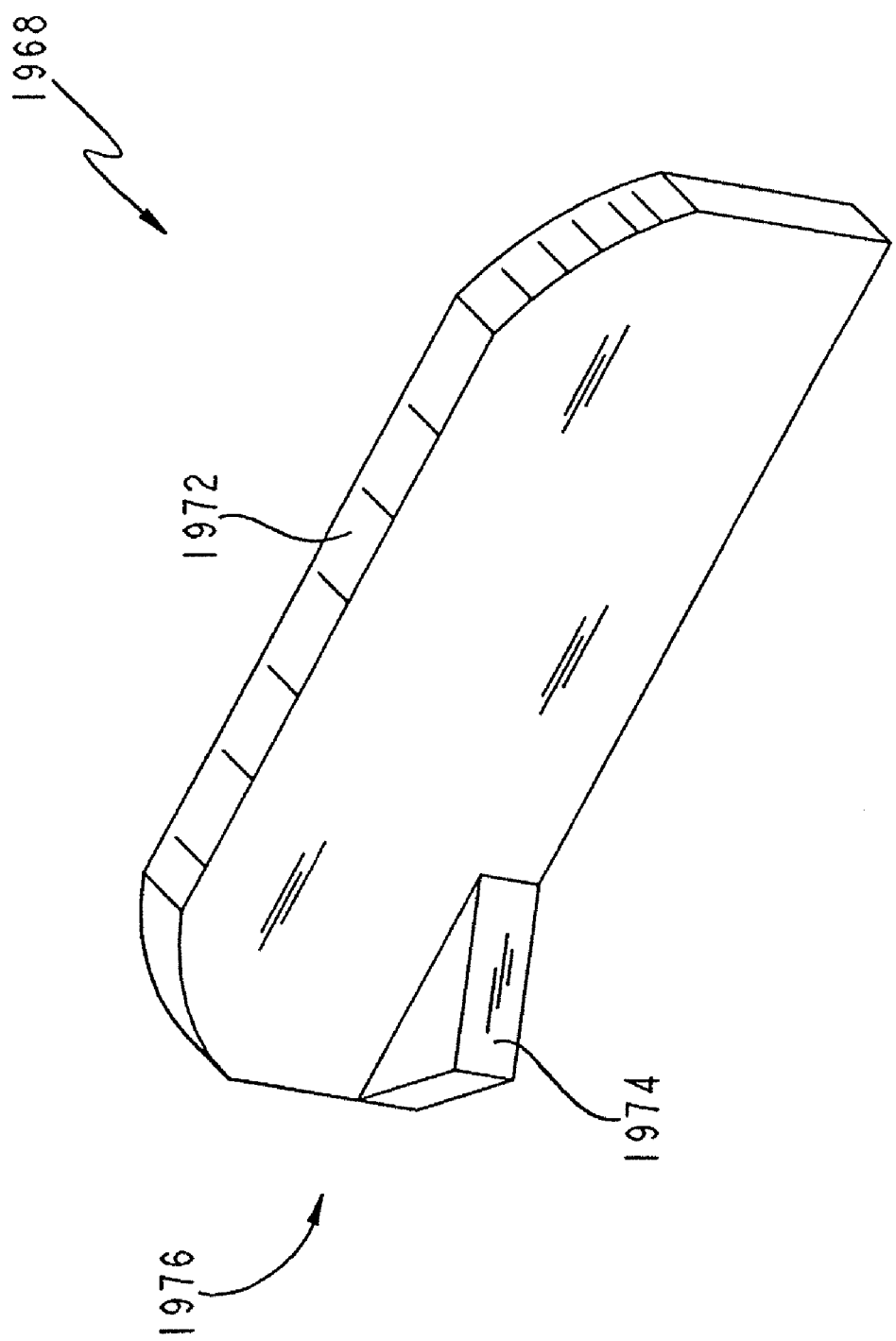
FIG. 72 is a perspective view of a rail member of the siderails of the patient support shown in FIG. 71.

Another embodiment patient support 1960 is shown in FIG. 71. Patient support 1960 includes a deck 1966, a mattress 1964 positioned on deck 1966, and siderails 1962 coupled to deck 1966. Siderails 1962 include rail members 1968 and linkages 1970 that couple rail members 1968 to deck 1966. Each rail member 1968 includes a vertical portion 1972 and a horizontal wedge portion 1974 coupled to vertical portion 1972 near a head end 1976 of rail member 1968. Wedge portion 1974 extends into mattress 1964 when siderail 1962 is in a raised position and slightly compress mattress 1964. Wedge portion 1974 blocks a gap defined between mattress 1964 and head end of rail member 1968.

Figure 73:
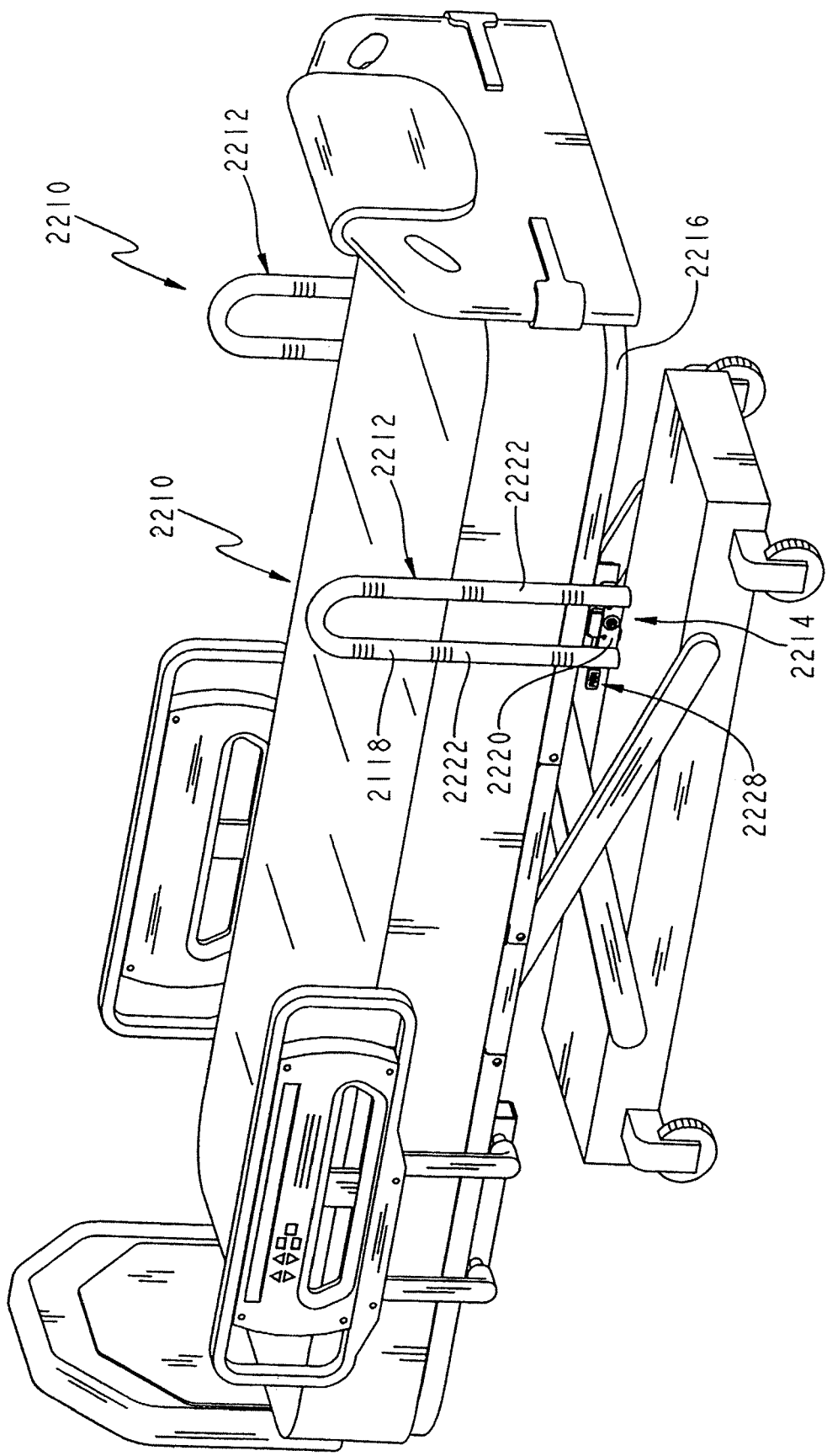
FIG. 73 is a perspective view of another alternative embodiment patient support showing a patient support including siderails.
Figure 74:
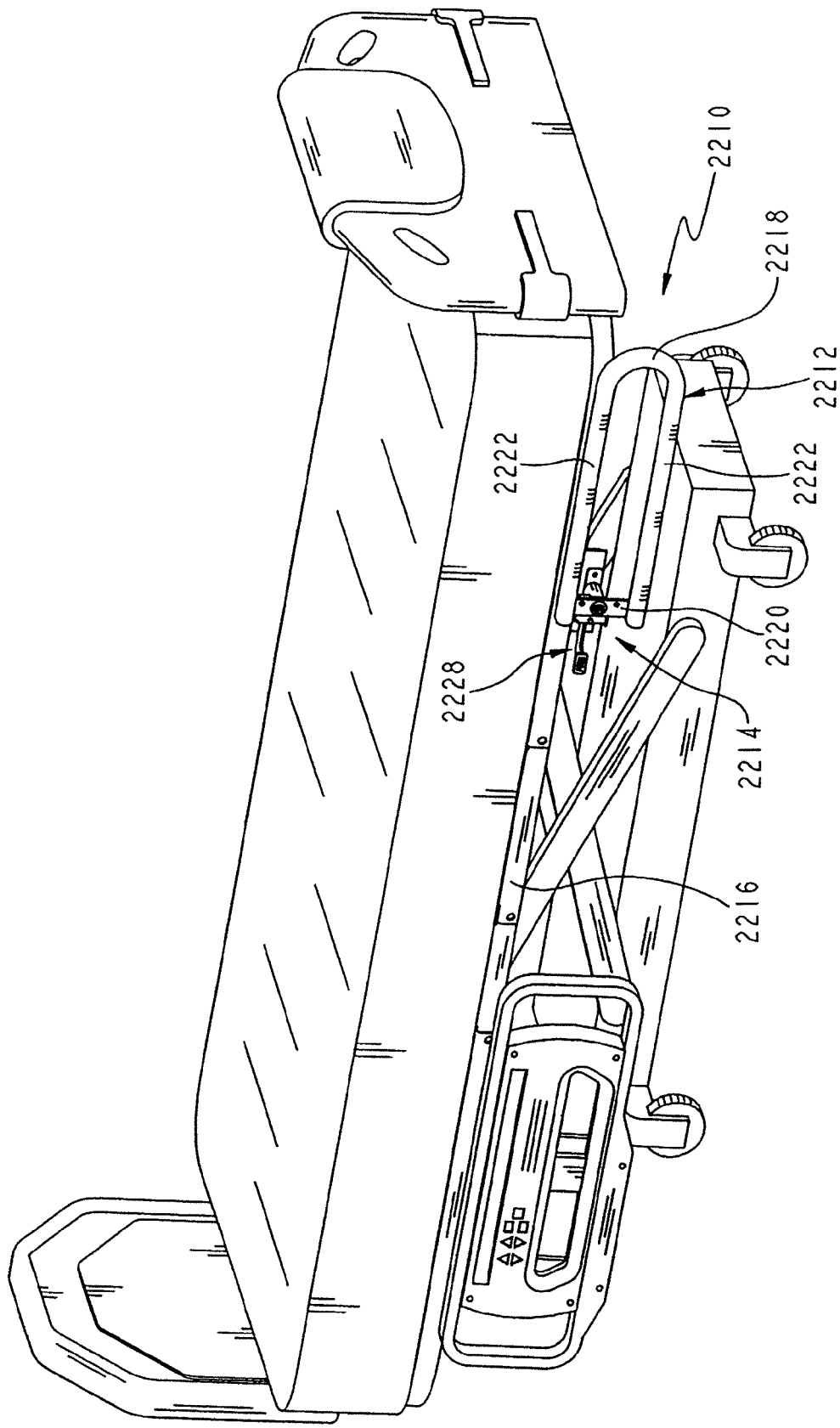
FIG. 74 is a perspective view of the patient support of FIG. 73 showing the siderails in a lowered position.
Figure 77:
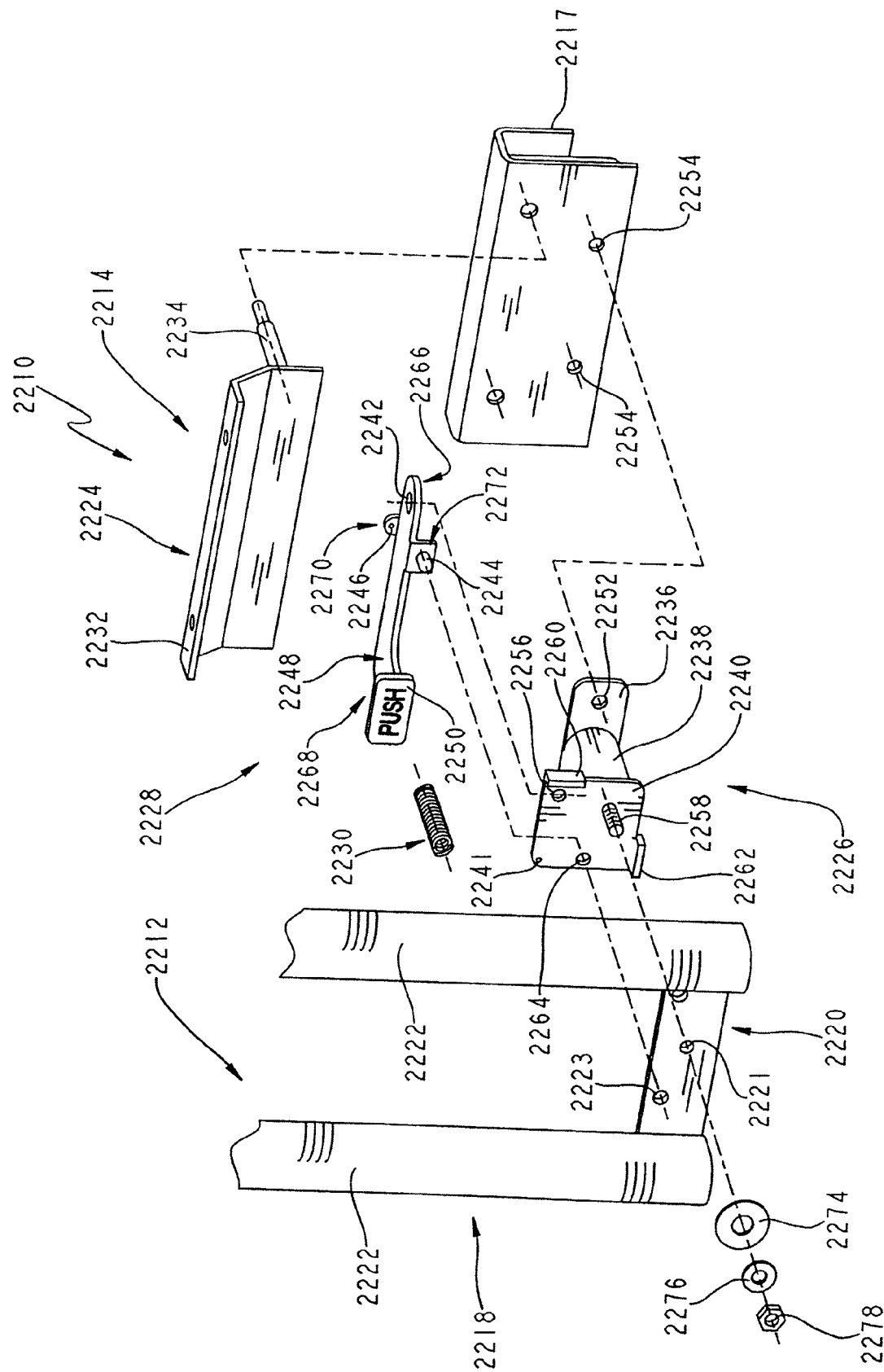
FIG. 77 is an exploded view of the latch of FIG. 75.

Another alternative embodiment siderail 2210 is shown in FIGS. 73 and 74. Siderails 2210 include a rail member 2212 and a coupler mechanism 2214 coupling rail member 2212 to deck 2216. Rail member 2212 includes an upright portion 2218, preferably a U-shaped tube constructed from metal or stiff plastic, and an attachment portion 2220. Attachment portion 2220 is preferably a flat plate that extends between tines 2222 of upright portion 2218 and has an attachment void 2221 and a lock void 2223. Coupler mechanism 2214 includes a deck mount 2224 configured to attach to an underside of deck 2216. Deck mount 2244 includes a flange 2232 that couples to deck 2216 and slide posts 2234 rigidly coupled to flange 2232. Coupler mechanism 2214 further includes a slide member 2217 that slide on posts 2234 of deck mount 224, a rotation plate 2226 attached to slide member 2217, a lever 2228 hingedly attached to rotation plate 2226, and a spring 2230 that biases lever 2228 toward rotation plate 2226.

Rotation plate 2226 includes a slide attachment 2236, a spacer 2238, a hinge member 2240, and a spring attachment void 2241. Lever 2228 includes a hinge void 2242, a lock pin 2244, a spring attachment void 2246, and a release arm 2248 having a push plate 2250 thereon. Spring 2230 is a coil type spring that extends between spring attachment voids 2241, 2246.

Slide attachment 2236 of rotation plate 2226 includes apertures 2252 positioned to align with similar apertures 2254 in slide 2216 to receive bolts or another suitable couplers. Spacer 2238 is coupled, preferably by welding, to slide attachment 2236 and rotation plate 2226 and includes a hinge pin 2256 extending upwardly therefrom. Hinge pin 2256 is positioned in hinge void 2242 of lever 2228 to allow lever 2228 to rotate thereon. Hinge member 2240 includes a vertical plate, a horizontally extending, threaded hinge pin 2258, an upper rotation stop 2260, a lower rotation stop 2262, a lock pin void 2264 and spring attachment void 2241.

Release arm 2248 is a substantially flat piece of metal having hinge void 2242 defined in a first end 2266 thereof. Push plate 2250 is a substantially flat piece of metal perpendicularly coupled to a second end 2286 of release arm 2248. Spring attachment void 2246 is disposed in a metal appendage 2270 that extends upwardly from release arm 2248. Lock pin 2244 extends horizontally from a metal flange 2272 that extends downwardly from release arm 2248. Spring 2230 biases lock pin 2244 to a first position within lock pin void 2264.

Threaded hinge pin 2258 is positioned within attachment void 2221 of attachment portion 2220. Washers 2274, 2276 are positioned on hinge pin 2258 and a nut 2278 is threaded onto hinge pin 2258 to rotatably secure attachment portion 2220 of rail member 2212 to rotation plate 2226 of coupling mechanism 2214. Lock void 2223 is positioned such that when lever 2228 is in first position and rail member 2212 is in a raised position, lock pin 2244 extends through lock pin void 2264 and lock void 2223 to prevent relative motion between rail member 2212 and deck 2216.

Depressing push plate 2250 places lever 2228 in a second position. During movement of lever 2228 to the second position, lock pin 2244 is removed from lock void 2223 to permit attachment portion 2220 to rotate relative to rotation plate 2226 in direction 2280. This also moves rail member 2212 to a lowered position as shown in FIGS. 74, 76. Clockwise rotation of attach portion 2220 is limited by upper rotation stop 2260 so that rail member 2212 cannot move beyond the lowered position. Likewise, from the lowered position, rotation in counterclockwise direction 2282, moves rail member 2212 to the raised position. Counterclockwise rotation of attach portion 2220 is limited by lower rotation stop 226 so that rail member 2212 cannot move past the raised position. When in this position, lock pin 2264 aligns with lock void 2223 as shown in FIGS. 73, 75 to lock rail member 2212 in the raised position.

Figure 78:
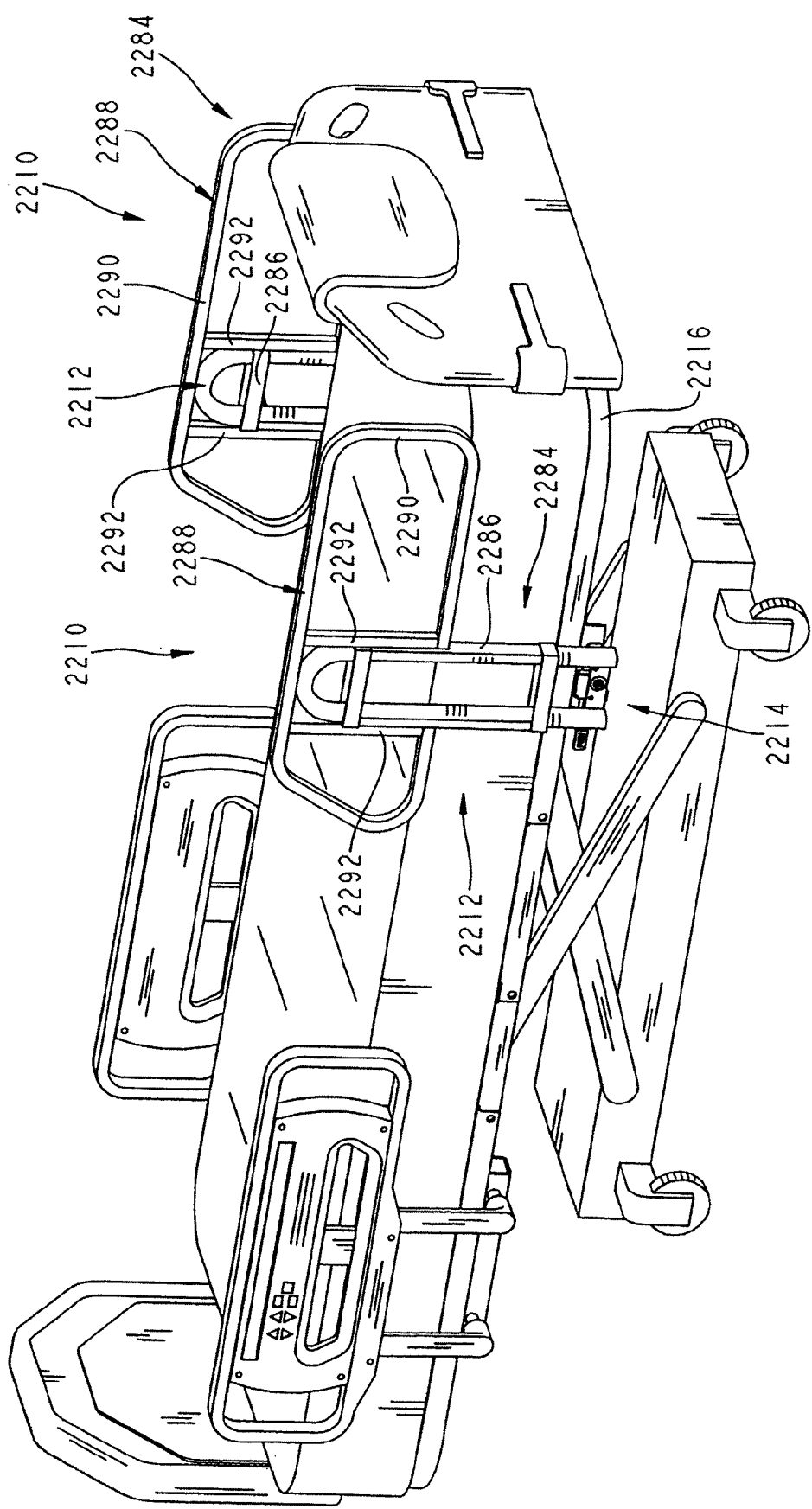
FIG. 78 is a perspective view of the patient support of FIG. 73 showing a patient support including siderails having supplemental rail members.
Figure 79:
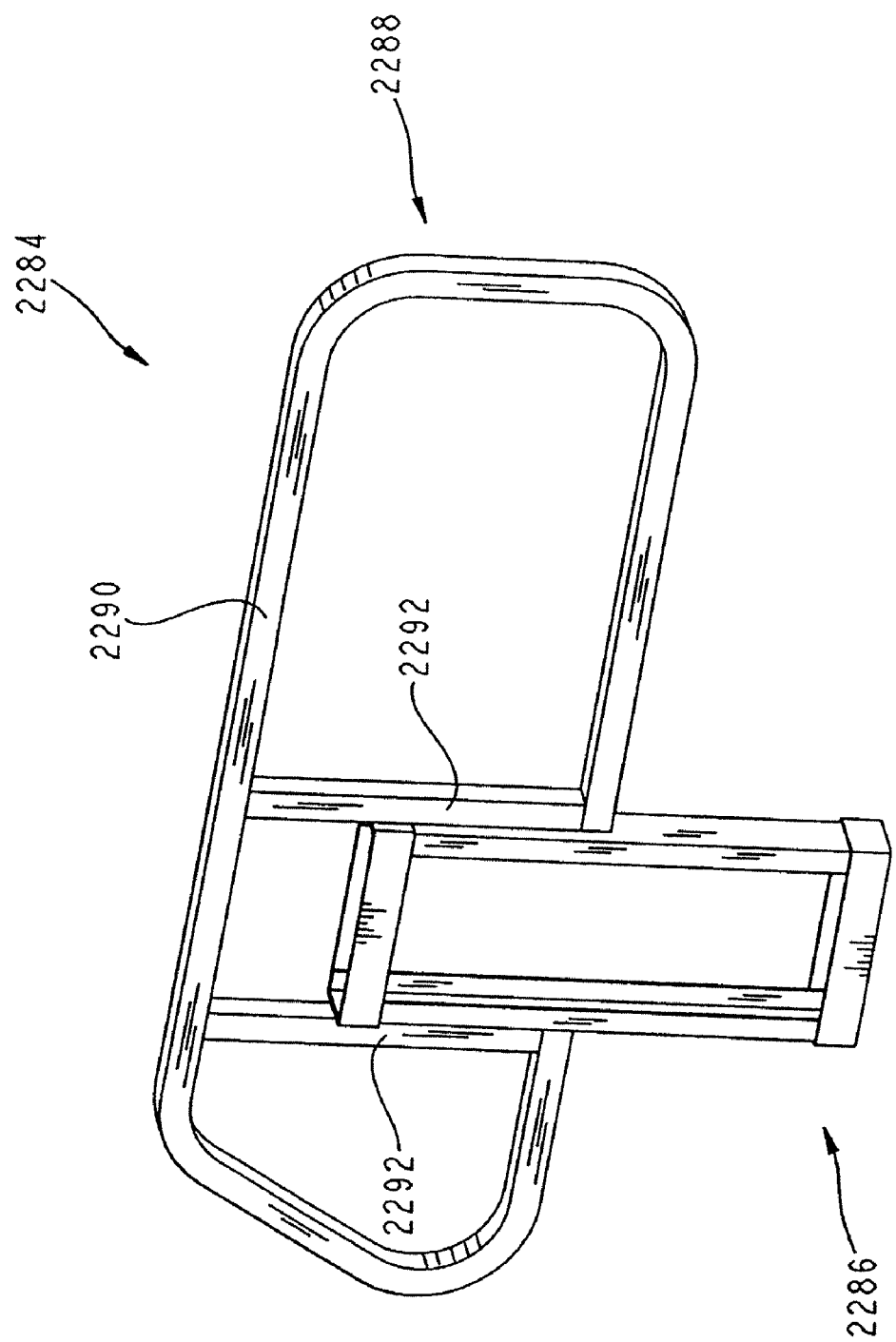
FIG. 79 is a perspective view of the supplemental rail member of FIG. 78.

A removable rail member 2284 is shown in FIGS. 78 and 79. Rail member 2284 includes an attachment housing 2286 and a rail member 2288. Attachment housing 2286 is substantially rectangular and is configured to slidably over rail member 2212 as shown in FIG. 78. As shown in FIG. 79, rail member 2288 includes a perimeter rail 2290 and two interior support struts 2292 to that couple perimeter rail 2290 to attachment housing 2286. Rail member 2284 provides siderail 2210 with greater coverage and permits removal for greater access to the patient.

Another alternative embodiment blocker 358 is shown in FIG. 80. Blocker 358 includes a wedge shaped foam core 360 and a cover 362 coupled to a cover 364 of mattress 356. As shown in FIG. 81, blocker 358 covers or blocks access to gap 354. When siderails 324, 328 are rotated to the lowered position, blocker 358 rotates to the outside of siderail 324, 328 as shown in FIG. 82. When siderails 324, 328 are raised again, blocker 358 is flipped back over rails 324, 328 to the position shown in FIG. 81.

Figure 83:
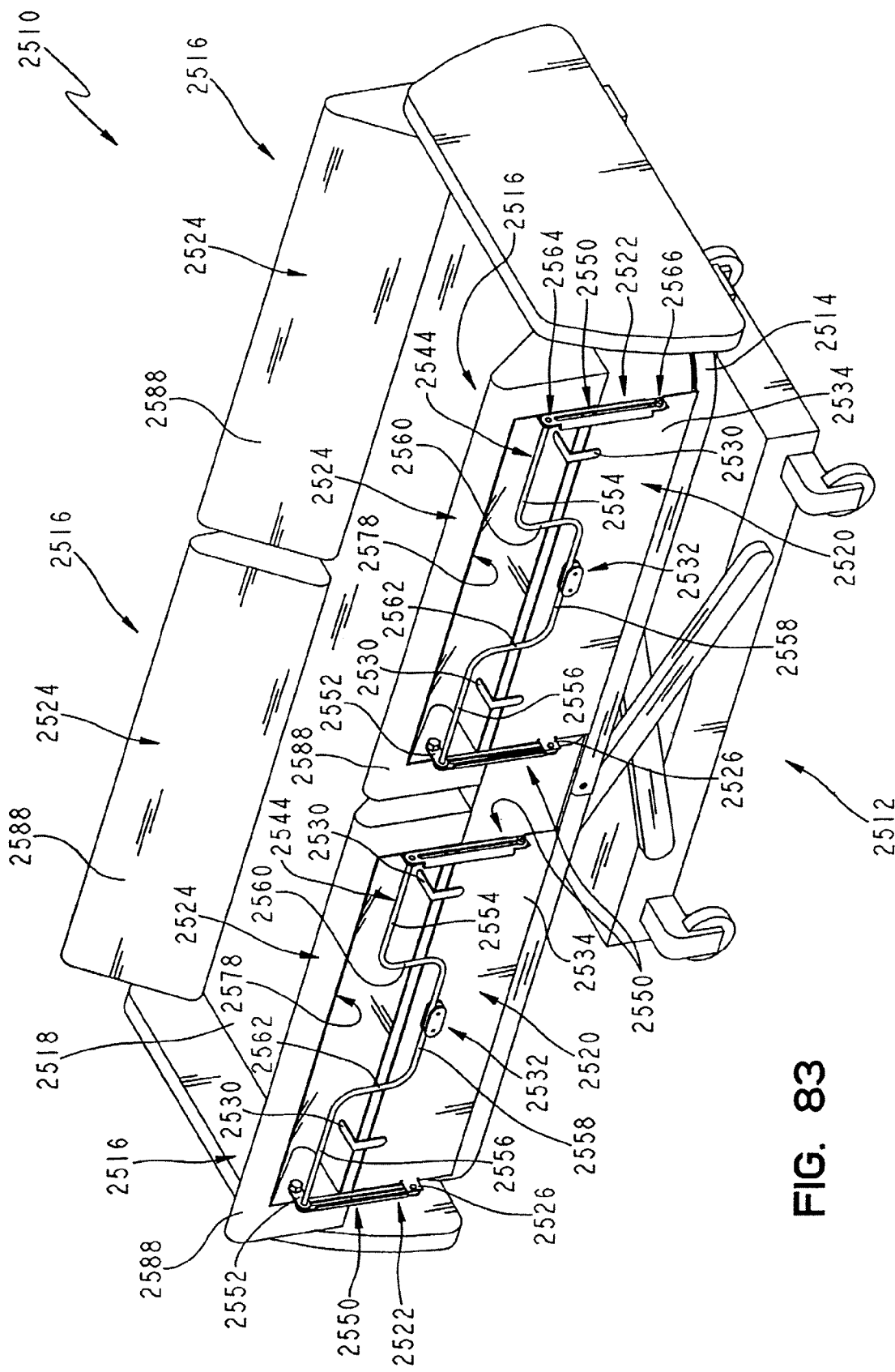
FIG. 83 is a perspective view of another alternative embodiment patient support showing a patient support including siderails.
Figure 84:
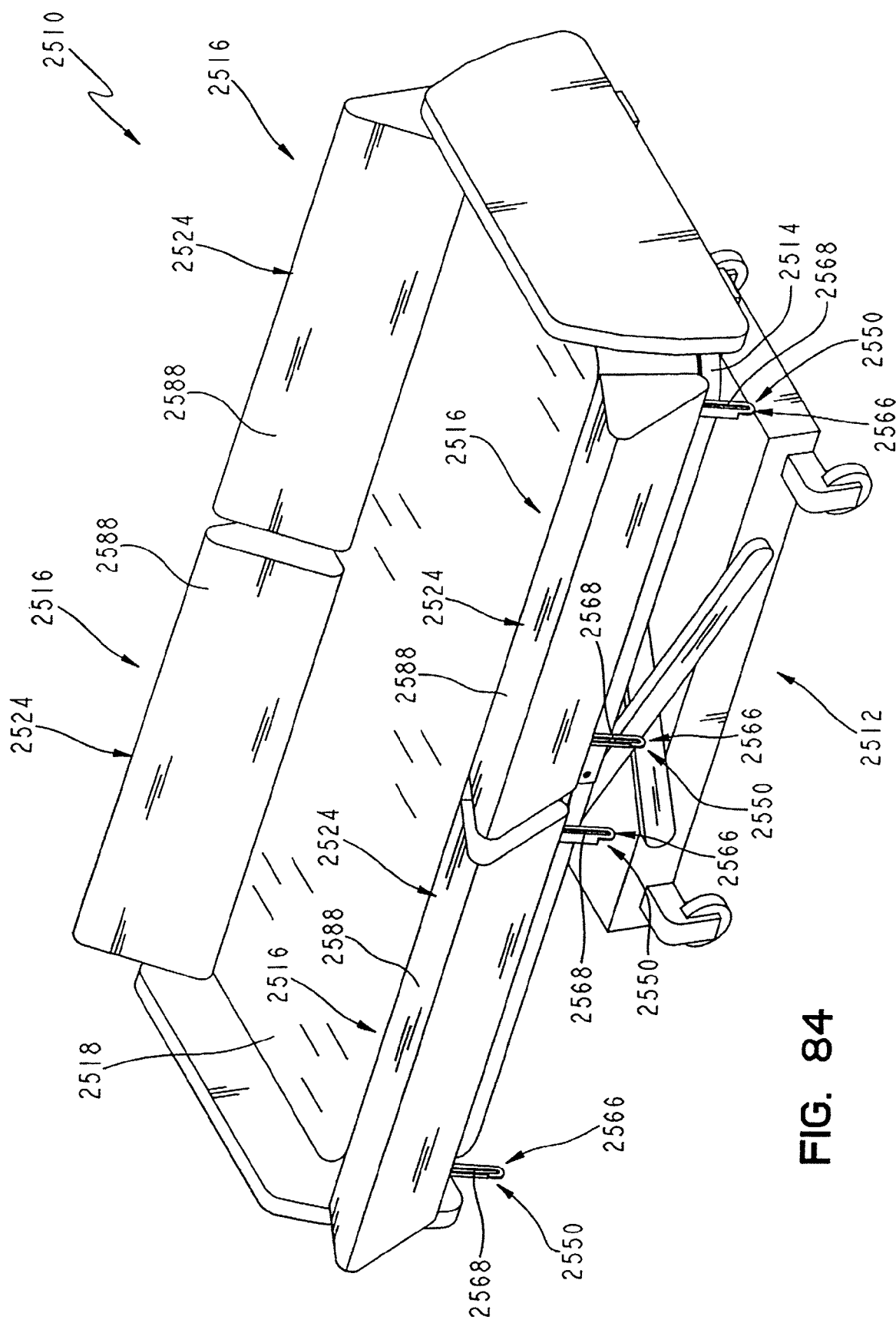
FIG. 84 is a perspective view of the patient support of FIG. 83 showing the siderails in a lowered position.

Another alternative embodiment patient support 2510 is shown in FIGS. 83 and 84 having a frame 2512, a deck 2514 supported by frame 2512, a mattress 2518 positioned on deck 2514, and siderails 2516 coupled to deck 2514. Each siderail 2516 includes a base 2520, a linkage 2522, and a rail member 2524.

Figure 85:
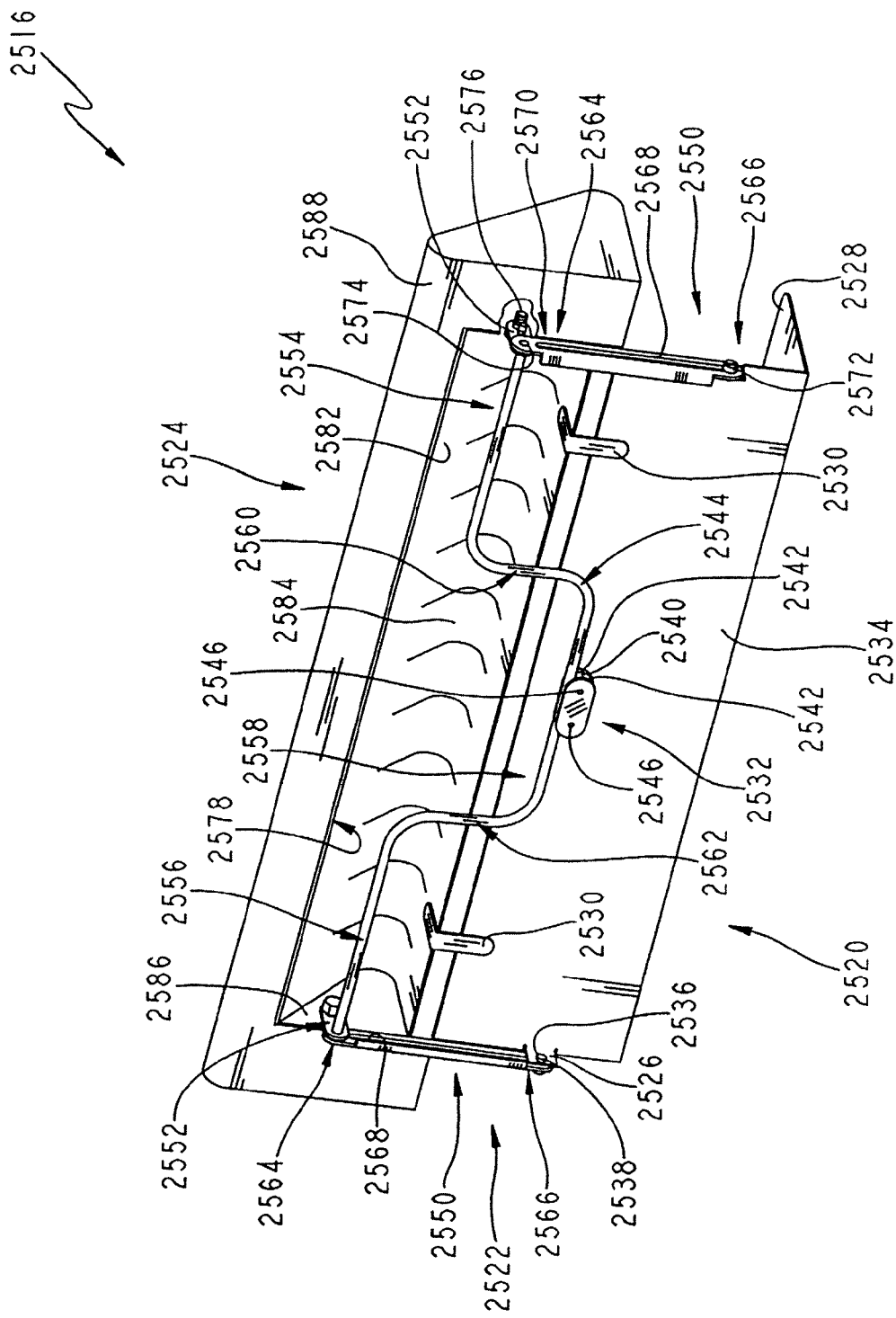
FIG. 85 is a perspective view of the siderail of FIG. 83 showing the siderail in a latched raised position.

As shown in FIG. 85, base 2520 includes a vertical plate 2534, linkage attachment flange 2526 extending from plate 2534, deck attachment flange 2528 extending from plate 2534, rail attachment hinge 2530 coupled to plate 2534, and a position lock 2532 coupled to vertical plate 2534. Plate 2534 is a preferably a substantially flat metal rectangle. Deck attachment flange 2528 is a flat metal flange that extends perpendicularly to plate 2534. Deck attachment flange 2528 is positioned between mattress 2518 and deck 2514 and has a plurality of apertures (not pictured) defined therein so that fasteners can be passed through the aperture to fasten base 2520 to deck 2514. Alternatively, the siderail is coupled to the remainder of the patent support by the deck attachment flange being frictionally or otherwise coupled to the deck and/or mattress.

Linkage attachment flange 2526 are flat metal flanges that extend perpendicularly to plate 2534 away from mattress 2518. Linkage attachment flange 2526 have holes 2536 defined therein for receiving a suitable coupler 2538. Rail attachment hinge 2530 is preferably a strap of seatbelt-like material. Hinge 2530 has a mating snap at both ends such that the material couples to base 2520 and to rail member 2524 that also has a snap clasp thereon. Rail attachment hinge 2530 allows rail member 2524 to pivot relative to base 2520. Position lock 2532 is a plastic piece mounted on plate 2534. Position lock 2532 is substantially rectangular and includes rounded corners, a lock track 2540, and two lips 2542. Lock track 2540 is a channel positioned between lips 2542 that extends along the outer edge of position lock 2532. Lock track 2540 is sized to receive a lock bar 2544 of linkage 2522. Position lock 2532 also includes holes 2546 that receive connectors that couple position lock 2532 to plate 2534.

Linkage 2522 includes a lock bar 2544, two slide base connectors or linkages 2550 slidably and rotatably coupled to base 2520, and two rail connectors 2552 fixedly coupled to rail member 2524. Lock bar 2544 is a bent aluminum rod including a first end 2554, second end 2556, and middle 2558 positioned between first end 2554 and second end 2556. First end 2554 is partially threaded to receive a nut thereon and is substantially straight. Moving from first end 2554 toward middle 2558, lock bar 2544 makes a rounded 90-degree bend, has a first displacement section 2560, makes a second 90-degree bend, and then forms middle 2558 that is parallel with first end 2554. Moving from middle 2558 toward second end 2560 lock bar 2544 makes a rounded 90-degree bend, has a second displacement section 2562 parallel with first displacement section 2560, makes another 90-degree bend, and then forms partially threaded second end 2556 that is collinear with first end 2554. Middle 2558 of lock bar 2544 has a diameter sized to be received within lock track 2540 of position lock 2532.

Slide base linkages 2550 are generally flat metal elongated members each having an upper end 2564, a lower end 2566, an elongated hole or track 2568 defined therein extending from upper end 2564 to lower end 2566, and a lock bar aperture 2570 at upper end 2564. Track 2568 is sized to receive coupler 2538 therein so that linkage 2520 is thereby slidably coupled to base 2520 as coupler 2538 is able to slide to a plurality of positions within track 2568. Lock bar aperture 2570 is preferably separated from track 2568; however, embodiments are envisioned where a washer is provided that is welded over track 2569 thereby partitioning off part of track 2569 that the washer defines the lock bar aperture.

Rail connectors 2552 are flat rounded rectangle metal plates including lock bar holes 2574 and rail connecting holes 2576. Lock bar holes 2574 are sized to receive ends 2554, 2556 of lock bar 2544 therethrough. Rail connecting holes 2576 are sized to receive a suitable connector to couple rail connectors 2552 to rail members 2524. When assembled, ends 2554, 2556 of lock bar 2544 extend through lock bar apertures 2570 of linkages 2522 and holes 2574 of rail connectors 2552. A nut or other fastener is provided on ends 2554, 2556 to hold lock bar 2544 in the respective apertures.

Rail member 2524 includes an endoskeleton or inner support member 2578 and a cushion 2580. Endoskeleton 2578 is constructed from plastic or other substantially rigid material having a substantially triangular cross section. Endoskeleton 2578 includes a first solid side 2582, a second solid side 2584 coupled to first solid side 2582, two ends 2586 each coupled to both solid sides 2582, 2584, and an open side defined by sides 2582, 2584 and ends 2586. First solid side 2582 is spaced apart from base 2520 of siderail 2516. First solid side 2582 curves as it meets second solid side 2584. Second solid side 2584 has snap clasps attached thereto to attach to snaps of rail attachment hinge 2530. Ends 2586 are substantially triangular and have holes defined therein for receiving a suitable connector to couple rail connectors 2552 to rail members 2524. Cushion 2580 includes a soft inner portion (not pictured) and a pliable plastic cover 2588. Soft inner portion covers the outside of endoskeleton 2578 on all sides except the open side. Inner portion is preferably thicker outside first solid side 2582 and ends 2586 than it is outside second solid side 2584. Plastic cover 2588 is preferably liquid proof and combines with endoskeleton 2578 to encompasses inner portion.

Figure 86:
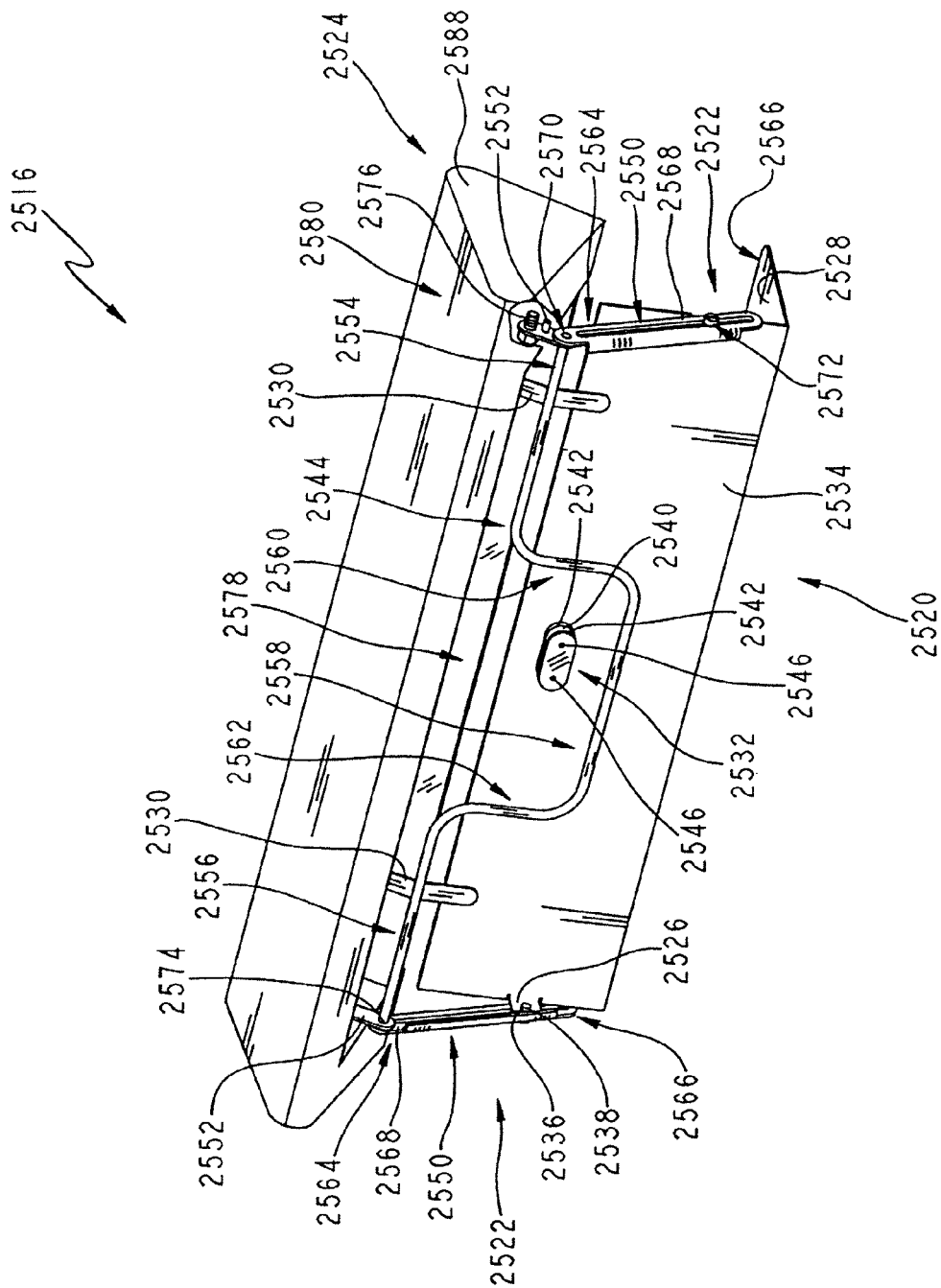
FIG. 86 is a perspective view of the siderail of FIG. 85 showing the siderail in an unlatched position.
Figure 87:
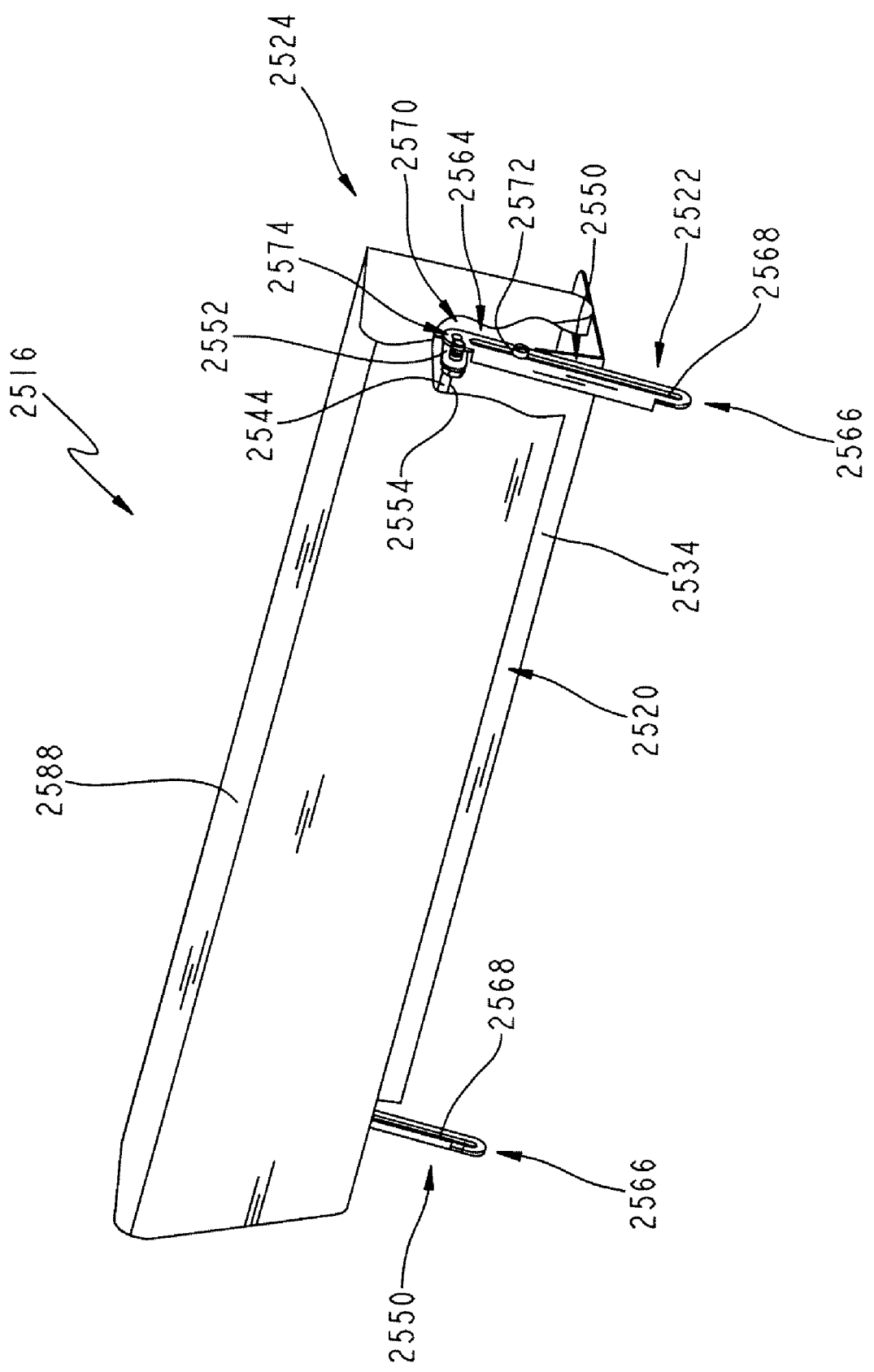
FIG. 87 is a perspective view of the siderail of FIG. 85 in the lowered position.
Figure 88:
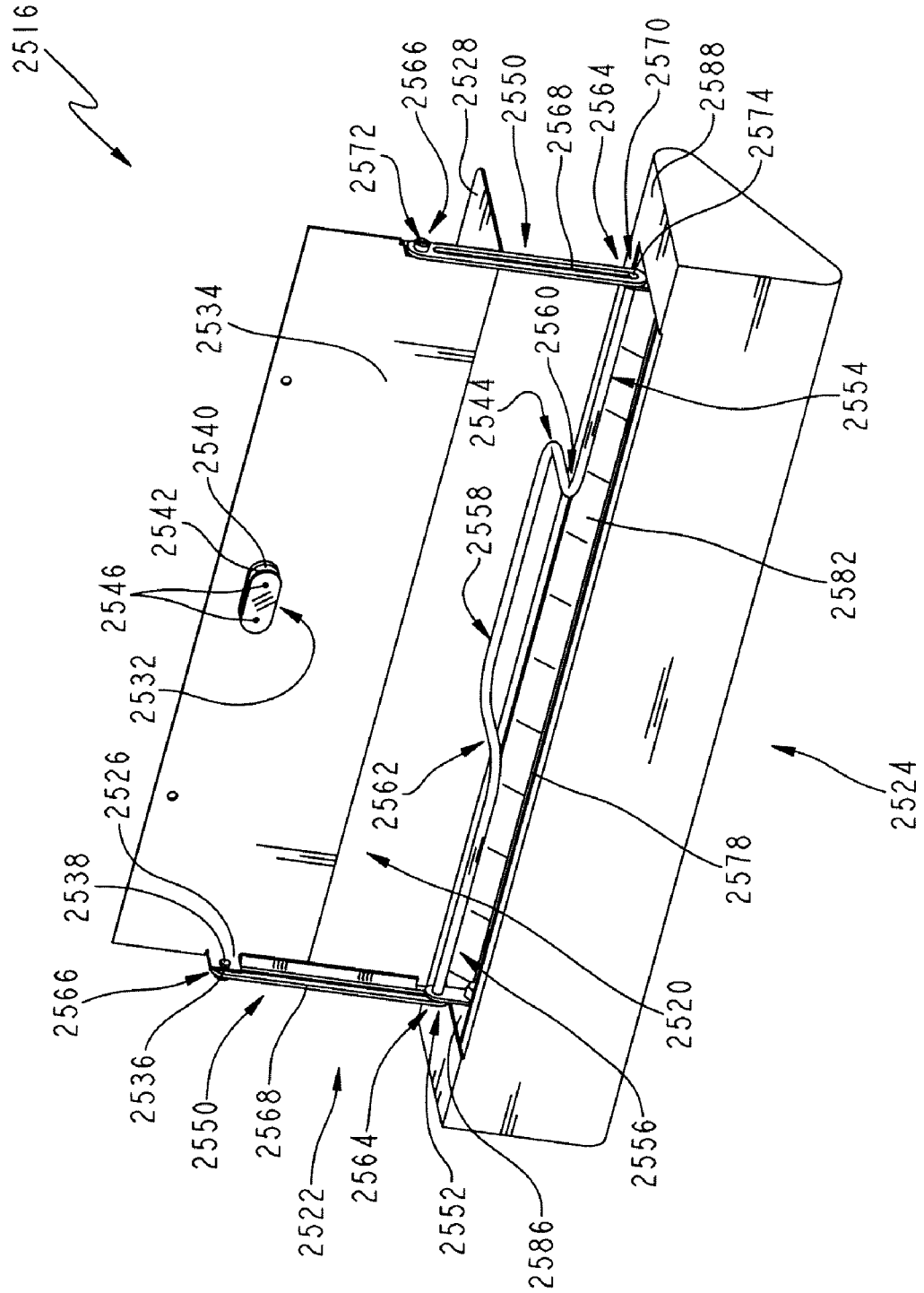
FIG. 88 is a perspective view of the siderail of FIG. 85 in an egress position.

In operation, siderails 2516 may assume three positions, a raised position, shown in FIGS. 83 and 85, an extended position shown in FIG. 84, and an egress position shown in FIG. 88. In the raised position, the portion of cover 2588 outside second side 2584 rests upon mattress 2518, coupler 2538 is located near the lower end 2566 of track 2568, second solid side 2584 forms a substantially right angle with plate 2534 of base 2520, and middle 2558 of lock bar 2544 is in lock track 2540 of position lock 2532. To move a siderail 2516 from raised position to extended position, middle 2558 of lock bar 2544 is first raised to disengage lock bar 2544 from lock track 2540. Rail member 2524 can then be rotated relative to ends 2554, 2556 of lock bar 2544 as slide base linkage 2550 lowers relative to coupler 2538 as shown in FIG. 86. Rail attachment hinge 2530 maintains a connection with base 2520 and rail member 2524 so that rail member 2524 rotates around a pivot provided by rail attachment hinge 2530. Rail member 2524 rotates slightly less than 180-degrees to arrive at extended position shown in FIGS. 84 and 87. Similarly, rotating rail member 2524 back into contact with mattress 2518 and engaging lock bar 2544 in lock track 2540 places siderail 2516 back in raised position.

To move siderail 2516 from the raised position to the egress position middle 2558 of lock bar 2544 is first raised to disengage lock bar 2544 from lock track 2540. Rail attachment 2530 is disengaged from base 2520 or rail member 2524 thereby allowing rail member 2524 and linkage 2522 to rotate around coupler 2538 of linkage attachment 2530. Rail member 2524 rotates to arrive at egress position shown in FIG. 88. Similarly, rotating rail member 2524 back into contact with mattress 2518, attaching rail attachment 2530 to base 2520 and rail member 2524, and engaging lock bar 2544 in lock track 2540 places siderail 2516 back in raised position.

Preferably, instructions for the assembly, installation, and/or use of the patient supports and other devices disclosed herein are provided with the patient supports of other devices or otherwise communicated to permit a person or machine to assemble, install and/or use the patient supports and other devices. Such instructions may include a description of any or all portions of patient supports and devices and/or any or all of the above-described assembly, installation, and use of the patient supports and devices. Furthermore, such instructions may describe the environment in which patient supports and devices are used. The instructions may be provided on separate papers and/or the packaging in which the patient support or other devices are sold or shipped. Furthermore, the instructions may be embodied as text, pictures, audio, video, or any other medium or method of communicating instructions known to those of ordinary skill in the art.

Although the invention has been described in detail with reference to certain preferred embodiments, variations and modifications exist within the scope and spirit of the present invention.

The invention claimed is:

1. A method for altering a patient support including a deck support, a first siderail, and a second siderail, the method comprising:
   providing an articulating deck,
   coupling a first siderail to the articulating deck,
   coupling a sub-frame to the to the patient support,
   coupling a second siderail to the sub-frame to define a minimum gap between the first siderail and the second siderail such that the minimum gap remains of a substantially constant width as the deck articulates.

2. The method of claim 1, comprising coupling the second siderail to a non-articulating portion of the sub-frame.

3. The method of claim 1, wherein the articulating deck has a head section and a foot section longitudinally spaced from the head section, comprising coupling the first siderail to a head section of the articulating deck.

4. The method of claim 3, comprising coupling the second siderail to a portion of the sub-frame that is longitudinally spaced from the head section of the articulating deck.

5. A method for altering a patient support, the method comprising:
   providing a frame including a sub-frame,
   coupling a siderail support to the sub-frame,
   coupling a first siderail to the siderail support, the first siderail including a first rail member having a first edge that is substantially straight,
   supporting an articulating deck above the frame,
   coupling a second siderail to the articulating deck, the second siderail including a second rail member having a second edge that is substantially straight and parallel with the first edge and a third edge that is rounded and tangential with the second edge.

6. The method of claim 5, comprising coupling an I.V. socket to the siderail support.

7. The method of claim 6, comprising coupling an I.V. mount to the frame.

8. The method of claim 5, comprising coupling the first and second siderails to define a minimum gap therebetween that remains of a substantially constant width as the deck articulates.

9. The method of claim 5, comprising moving the second siderail and the articulating deck relative to the first siderail and the siderail support.

10. A method for altering a patient support comprising:
providing a frame,
supporting a deck above the frame, the deck including an articulating foot section,
coupling a siderail to the patient support so that it remains substantially stationary when the foot section articulates, wherein the siderail includes a first rail member having a first edge that is substantially straight, and
coupling a second siderail to the frame, the second siderail including a second rail member having a second edge that is substantially straight and parallel with the first edge and a third edge that is tangential with the second edge, the third edge being rounded and having a radius of curvature of about 8.5 inches, the first edge and the second and third edges defining a minimum gap therebetween such that the minimum gap remains of a substantially constant width as the deck articulates.

11. The method of claim 10, comprising configuring the siderail to move between a raised position and a lowered position.

12. The method of claim 11, wherein the siderail comprises a rail member, comprising coupling a rail extension to the rail member, the rail extension being moveable between an extended position relative to the rail member when the siderail is in a raised position and a non-extended position relative to the rail member when the siderail is in a lowered position.

13. The method of claim 12, comprising providing a linkage, wherein the linkage causes the rail extension to move between the extended and non-extended positions.

14. method of claim 10, comprising providing a gap within the siderail and covering the gap.

15. The method of claim 14, comprising covering the gap with a transparent material.

16. The method of claim 10, comprising providing a notch in an upper edge of the siderail.

17. The method of claim 16, comprising providing an S-shaped portion in the upper edge of the siderail.

18. The method of claim 10, comprising coupling the siderail to a foot end of the patient support.

19. The method of claim 18, comprising coupling a second siderail to the patient support.

* * * * *